(12) United States Patent
Benanav

(10) Patent No.: US 11,698,899 B2
(45) Date of Patent: Jul. 11, 2023

(54) AUTOMATIC OBJECT INFERENCE IN A DATABASE SYSTEM

(71) Applicant: Dan Benanav, Cold Spring, NY (US)

(72) Inventor: Dan Benanav, Cold Spring, NY (US)

( * ) Notice: Subject to any disclaimer, the term of this patent is extended or adjusted under 35 U.S.C. 154(b) by 92 days.

(21) Appl. No.: 16/952,585

(22) Filed: Nov. 19, 2020

(65) Prior Publication Data

US 2021/0089524 A1 Mar. 25, 2021

Related U.S. Application Data

(63) Continuation of application No. 16/518,900, filed on Jul. 22, 2019, now Pat. No. 10,846,286.

(60) Provisional application No. 62/701,255, filed on Jul. 20, 2018.

(51) Int. Cl.
| | |
|---|---|
| *G06F 16/242* | (2019.01) |
| *G06F 16/901* | (2019.01) |
| *G06F 16/248* | (2019.01) |
| *G06F 16/2452* | (2019.01) |
| *G06F 16/25* | (2019.01) |
| *G06F 16/2455* | (2019.01) |

(52) U.S. Cl.
CPC ........ *G06F 16/2423* (2019.01); *G06F 16/242* (2019.01); *G06F 16/248* (2019.01); *G06F 16/24526* (2019.01); *G06F 16/252* (2019.01); *G06F 16/9024* (2019.01); *G06F 16/24554* (2019.01); *G06F 16/24558* (2019.01)

(58) Field of Classification Search
CPC .............. G06F 16/2423; G06F 16/242; G06F 16/24526; G06F 16/248; G06F 16/252; G06F 16/9024; G06F 16/24554; G06F 16/24558; G06F 16/284

See application file for complete search history.

(56) References Cited

U.S. PATENT DOCUMENTS

2009/0070284 A1* 3/2009 Tunstall-Pedoe ........................... G06F 16/24534 706/50
2017/0075953 A1* 3/2017 Bozkaya ........... G06F 16/24522

OTHER PUBLICATIONS

Fagin, Ronald, "Degrees of Acyclicity for Hypergraphs and Relational Database Schemes", 1983, Journal of the Association for Computing Machinery, vol. 30, No. 3, pp. 514-550 (Year: 1983).*

(Continued)

*Primary Examiner* — Tamara T Kyle
*Assistant Examiner* — Lana Alagic
(74) *Attorney, Agent, or Firm* — Leydig, Voit & Mayer, Ltd.

(57) ABSTRACT

A binary relational database model is described whereby application-layer object structures are easily inferred from database query templates. The object structures take the form of acyclic hypergraphs, which are induced from primal graphs representing query templates. Database applications may iterate through the collection of returned object structures, accessing the data in each structure. The returned object structures are not based on a fixed object model, thereby permitting rich structures with greater applicability than traditional ORM systems. A relationship between non-primitive entities may be directly expressed without the need for alternative join tables. Development and maintenance costs are thus substantially reduced, and data is more efficiently stored and manipulated for database applications.

11 Claims, 43 Drawing Sheets

(56) References Cited

OTHER PUBLICATIONS

Dechter, Rina. "Decomposing a relation into a tree of binary relations." (1990) Journal of Computer and System Sciences 41.1:2-24. (Year: 1990).*

Bartak, Roman, "Theory and Practice of Constraint Propagation", 2001, In J. Figwer, Proceedings of the 3rdWorkshop on Constraint Programming in Decision and Control (CPDC2001 Workshop), pp. 7-14 (Year: 2001).*

* cited by examiner

Data Model rPersonID

| $P_1$ | 1 |
|---|---|
| $P_2$ | 2 |
| $P_3$ | 3 |
| $P_4$ | 4 |

Prop rLastName

| $P_1$ | Smith |
|---|---|
| $P_2$ | Smith |
| $P_3$ | Jones |
| $P_4$ | Doe |

Prop rFirstName

| $P_1$ | John |
|---|---|
| $P_2$ | Mary |
| $P_3$ | Ted |
| $P_4$ | John |

Prop rAddress

| $P_1$ | $A_1$ |
|---|---|
| $P_2$ | $A_1$ |
| $P_3$ | $A_2$ |
| $P_4$ | $A_3$ |

Prop rPhoneNumber

| $P_1$ | 555 555-1212 |
|---|---|
| $P_1$ | 555 555-1212 |
| $P_2$ | 555 555-1111 |
| $P_3$ | 555 555-2222 |

Attr rEmail

| $P_1$ | js@a.com |
|---|---|
| $P_1$ | js@b.com |
| $P_2$ | ms@a.com |
| $P_3$ | tj@c.com |

AttrUnique rStreet

| $A_1$ | 1 Main St. |
|---|---|
| $A_2$ | 110 Main St. |
| $A_3$ | 111 Central Ave. |

Prop rCity

| $A_1$ | $C_1$ |
|---|---|
| $A_2$ | $C_1$ |
| $A_3$ | $C_2$ |

Prop rZip

| $A_1$ | $Z_1$ |
|---|---|
| $A_2$ | $Z_2$ |
| $A_3$ | $Z_3$ |

Prop rCityName

| $C_1$ | New York |
|---|---|
| $C_2$ | Trentron |

Prop rStateName

| $S_1$ | NY |
|---|---|
| $S_2$ | NJ |

Prop rState

| $C_1$ | $S_1$ |
|---|---|
| $C_2$ | $S_2$ |

Prop rCountry

| $S_1$ | US |
|---|---|
| $S_2$ | US |

Prop $rZip_5$

| $Z_1$ | 12345 |
|---|---|
| $Z_2$ | 12222 |
| $Z_3$ | 12333 |

Prop $rZip_4$

| $Z_1$ | 1111 |
|---|---|
| $Z_2$ | 2222 |
| $Z_3$ | 333 |

Prop $PersonType = \{P_1, P_2, P_3, P_4\}$
$AddressType = \{A_1, A_2, A_3\}$
$CityType = \{C_1, C_2\}$
$StateType = \{S_1, S_2\}$
$ZipType = \{Z_1, Z_2\}$

Fig. 3

Query Template Last Name is Smith

Atomic Templates rPersonID(*Person, PersonID*)
rLastName(*Person, LastName*)
rFirstName(*Person, FirstName*)
rEmail(*Person, Email*)
rAddress(*Person, Address*)
rStreet(*Address, Street*)
rCity(*Address, City*)
rZip(*Address, Zip*)
rState(*City, State*)
rCityName(*City, CityName*)
rStateName(*State, StateName*)
rCountry(*State, Country*)
rZip5($Zip, Zip_5$)
rZip4($Zip, Zip_4$)

Unary Templates

(*Person, PersonType*)
(*Address, AddressType*)
(*City, CityType*)
(*State, StateType*)
(*Zip, ZipType*)
(*LastName*, {Smith})

Fig. 4

Results for Query Template Last Name is Smith Focus on *Person*

$$\left\{ \begin{bmatrix} P_1, \\ PersonID:1, \\ FirstName:\texttt{John}, \\ LastName:\texttt{Smith} \\ Email:\{\texttt{js@a.com, js@b.com}\}, \\ Address: \begin{bmatrix} A_1, \\ Street:\texttt{1 Main Street}, \\ Zip: \begin{bmatrix} Z_1, Zip5:\texttt{12345}, Zip4:\texttt{1111} \end{bmatrix} \\ City: \begin{bmatrix} C_1, CityName:\texttt{New York} \\ State: \begin{bmatrix} S_1, StateName:\texttt{NY}, Country:\texttt{US} \end{bmatrix} \end{bmatrix} \end{bmatrix} \\ \begin{bmatrix} P_2, \\ PersonID:2, \\ FirstName:\texttt{Mary}, \\ LastName:\texttt{Smith}, \\ Email:\{\texttt{ms@a.com}\}, \\ Address: \begin{bmatrix} A_1, \\ Street:\texttt{1 Main Street}, \\ Zip: \begin{bmatrix} Z_1, Zip5:\texttt{12345}, Zip4:\texttt{1111} \end{bmatrix} \\ City: \begin{bmatrix} C_1, CityName:\texttt{New York} \\ State: \begin{bmatrix} S_1, StateName:\texttt{NY}, Country:\texttt{US} \end{bmatrix} \end{bmatrix} \end{bmatrix} \end{bmatrix} \right\}$$

Fig. 5

```
Collection<Result> persons = db.solve(personQuery);
for(Result person : persons){
    Integer personId = person.get(PersonID);
    String firstName = person.get(FirstName),
        lastName = person.get(LastName);
    Collection<String>
        emails = person.get(AnyEmail);
    Result address = person.get(Address),
        city= address.get(City),
        state = city.get(State);
    String street = address.get(Street),
        cityName = city.get(CityName),
        stateName = state.get(StateName);
}
```

Fig. 6

Result for Query Template Last Name is Smith rooted at Address $$\begin{bmatrix} A_1, \\ Street\text{:}\texttt{1 Main Street}, \\ Zip\text{:} \begin{bmatrix} Z_1, Zip5\text{:}\texttt{12345}, Zip4\text{:}\texttt{1111} \end{bmatrix} \\ City\text{:} \begin{bmatrix} C_1, CityName\text{:}\texttt{New York} \\ State\text{:} \begin{bmatrix} S_1, StateName\text{:}\texttt{NY}, Country\text{:}\texttt{US} \end{bmatrix} \end{bmatrix} \\ Person\text{:} \left\{ \begin{bmatrix} P_1, PersonID\text{:}\texttt{1}, FirstName\text{:}\texttt{John}, LastName\text{:}\texttt{Smith} \\ Email\text{:}\{\texttt{js@a.com, js@b.com}\} \end{bmatrix} \\ \begin{bmatrix} P_2,, PersonID\text{:}\texttt{2}, FirstName\text{:}\texttt{Mary}, LastName\text{:}\texttt{Smith} \\ Email\text{:}\{\texttt{ms@a.com}\} \end{bmatrix} \right\} \end{bmatrix}$$

Fig. 7

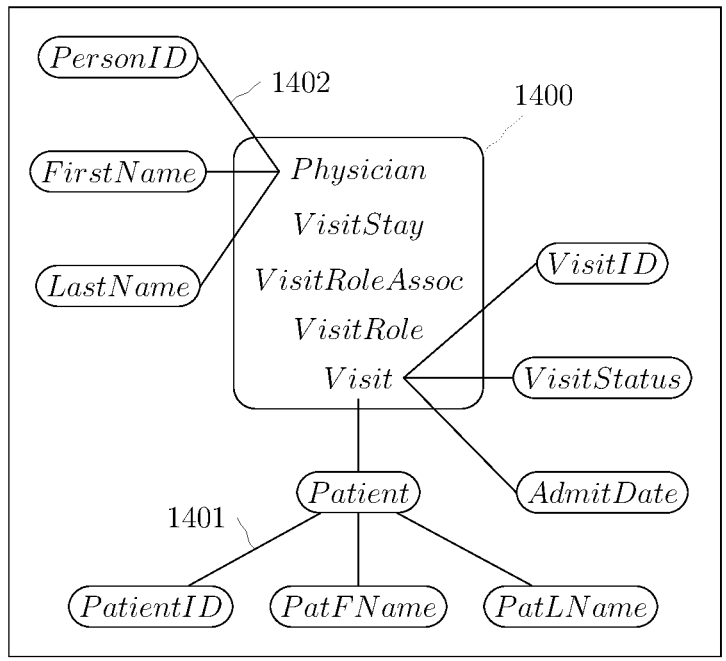

Fig. 14

```
Collection<ResultTuple> visitTuples = db.solve(phyQuery);
for(ResultTuple visitTuple : visitTuples){
    Result visit = visitTuple.get(Visit);
        Integer visitID = visit.get(VisitID);
        Date admitDate = visit.get(AdmitDate);
        Result patient = visit.get(Patient);
            String lastNamePat = patient.get(PatLName);
        ...
    String visitStay = visitTuple.get(VisitStay),
        visitRole = visitTuple.get(VisitRole);
    Result physician = visitTuple.get(Physician);
        String firstName = physician.get(FirstName),
            lastName = physician.get(LastName);
        ...
}
```

Fig. 15

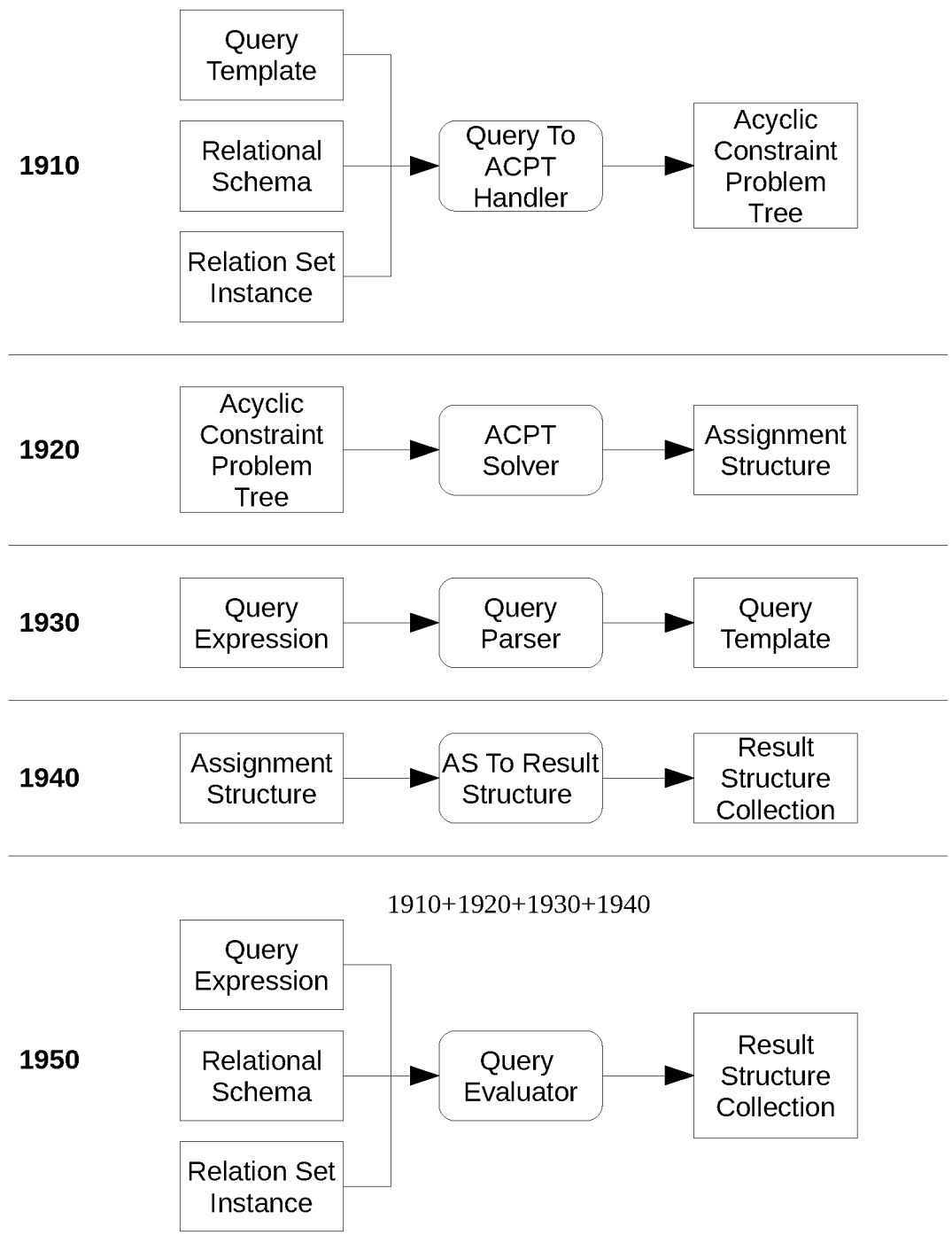
Figure 19 Query Expression Various Components

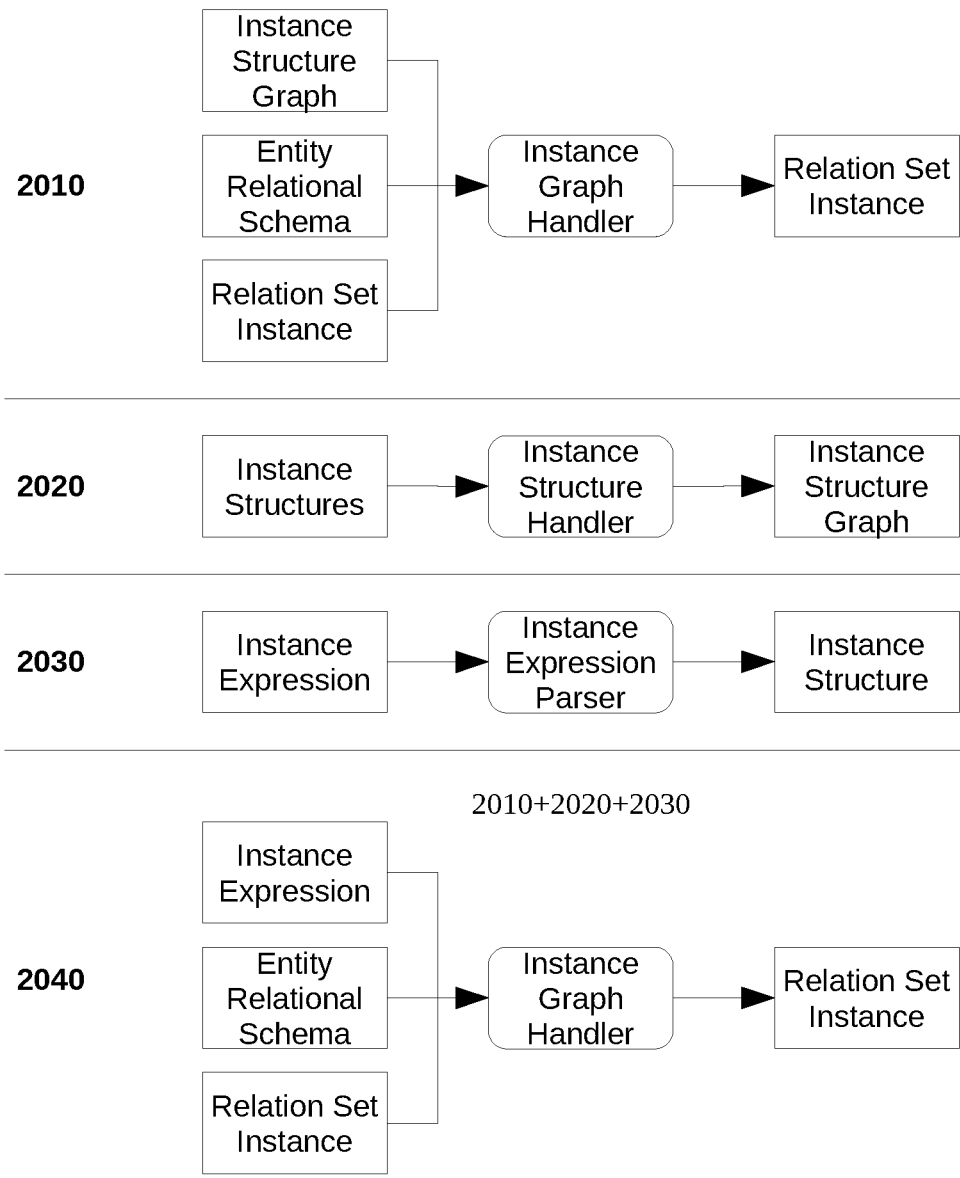
Figure 20 Instance Expression Various Components

Person: Variables and Schema

```
public static DeclareFactory decl = new DeclareFactory("com.jayadb.person");
                                                                              2110
```

```
public static EntityType                                                      2120
      PersonType = decl.type("Person"),
      AddressType = decl.type("Address"),
      CityType = decl.type("City"),
      StateType = decl.type("State"),
      ZipType = decl.type("Zip");
```

```
public static EntityVariableProperty                                          2130
      Person = PersonType.prop,
      Address = AddressType.prop,
      City = CityType.prop,
      State = StateType.prop,
      Zip = ZipType.prop;
public static EntityVariableAttribute
      AnyPerson = PersonType.attr;
public static PrimitivePropertyUnique<Integer>
      PersonID = decl.integerPropUnique("PersonID");
public static PrimitiveProperty<String>
      LastName = decl.stringProp("LastName"),
      FirstName = decl.stringProp("FirstName"),
      Street = decl.stringProp("Street"),
      Street2 = decl.stringProp("Street2"),
      CityName = decl.stringProp("CityName"),
      StateName = decl.stringProp("StateName"),
      Country = decl.stringProp("Country"),
      Zip4 = decl.stringProp("Zip4"),
      Zip5 = decl.stringProp("Zip5");
public static PrimitiveAttribute<String>
      AnyPhoneNumber = decl.stringAttr("AnyPhoneNumber");
public static PrimitiveAttributeUnique<String>
      AnyEmail = decl.stringAttrUnique("Email");
```

```
public static void createPersonSchema(Schema s){                              2140
      s.create(StateType.primaryKey(StateName, Country));    ←―   2150
      s.create(ZipType.primaryKey(Zip5, Zip4));
      s.create(CityType.primaryKey(CityName, State));        ←―   2160
      s.create(AddressType.primaryKey(Street, Street2, City, Zip));  ←―   2170
      s.create(PersonType.primaryKey(PersonID)   ←―   2180
            .mustHave(LastName)
            .optional(FirstName, AnyEmail, Address, AnyPhoneNumber));}
```

Figure 21: Person Variables And Schema

Person Instance Expression, Query and Response

```
InstanceExpression johnsmith =                                              2210
 Person.instance(PersonID.is(1))
      .update(LastName.is("smith")
            ,FirstName.is("john")
            ,Address.instance(
                  Street.is("123 Main st"),
                  Street2.is(""),
                  City.instance(
                        CityName.is("New York"),
                        State.instance(StateName.is("NY"),
Country.is("US"))),
                        Zip.instance(Zip5.is("12345"), Zip4.is(""))),
            AnyEmail.is("johnsmith@aa.com", "johnsmith@bb.com"),
            AnyPhoneNumber.is("555-5555", "555-5551"))
db.execute(johnsmith);
```

```
EntityExpression personQuery =                                              2220
      Person.has(
            PersonID, LastName.is("Smith")).find(
            FirstName,AnyPhoneNumber,AnyEmail,
            Address.has(
                  Street,Street2,
                  City.has(CityName, State.has(StateName, Country)),
                  Zip.has(Zip4,Zip5)));
```

```
//Object structure of results despite no class definitions.                 2230
Collection<Result> persons = db.entitySolve(personQuery);
for(Result person : persons){
      Integer personId = person.get(PersonID);
            firstName = person.get(FirstName);
      Collection<String>
            phoneNumbers = person.get(AnyPhoneNumber),  ←— 2240
            emails = person.get(AnyEmail);
      Result address =
            person.get(Address),
            city= address.get(City),
            state = city.get(State);
      String street = address.get(Street),
                  cityName = city.get(CityName),
                  stateName = state.get(StateName);}
```

Person Add Insert and Update Operations

```
db.execute(Person.exists(PersonID.is(2)).                                   2250
      add(AnyEmail.is("marysmith@cc.com")));
```

```
db.execute(Person.exists(PersonID.is(2)).                                   2260
      remove(AnyEmail.is("marysmith@bb.com")));
```

```
db.execute(Person.exists(PersonID.is(2)).                                   2270
      update(AnyEmail.is("marysmith@aa.com","marysmith@dd.com")));
```

Figure 22: Person Instance,Query, Responses and Updates

Electronic Medical Record Variables

```
public static DeclareFactory decl = new DeclareFactory("com.jayadb.emr");
                                                                              2310
```

```
public static RestrictedStringType                                            2320
      VisitStatusType = decl.restrictedStringType("VisitStatus"),
      VisitStayType   = decl.restrictedStringType("VisitStay"),
      VisitRoleType   = decl.restrictedStringType("VisitRole");
```

```
public static EntityType                                                      2330
      VisitType          = decl.type("Visit"),
      VisitRoleAssocType = decl.type("VisitRoleAssoc"),
      PhysicianGroupType = decl.type("PhysicianGroup");
```

```
public static EntityVariableProperty                                          2340
      Visit   = VisitType.prop,
      Patient = PersonType.prop("Patient");
public static EntityVariableAttribute
      AnyVisitRoleAssoc   = VisitRoleAssocType.attr,
      AnyVisit            = VisitType.attr,
      AnyExcludeVisit     = VisitType.attr("AnyExcludeVisit"),
      AnyExcludedByPerson = PersonType.attr("AnyExcludedByPerson"),
      AnyPhysicianGroup   = PhysicianGroupType.attr;
public static PrimitiveProperty<Integer>
      VisitID = decl.integerProp("VisitID"),
      GroupID = decl.integerProp("GroupID"),
public static PrimitiveProperty<String>
      VisitRole   = VisitRoleType.prop(),
      VisitStay   = VisitStayType.prop(),
      VisitStatus = VisitStatusType.prop(),
      GroupName   = decl.stringProp("GroupName");
public static PrimitiveAttribute<String>
      AnyVisitRolePref  = VisitRoleType.attr("AnyVisitRolePref"),
      AnyActiveStayPref = VisitStayType.attr("AnyActiveStayPref");
public static PrimitiveProperty<Date>
      AdmitDate     = decl.datetimeProp("AdmitDate"),
      DischargeDate = decl.datetimeProp("DischargeDate");
public static String
      InPatient="InPatient",OutPatient="OutPatient",ERPatient="ERPatient", Active="Active",Discharged="Discharged",PreAdmit="PreAdmit",PreReg="PreReg
",
      Attending="Attending",Consulting="Consulting",
      Referring ="Referring",Admitting ="Admitting"
```

Figure 23: Electronic Medical Record Variables

Electronic Medical Record Schema

```
public static void createPersonPrefs(Schema schema){                          2410
    schema.alter(
            PersonType.extend(
                   AnyActiveStayPref, AnyVisitRolePref, AnyExcludeVisit.inverse(AnyExcludedByPerson)
            ));}
```

```
public static void createVisitTypes(Schema schema){                           2420
    schema.set(VisitStatusType, Active, Discharged, PreAdmit,PreReg);
    schema.set(VisitStayType, InPatient, OutPatient, ERPatient);
    schema.set(VisitRoleType, Attending, Admitting, Referring,
Consulting);
    schema.create(VisitRoleAssocType.primaryKey(VisitRole, Person));
    schema.create(PhysicianGroupType.primaryKey(GroupID)
           .mustHave(GroupName, AnyPerson));
    schema.create(VisitType.primaryKey(VisitID)
              .mustHave(Patient, VisitStatus, VisitStay)
              .optional(AnyVisitRoleAssoc, DischargeDate,
AdmitDate));}
```

Figure 24: Electronic Medical Records Schema

My Patients Query and Tuple Response

```
EntityExpression myActivePatientsQuery =                                          2510
Person.has(
      PersonID,
      LastName,
      AnyVisitRolePref.is(VisitRole),
      AnyActiveStayPref.is(VisitStay),
      AnyPhysicianGroup.has(
            GroupID,
            AnyPerson.has(
                  AnyVisitRoleAssoc.has(
                        VisitRole,
                        AnyVisit.has(
                              VisitStatus.is(Active), VisitStay).find(
                              VisitID, AdmitDate, DischargeDate,
                              Patient.has(PersonID,LastName).find(
                                    FirstName)))).find(
                  PersonID,
                  LastName,
                  FirstName))).find(
      FirstName)
.isNot(AnyExcludeVisit, AnyVisit);
```

```
Collection<ResultTuple> resultTuples =                                            2520
      database.entitySolveTuple(myActivePatientsQuery);
      if(Util.isEmpty(resultTuples)){
            System.out.println("No Results");
      }
      for(ResultTuple   resultTuple : resultTuples){
            System.out.println(resultTuple);
      }
}
```

```
ResultTuples Response:                                                            2530
(
 AnyVisitRoleAssoc=VisitRoleAssoc:552,
 VisitStay=OUTPATIENT,
 VisitRole=ADMITTING,
 AnyPhysicianGroup=(Result<> PhysicianGroup:49 GroupID=222),
 AnyPerson=(Result<> Person:244 FirstName=JOHN, PersonID=1111,
LastName=SMITH),
 Person=(Result<> Person:244 FirstName=JOHN, PersonID=1111, LastName=SMITH),
 AnyVisit=(Result<> Visit:5435
         VisitID=1234567,
         AdmitDate=May 07 11:22 EDT 2016,
         VisitStatus=ACTIVE,
         Patient=(Result<> Person:2187
                  FirstName=LINDA,
                  PersonID=4444,
                  LastName=JOHNSON)))
.......
```

Figure 25: My Patients Query and Tuple Response

My Patients Map By Query and Response

```
myActivePatientsQuery.mapBy(                                              2610
    Person,
    AnyVisit.with(VisitStay),
    AnyPerson,
    VisitRole);
```

```
Physician:1788 PAUL JONES                                                 2620
    Visit:1234 AdmitDate:May 07 00:39 2016 INPATIENT Patient:1879 RIA CRANE
        Associated Physician:1111 ALAN TONO {CONSULTING}
    Visit: 1235 AdmitDate:May 03 19:49 2016 INPATIENT Patient:2379 JEAN
CARLSBAD
        Associated Physician:2133 RUSSEL DELL
{CONSULTING,ATTENDING,ADMITTING}
    Visit:1236 AdmitDate:May 01 12:00 2016 INPATIENT Patient:3476 RUSS
LANDERS
        Associated Physician:3457 GARY SMYTHE {CONSULTING}
    Visit:1237 AdmitDate:May 01 11:56 2016 INPATIENT Patient:4767 JUDITH
TOLLS
        Associated Physician:1788 PAUL JONES {CONSULTING}
        Associated Physician:2133 RUSSEL DELL {CONSULTING}
    Visit:1238 AdmitDate:May 07 01:25 2016 INPATIENT Patient:5467 MICHAEL
LANERS
        Associated Physician:2133 RUSSEL DELL {CONSULTING}
        Associated Physician:8777 STUART WEINER {CONSULTING}
...
```

Figure 26:My Patients Map By Query

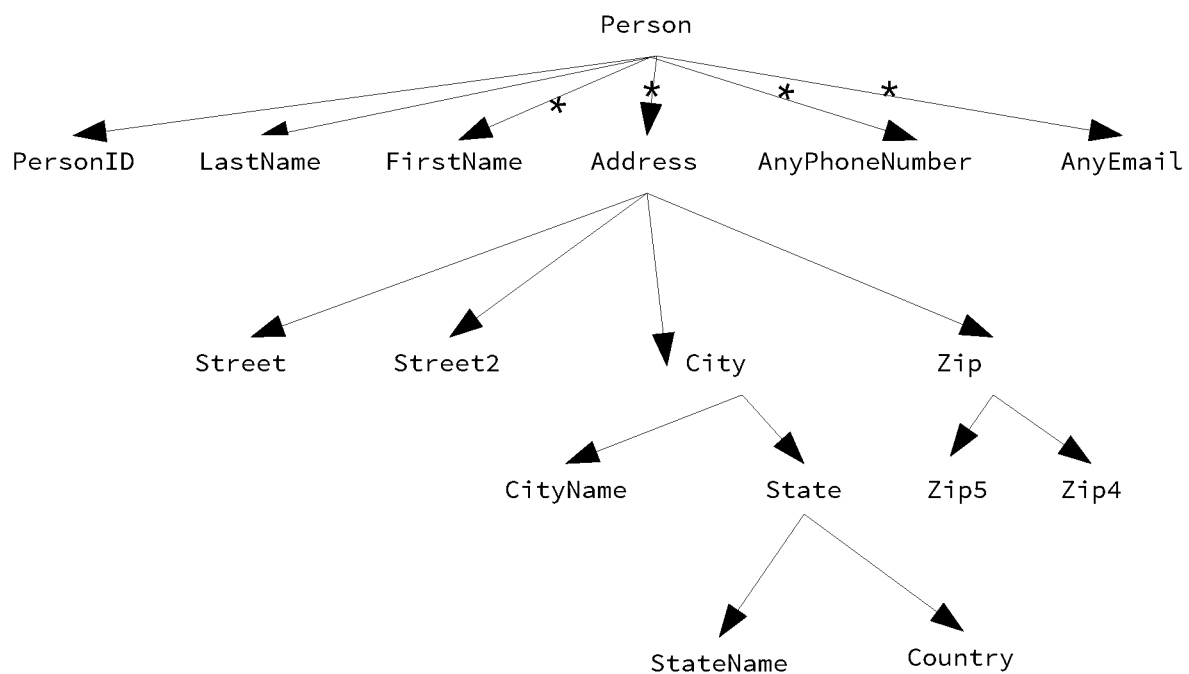
Figure 27: Object Structure for Person

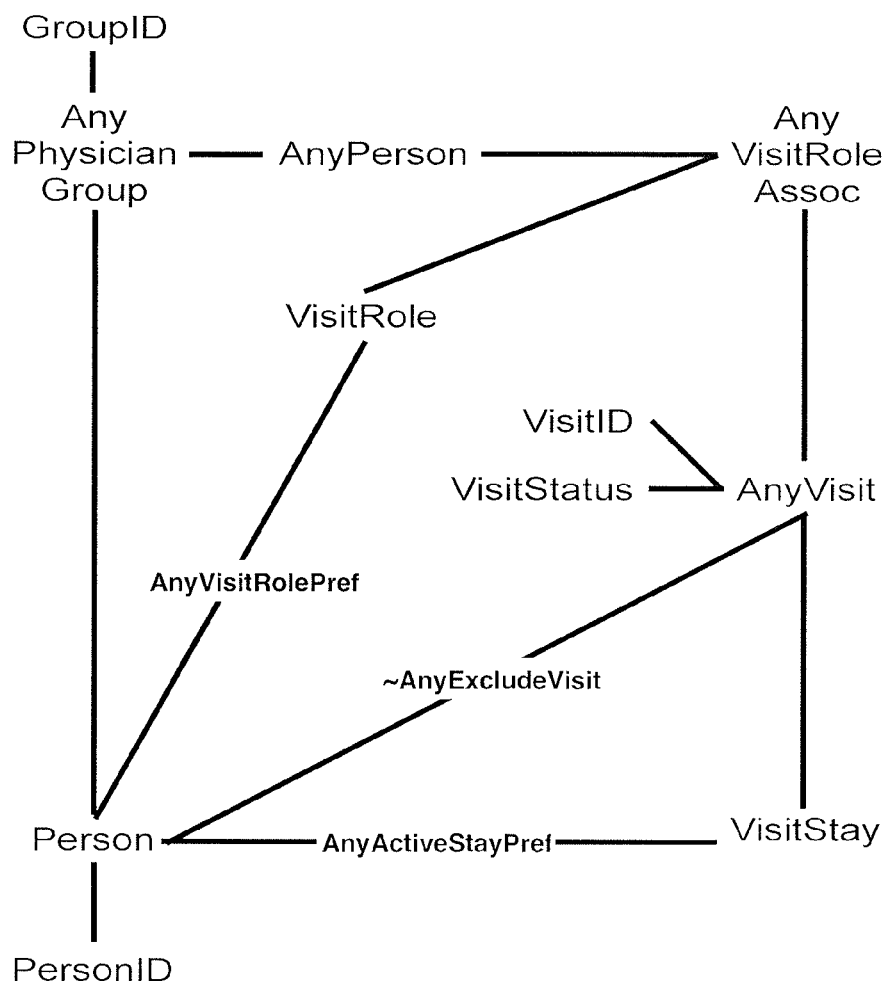
Figure 28: My Patients Query Primal Graph

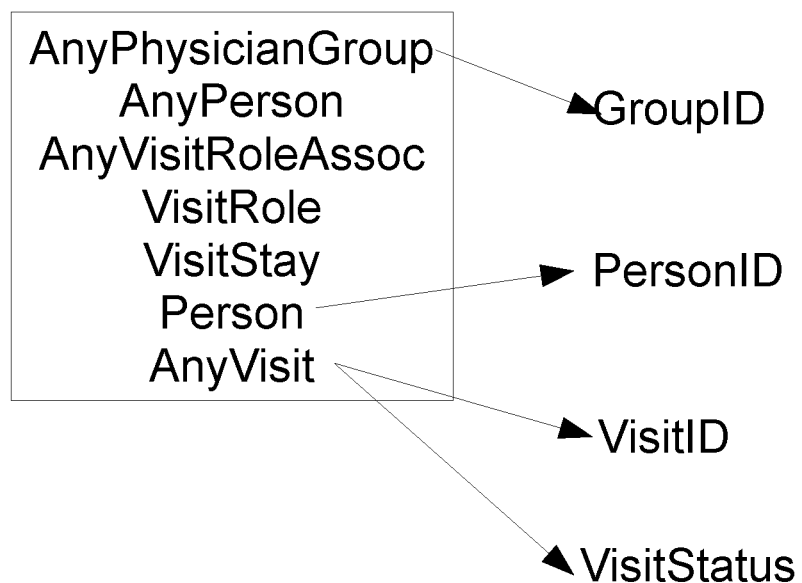
Figure 29:My Patients Query Constraint Graph

The constraint graph using the map by feature from 2610
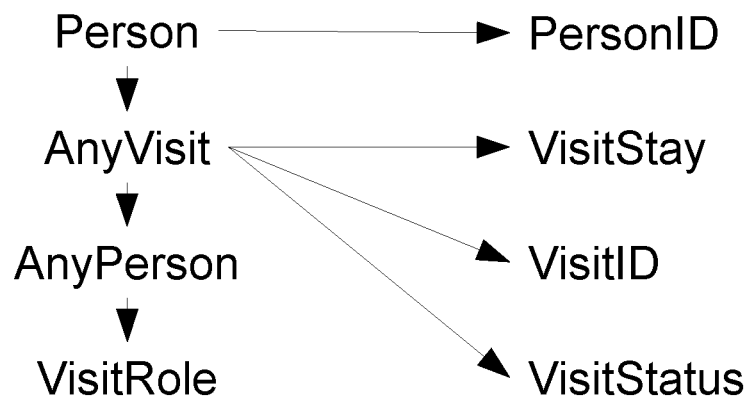
Figure 30: The Constraint Graph Using the Map By Feature 2610

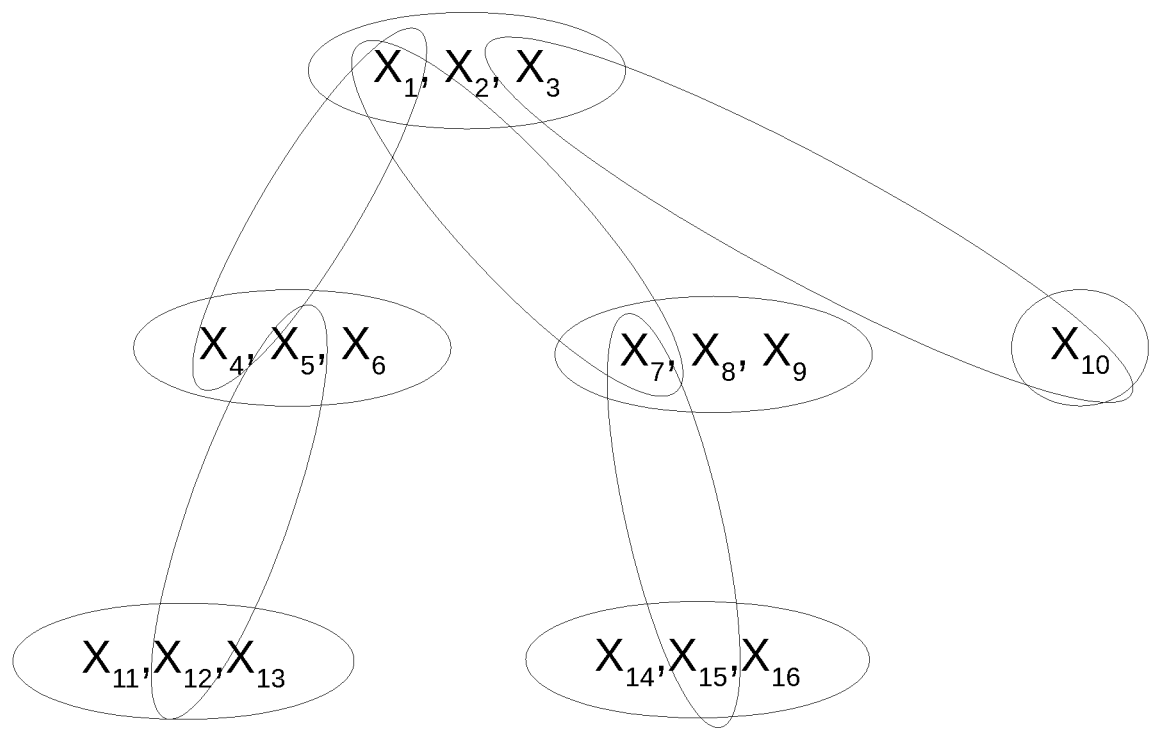
Figure 31: Generalized Object Structure

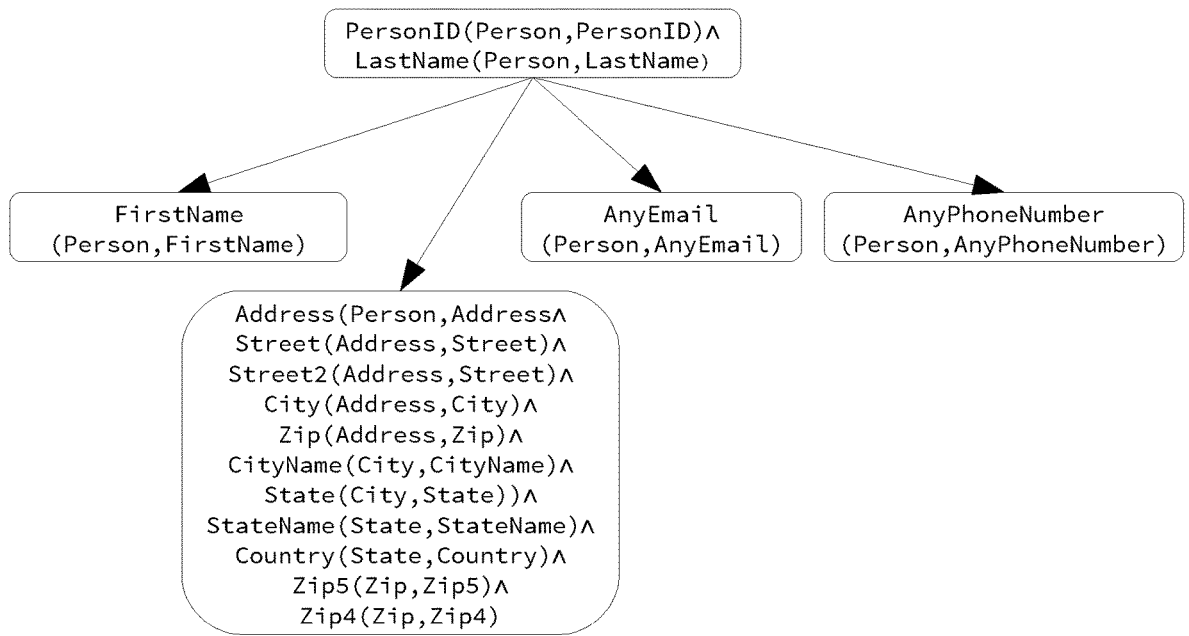
Figure 32: Chained Expression Tree For Person Query

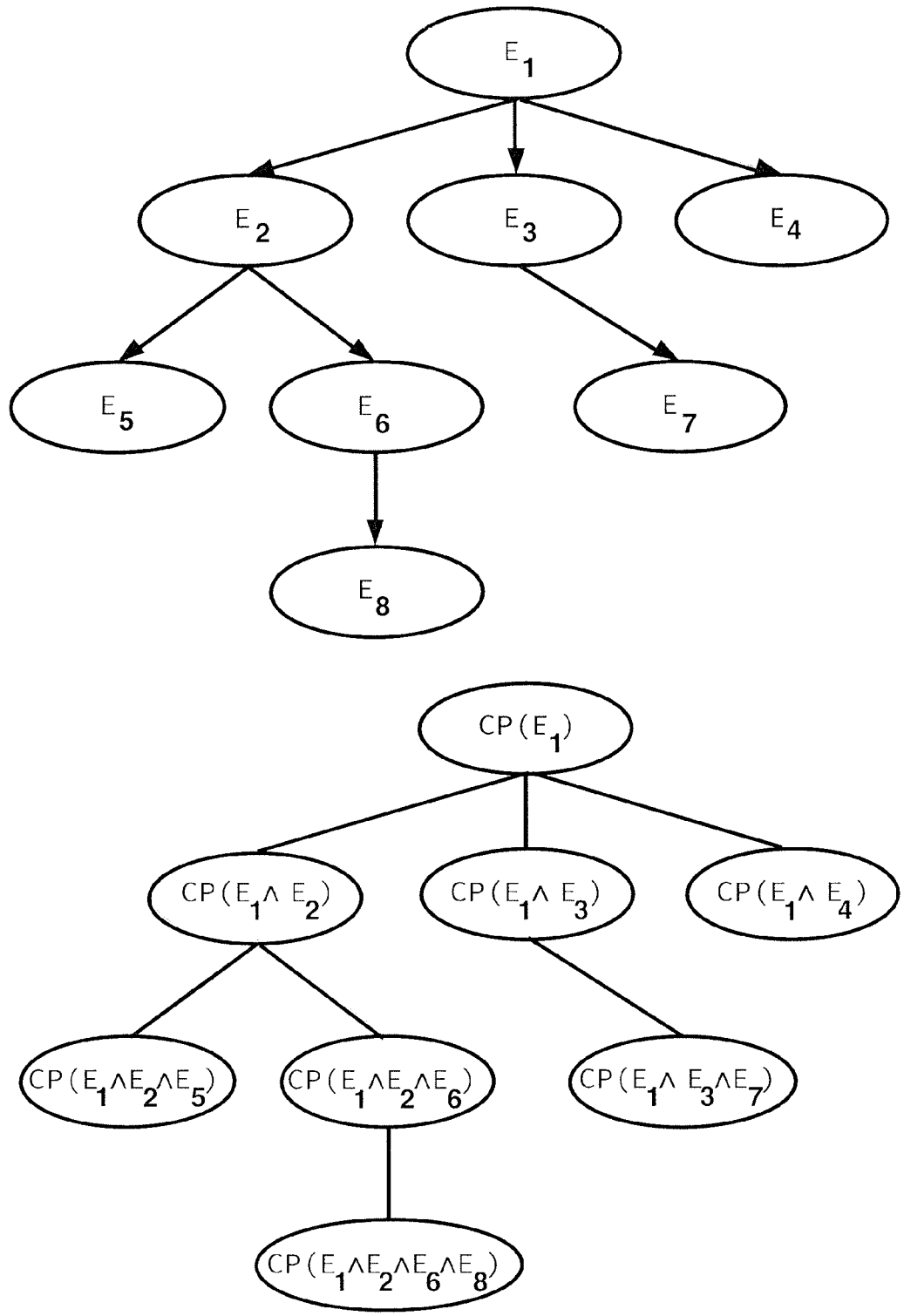
Figure 33: Chained Expressions and Chained Constraint Problems

Finding a solution structure using Arc Consistent Method

```
public boolean arcConsistent(AssignmentGraph ast){                          3410
      Queue<Link> queue = new ArrayDeque<>();
      queue.addAll(Links(TH(ast)));
      while(!queue.isEmpty()){
            if(!arcConsistent(queue.poll(),ast,queue)){return false;}
      }
      return true;
}
```

```
public boolean arcConsistent(                                               3420
            Link link,AssignmentStructure ast,Queue<Link> queue){
      Variable v1 = link.first(),v2= link.second();
      Node n1 = Node(TH(ast), v1), n2 = Node(TH(ast),v2);
      Set<Assignment> ns1 = new HashSet<>(),ns2 = new HashSet<>(),
            ls = new HashSet<>();
      Map<Object,Set<Object>> map = GroupBy(ast, v1, v2);
      if(IsEmpty(map)) return false;
      for(Map.Entry<Object, Set<Object>> entry : map.entrySet()){
            Object val1 = entry.getKey();
            Set<Assignment> s1 = Restrict(Assign(NAS(ast),n1),v1,val1);
            if(IsEmpty(s1)) continue;
            boolean found = false;
            for(Object val2 : entry.getValue()){
                  Set<Assignment> s2 =
Restrict(Assign(NAS(ast),n2),v2,val2);
                  if(IsEmpty(s2)) continue;
                  found = true;
                  ns2.addAll(s2);
                  ls.add(Assignment(v1, val1, v2, val2));
            }
            if(found){ns1.addAll(s1);}
      }
      if(IsEmpty(ls)) return false;
      LAS(ast).remove(Assign(LAS(ast),link).removeAll(ls));
      NAS(ast).remove(Assign(NAS(ast),n1).removeAll(ns1));
      NAS(ast).remove(Assign(NAS(ast),n2).removeAll(ns2));
      return true;
}
```

Figure 34: Finding a solution structure using Arc Consistent Method

Navigating an assignment structure

FirstName(Person,FirstName)∧LastName(Person,LastName)∧                                     3510
        PersonID(Person,PersonID)∧AnyEmail(Person,AnyEmail)

{AnyEmail}

{FirstName} — {Person} — {PersonID}                                                        3520

{LastName}

```
public static void navigate(AssignmentStructure ast,                                       3530
        Variable Person, Variable PersonID,
        Variable FirstName, Variable LastName, Variable AnyEmail){
    Set<ASTuple> asTuples = GetASTS(ast, Node(Person));
    for(ASTuple asTuple : asTuples){
        ASObject personObj = GetASO(asTuple, Person);
        System.out.println("FirstName=" + getValue(personObj,FirstName)+
                    " LastName=" + getValue(personObj,LastName)+
                    " PersonID=" + getValue(personObj,PersonID)+
                    " Emails=" + getValues(personObj,AnyEmail));
    }
}
```

```
public static Object getValue(ASObject asObject, Variable f){                              3540
    Set<Object> values = getValues(asObject,f);
    if(values == null) return null;
    return values.iterator().next();
}
```

```
public static Set<Object> getValues(ASObject asObject, Variable f){                        3550
    Set<ASTuple> fTuples = GetASTS(asObject, f);
    if(IsEmpty(fTuples)) return null;
    Set<Object>values = new HashSet<>();
    for(ASTuple fTuple : fTuples){
        ASObject fObject = GetASO(fTuple, f);
        values.add(GetValue(fObject));
    }
    return values;
}
```

Figure 35: Navigating an assignment structure

Creating result structures from assignment structures

```
public static Result getResult(                                                      3610
        OrderedAssignmentStructure oas, Variable v, Object a){
    Result r = Result(v,a);
    Set<Variable> oFields = OrderedFields(OTH(oas),v);
    if(IsEmpty(oFields)) return r;
    Map<Variable,Set<Assignment>> fields = Assign(oas,v,a);
    for(Variable f : oFields){
        Node nf = Node(OTH(oas),f);
        if(nf.size()==1){
            AddResultField(r,f,getResults(oas,f,fields.get(f)));
        }
        else{
            AddResultTupleField(r,f,getResultTuples(oas,nf,fields.get(f)));
        }
    }
    return r;
}
```

```
public static Set<Result> getResults(                                                3620
        OrderedAssignmentStructure oas, Variable f, Set<Assignment> assigns){
    if(IsEmpty(assigns)) return emptySet();
    Set<Result> results = new HashSet<>();
    for(Assignment assign : assigns){
        results.add(getResult(oas, f, assign.get(f)));
    }
    return results;
}
```

```
public static Set<ResultTuple> getResultTuples(                                      3630
        OrderedAssignmentStructure oas, Node n, Set<Assignment> assigns){
    if(IsEmpty(assigns)) return emptySet();
    Set<ResultTuple> resultTuples = new HashSet<>();
    for(Assignment assign : assigns){
        ResultTuple rt = ResultTuple(assign);
        resultTuples.add(rt);
        for(Variable v : n){
            AddResult(rt, v, getResult(oas, v, assign.get(v)));
        }
    }
    return resultTuples;
}
```

```
public static Set<Result> getResults(AssignmentGraph ast, Node n){                   3640
    Variable v = n.iterator().next();
    return getResults(OAG(ast,n),v, Assign(NAS(ast),n));
}
```

```
public static Set<ResultTuple> getResultTuples(AssignmentGraph ast, Node n){         3650
    return getResultTuples(OAG(ast,n), n, Assign(NAS(ast),n));
}
```

Figure 36: Creating result structures from assignment structures

Finding a solution structure of an acyclic constraint problem tree

```
public AssignmentGraph solve(ACPTree acpt){
      return solve(acpt, Root(acpt),null,null);
}
public AssignmentGraph solve(
          ACPTree acpt,ConstraintProblem cp1,
          ConstraintProblem cpp,AssignmentGraph agParent){
      Set<Variable> root = cpp == null ? null : Root(acpt,cp1);
      ConstraintProblem cp = root == null ? cp1
          : Add(cp1, Induced(agParent, root));
      AssignmentGraph ag = SolGraph(cp);
      ag = Merge(agParent,ag);
      List<ConstraintProblem> cpcs = Children(acpt, cp);
      for(ConstraintProblem cpc : cpcs){
            ag = solve(acpt,cpc,cp1, ag);
      }
      return ag;
}
```

Figure 37: Finding a solution structure of an acyclic constraint problem tree

Extended BNF of Query Expressions

| | |
|---|---|
| `qexpr : VARNAME varrename? restriction? has? find?` | 3810 |
| `has  : '.' K_HAS  '(' qexpr (','qexpr)* ')'` | 3820 |
| `find : '.' K_FIND '(' qexpr (','qexpr)* ')'` | 3830 |
| `restriction : '.' K_IS '(' value (',' value)* ')'` | 3840 |
| `varrename : asrename | eqrename | therename;`<br>`asrename :('.' K_AS '(' STRING_LITERAL ')') therename?;`<br>`eqrename:('.' K_EQ  '(' VARNAME ')') therename?;`<br>`therename: '.' K_THE  '(' VARNAME ')';` | 3850 |

Figure 38: Extended BNF of Query Expressions

Expression Conversion Utility methods

```
public Object evalValue(ParserRuleContext ctx){
     TerminalNode tn = ctx.getToken(NUMERIC_LITERAL,0);
     if(tn != null){return new Integer(tn.getText());}
     String s = ctx.getToken(STRING_LITERAL,0).getText();
     return s.substring(1,s.length()-1);}
```

```
public Object evalValue(ParserRuleContext ctx){
     TerminalNode tn = ctx.getToken(NUMERIC_LITERAL,0);
     if(tn != null){return new Integer(tn.getText());}
     String s = ctx.getToken(STRING_LITERAL,0).getText();
     return s.substring(1,s.length()-1);}
```

```
public Set<Object> values(ParserRuleContext ctx){
     if(ctx == null) return Collections.emptySet();
     Set<Object> result = Collections.emptySet();
     for(ParseTree pt : ctx.children){
          if(pt instanceof TerminalNode) continue;
          if(result.isEmpty()){result = new HashSet<>();  }
          result.add(evalValue((ParserRuleContext)(pt)));}
     return result;}
```

```
public Rename RN(VarrenameContext ctx){
     Rename result = new Rename();
     if(ctx == null) return result;
     AsrenameContext aCtx = ctx.asrename();
     if(aCtx != null){
          TerminalNode tn = aCtx.STRING_LITERAL();
          if(tn != null){
               String s=tn.getText();
               result.varRename = s.substring(1,s.length()-1);
          }
          RN(result, aCtx.therename());
          return result;}
     EqrenameContext eCtx = ctx.eqrename();
     if(eCtx != null){
          result.varRename = EV(eCtx.VARNAME().getText()).getName();
          RN(result, eCtx.therename()); }
     RN(result, ctx.therename());
     return result;}
```

```
public void RN(Rename result, TherenameContext tCtx){
     if(tCtx == null) return;
     result.relRename = EV(tCtx.VARNAME().getText()).getName();}
```

```
public static <T extends ParserRuleContext> T
     getRuleContext(ParserRuleContext ctx, Class<? extends T> ct) {
     List<T> ctxs = ctx.getRuleContexts(ct);
     if(ctxs==null || ctxs.isEmpty()){return null;}
     return ctxs.get(0);}
```

Figure 39: Conversion Utility methods

Converting a query expression to a query template

```
public ExtendedQuery eval(QexprContext ctx){
      Variable var = EV(ctx.VARNAME().getText());
      Rename rename = RN(ctx.varrename());
      Variable v = rename(var,rename.varRename);
      Set<Object> rs = values(ctx.restriction());
      Map<Variable,Set<Object>> restrict = null;
      if(!isEmpty(rs)){
            restrict = new HashMap<>();
            restrict.put(v, rs);
      }
      ExtendedQuery q = QE(v,null,restrict,v,rename.relRename!=null?
rename.relRename : vn(var) );
      HasContext hasCtx = ctx.has();
      if(hasCtx != null){
            for(ExtendedQuery iq : merge(hasCtx.qexpr(),v)){
                  q.addRequired(iq.getRequired());
                  q.addAllOptional(iq.getOptionalExpressions());
                  q.addRestrictions(iq.getRestrictions());
            }
      }
      FindContext findCtx = ctx.find();
      if(findCtx != null){
            for(ExtendedQuery iq : merge(findCtx.qexpr(),v)){
                  q.addOptional(iq);
            }
      }
      return q;
}
public List<ExtendedQuery> merge(List<QexprContext> exprs, Variable
attrVar){
      List<ExtendedQuery> queries = new ArrayList<>(exprs.size());
      for(QexprContext eCtx : exprs){
            ExtendedQuery iq = eval(eCtx);
            BinaryRelationHeader rh = resolve(iq.getRelationName(),
attrVar.getDomainType(), iq.getVariable().getDomainType());
            iq.addRequired(new BinaryAtomicExpression(rh, attrVar,
iq.getVariable()));
            queries.add(iq);
      }
      return queries;
}
```

Figure 40: Converting a query expression to a query template

Extended BNF of Instance Expressions

| | |
|---|---|
| `onerestriction: '.' K_IS '(' value ')'`<br>`restriction : '.' K_IS '(' value (',' value)* ')'` | 4110 |
| `simplekey : VARNAME onerestriction` | 4120 |
| `existkey1 : VARNAME '.' exists anyupdates;`<br>`isexistkey: VARNAME '.' K_IS '(' existkey1 ')';`<br>`existkey : existkey1 | isexistkey;`<br>`anyupdates: ('.' (updt | add | rem | replace))*;`<br>`existorsimplekey : simplekey |existkey ;`<br>`exists : K_EXISTS '(' existorsimplekey (',' existorsimplekey)* ')';` | 4130 |
| `instkey1 : VARNAME '.' instance instupdates;`<br>`isinstkey :  VARNAME '.' K_IS '(' instkey1 ')';`<br>`instkey : instkey1 | isinstkey;`<br>`instupdates: ('.' (updt | add))*;`<br>`instorsimplekey : simplekey | existkey | instkey ;`<br>`instance : K_INSTANCE '('instorsimplekey(',''instorsimplekey)*')';` | 4140 |
| `newinstkey1 : VARNAME '.' newinstance newinstupdates;`<br>`isnewinstkey :  VARNAME '.' K_IS '(' newinstkey1 ')';`<br>`newinstkey : newinstkey1 | isnewinstkey;`<br>`newinstupdates: ('.' updt)*;`<br>`anyinstkey : existkey | instkey | newinstkey;`<br>`anykey : simplekey | existkey | instkey | newinstkey;`<br>`newinstance : K_NEWINSTANCE '(' anykey (',' anykey)* ')';` | 4150 |
| `existing: VARNAME '.' K_EXISTING '(' exists (',' exists)* ')';`<br>`simplefield : VARNAME restriction;`<br>`existsfield : simplefield | existing | existkey ;`<br>`instlist : exists | instance | newinstance;`<br>`instances : VARNAME '.' K_INSTANCES '(' instlist (',''instlist)* ')';`<br>`anyfield : simplefield | existing | instances | anyinstkey;` | 4160 |
| `add : K_ADD '(' anyfield (',' anyfield)* ')'` | 4170 |
| `updt : K_UPDATE '(' anyfield (',' anyfield)* ')'` | 4180 |
| `rem: K_REMOVE '(' existsfield (',' existsfield)* ')'` | 4190 |
| `replace: K_REPLACE '('(repsimple|repent|repent2)')';`<br>`repsimple:  simplekey (',' value)+;`<br>`repent: existkey (',' instlist)+;`<br>`repent2 : existkey (',' anyinstkey)+;` | 41100 |

Figure 41: Extended BNF of Instance Expressions

Convert Instance Expression To Instance Structure

```
public UInstStruct evalInstanceStruct(ParserRuleContext anyInstCtx){
      UInstStruct result = new UInstStruct();
      ParserRuleContext ctx = getRuleContext(anyInstCtx,
ExistkeyContext.class);
Class<? extends ParserRuleContext> key1, iskey,key, keylist,updatesClass;
      if(ctx != null){
            result.setIT(InstanceType.EXISTS);
            key1=Existkey1Context.class;
            iskey=IsexistkeyContext.class;
            key=ExistorsimplekeyContext.class;
            keylist=ExistsContext.class;
            updatesClass=AnyupdatesContext.class;}
      else {ctx = getRuleContext(anyInstCtx, InstkeyContext.class);
            if(ctx != null){
                  result.setIT(InstanceType.INSTANCE);
                  key1=Instkey1Context.class;
                  iskey=IsinstkeyContext.class;
                  key=InstorsimplekeyContext.class;
                  keylist=InstanceContext.class;
                  updatesClass=InstupdatesContext.class;}
            else{ ctx = getRuleContext(anyInstCtx,
NewinstkeyContext.class);
                  if(ctx == null) return null;
                  result.setIT(InstanceType.NEWINSTANCE);
                  key1=Newinstkey1Context.class;
                  iskey=IsnewinstkeyContext.class;
                  key=AnykeyContext.class;
                  keylist=NewinstanceContext.class;
                  updatesClass=NewinstupdatesContext.class;}}
      ParserRuleContext isCtx = getRuleContext(ctx, iskey);
      if(isCtx != null){
            result.setRelationName(vn(EV(isCtx.getToken(VARNAME,
0).getText())));
            ctx =isCtx; }
      ParserRuleContext key1Ctx = getRuleContext(ctx,key1);
      Variable v = EV(key1Ctx.getToken(VARNAME, 0).getText());
      if(result.getRelationName()==null){result.setRelationName(vn(v));}
      result.setET(dn(v));
      ParserRuleContext keylistCtx = getRuleContext(key1Ctx, keylist);
      List<ParserRuleContext> keyCtxs = keylistCtx.getRuleContexts(key);
      for(ParserRuleContext kctx : keyCtxs){
            if(evalSimpleKey(result, kctx)) continue;
            UInstStruct ust = evalInstanceStruct(kctx);
            BinaryRelationHeader rh = resolve(ust.getRelationName(),
result.getET(), ust.getET());
            result.putIKM(rh, ust);}
      processUpdate(result, key1Ctx,updatesClass);
      return result;}
```

Figure 42A: Convert Instance Expression To Instance Structure

Process Update Operations

```
public void processUpdate(UInstStruct result,
          ParserRuleContext key1Ctx,
          Class<? extends ParserRuleContext> updatesClass){
     ParserRuleContext usCtx = getRuleContext(key1Ctx, updatesClass);
     if(usCtx == null || usCtx.children==null ||
usCtx.children.isEmpty()) return;
     for(ParseTree pt : usCtx.children){
          if(pt instanceof TerminalNode) continue;
          ParserRuleContext uCtx = (ParserRuleContext)pt;
          OpType opType = null;
          for(ParseTree upt : uCtx.children){
               if(opType == null){
                    opType =
OpType.valueOf(((TerminalNode)upt).getText().toUpperCase());
                    continue;
               }
               if(upt instanceof TerminalNode) continue;
               if(opType==OpType.REPLACE){
                    processReplace(result,(ReplaceContext)uCtx);
               }
               else{
                    processOpType(result, opType,
(ParserRuleContext)upt);
               }
          }
     }
}
```

Figure 42B

Process Replace

```
public void processReplace(UInstStruct result,ReplaceContext ctx){
      RepsimpleContext rsCtx = ctx.repsimple();
      RepentContext reCtx = ctx.repent();
      Repent2Context re2Ctx = ctx.repent2();
      if(rsCtx!= null){
            SimplekeyContext skCtx = rsCtx.simplekey();
            Variable v = EV(skCtx.VARNAME().getText());
            BinaryRelationHeader rh = resolve(vn(v), result.getET(),
dn(v));
            Object obj = value(skCtx.onerestriction());
            List<ValueContext> vlCtxs= rsCtx.value();
            HashSet<Object> vals = new HashSet<>();
            for(ValueContext vCtx:vlCtxs){vals.add(evalValue(vCtx));}
            result.addPR(rh, obj, vals);}
      else if(reCtx != null){
            UInstStruct uinst = evalInstanceStruct(reCtx);
            String valType = uinst.getET();
            BinaryRelationHeader rh = resolve(uinst.getRelationName(),
result.getET(), valType);
            Set<UInstStruct> uinsts = new HashSet<>();
            for(InstlistContext instListCtx : reCtx.instlist()){
                  uinsts.add(evalInstList(instListCtx, valType));}
            result.addIR(rh, uinst, uinsts);}
      else{UInstStruct uinst = evalInstanceStruct(re2Ctx);
            String valType = uinst.getET();
            BinaryRelationHeader rh = resolve(uinst.getRelationName(),
valType, uinst.getET());
            Set<UInstStruct> uinsts = new HashSet<>();
            for(AnyinstkeyContext anyInstKeyCtx:re2Ctx.anyinstkey()){
                  uinsts.add(evalInstanceStruct(anyInstKeyCtx));}
            result.addIR(rh, uinst, uinsts);}}
```

Figure 43: Process Replace

Process add,remove,update operations

```
public void processOpType(UInstStruct uinst,OpType op,ParserRuleContext
fCtx){
      if(evalSimpUpdt(uinst, op, fCtx)) return;
      if(evalExisting(uinst,op,fCtx)) return;
      if(op==OpType.REMOVE){evalKey(uinst,op,fCtx);}
      else if(evalInstances(uinst,op,fCtx))return;
      evalAnyInst(uinst,op,fCtx);}
```

```
public boolean evalSimpUpdt(UInstStruct uinst,OpType op,ParserRuleContext
ctx){
      SimplefieldContext simpleCtx =
getRuleContext(ctx,SimplefieldContext.class);
      if(simpleCtx == null) return false;
      Variable v = EV(simpleCtx.VARNAME().getText());
      BinaryRelationHeader rh = resolve(vn(v), uinst.getET(), dn(v));
      uinst.addPM(op,rh, values(simpleCtx.restriction()));
      return true;}
```

```
public boolean evalExisting(UInstStruct uinst,OpType op,ParserRuleContext
ctx){
      ExistingContext eCtx = getRuleContext(ctx, ExistingContext.class);
      if(eCtx == null) return false;
      Variable var = EV(eCtx.VARNAME().getText());
      String relName = vn(var),valType = dn(var),attrType=uinst.getET();
      BinaryRelationHeader rh = resolve(relName, attrType, valType);
      for(ExistsContext existCtx : eCtx.exists()){
            UInstStruct innerUinst = new UInstStruct();
            innerUinst.setET(valType);
            innerUinst.setIT(InstanceType.EXISTS);
            for(ExistorsimplekeyContext kctx :
existCtx.existorsimplekey()){
                  if(evalSimpleKey(innerUinst, kctx)) continue;
                  UInstStruct ust = evalInstanceStruct(kctx);
                  innerUinst.putIKM(resolve(ust.getRelationName(),valType,
ust.getET()),ust);}
            uinst.addIM(op, rh, singleton(innerUinst));}
      return true;}
```

```
public boolean evalInstances(UInstStruct uinst,OpType op,ParserRuleContext
ctx){
      InstancesContext eCtx = getRuleContext(ctx, InstancesContext.class);
      if(eCtx == null) return false;
      Variable var = EV(eCtx.VARNAME().getText());
      String relName = vn(var),valType=dn(var),attrType=uinst.getET();
      BinaryRelationHeader rh = resolve(relName, attrType, valType);
      for(InstlistContext instListCtx : eCtx.instlist()){
            UInstStruct innerUinst = evalInstList(instListCtx, valType);
            uinst.addIM(op, rh, singleton(innerUinst));}
      return true;}
```

```
public boolean evalAnyInst(UInstStruct uinst,OpType
opType,ParserRuleContext ctx){
      AnyinstkeyContext anyCtx
=getRuleContext(ctx,AnyinstkeyContext.class);
      if(anyCtx == null) return false;
      return evalKey(uinst,opType, anyCtx, true);}
```

Figure 44 Process add,remove,update operations

Process Update Utility Methods

```java
public boolean evalKey(UInstStruct uinst,OpType op,ParserRuleContext ctx){
      UInstStruct inner = evalInstanceStruct(ctx);
      if(inner == null) return false;
      String relName = inner.getRelationName();
      BinaryRelationHeader rh =
resolve(relName,uinst.getET(),inner.getET());
      uinst.addIM(op, rh, Collections.singleton(inner));
      return true;
}
```

```java
public UInstStruct evalInstList(InstlistContext ctx, String vt){
      UInstStruct innerUinst = new UInstStruct();
      innerUinst.setET(vt);
      ExistsContext exCtx = ctx.exists();
      if(exCtx!=null){
            innerUinst.setIT(InstanceType.EXISTS);
            for(ExistorsimplekeyContext kctx : exCtx.existorsimplekey()){
                  if(evalSimpleKey(innerUinst, kctx)) continue;
                  UInstStruct ust = evalInstanceStruct(kctx);
                  BinaryRelationHeader irh =
resolve(ust.getRelationName(), vt, ust.getET());
                  innerUinst.putIKM(irh, ust);}}
      else{InstanceContext instCtx = ctx.instance();
            if(instCtx!= null){
                  innerUinst.setIT(InstanceType.INSTANCE);
                  for(InstorsimplekeyContext kctx :
instCtx.instorsimplekey()){
                        if(evalSimpleKey(innerUinst, kctx)) continue;
                        UInstStruct ust = evalInstanceStruct(kctx);
                        BinaryRelationHeader irh =
resolve(ust.getRelationName(), vt, ust.getET());
                        innerUinst.putIKM(irh, ust);}}
            else{NewinstanceContext newinstCtx = ctx.newinstance();
                  if(newinstCtx!= null){
                        innerUinst.setIT(InstanceType.NEWINSTANCE);
                        for(AnykeyContext kctx : newinstCtx.anykey()){
                              if(evalSimpleKey(innerUinst, kctx))
continue;
                              UInstStruct ust = evalInstanceStruct(kctx);
                              BinaryRelationHeader irh =
resolve(ust.getRelationName(), vt, ust.getET());
                              innerUinst.putIKM(irh, ust);} }
            }
      }
      return innerUinst;
}
```

Figure 45: Process Update Utility Methods

AUTOMATIC OBJECT INFERENCE IN A DATABASE SYSTEM

CROSS-REFERENCE TO RELATED APPLICATIONS

This application is a continuation of U.S. patent application Ser. No. 16/518,900, filed Jul. 22, 2018, which claims the benefit of U.S. Provisional Application No. 62/701,255 filed Jul. 20, 2018, the content of which is incorporated by reference for all that it discloses.

BACKGROUND

Developing and maintaining data-centric applications can be costly. A high degree of skill and inordinate man-hours is often required. Application code is often complex, convoluted and not easily readable. As a result, there is a strong impetus to reduce the complexity of implementing such systems.

From early on in the development and use of databases, numerous models for representing data have been formulated. The relational model, as exemplified in relational database management systems (RDBMS), has predominated the market. Soon after the introduction and use of RDBMSs, other models were developed. The Entity-Relationship model was introduced as a higher level model from which a relational model can be formulated. Object-oriented data models were also proposed. In one approach, standalone object oriented databases (OODBMS) were introduced without any reliance on an underlying RDBMS. In another approach, the OODBMS works in conjunction with an underlying RDBMS. The second approach remains popular and several software tools, generally known as Object-Relational Mapping (ORM) tools are available to aid in the implementation such systems.

For reasons including, but not limited to those discussed above, it is often the case that two or more data modeling frameworks are used to implement a data-centric application. Such an approach significantly increases the complexity and effort required to develop applications. The running application of such systems tends to be more complex, less efficient and harder to debug. The application code also tends to be more complex, less readable and harder to maintain.

Consider, for example, a common approach, whereby data in the application layer is modeled using object oriented "class" constructs and stored in an underlying RDBMS. Suppose that the application requires storing "person" data, such as first and last names, addresses and emails. Assume also that each person has at most one first name, last name and address, but can have multiple emails. One might construct a Person class with getter methods, getFirstName, getLastName, getAddress and getEmails corresponding to each attribute. Note that getEmail method may return a collection of Strings. The getAddress method may return an instance of an Address class. In the RDBMS a Person table may have columns, FirstName and LastName, but cannot directly store the emails (since there may be more than one), nor the address (since address is not one of the fixed types allowed). Instead other "join tables", such as an Email table and a PersonAddress table can be created. While there are some differences in the models, there is also some duplication.

Consider, that to store or update information into the database, there must be a way to convert instances of the Person class into inserts or updates of one or more tables in the underlying RDBMS. Similarly, consider, that an application requires functionality to extract all persons with last name of "Smith", along with their first name, address and emails. To do so, one would have to formulate one or more SQL queries, execute each query against the RDBMS and then convert and combine the resulting rows to a collection of person objects. The coding required to maintain both models adds a great deal of complexity to the system and to the effort required to develop and maintain the system.

ORM techniques and software tools aim to reduce the effort required to develop and maintain systems with a object-oriented model in the application layer and an underlying RDBMS model. However, such tools often require a high degree of skill and training. Even with the proper training, the code is often hard to read and to write. Furthermore, in practice, developers often abandon such tools, and resort to straight coding of the SQL queries and data manipulation statements to reconcile the models.

Generally speaking while RDBMS continue to predominate, the DBMS landscape is increasing in complexity. Developers face a daunting task of learning about all the alternative approaches, with limited guidance from vendors.

SUMMARY

Exemplary embodiments described herein enable applications to be based on one underlying binary relational model, described in more detail below. Remarkably, application-layer object structures are automatically inferred from queries. In accordance with an embodiment, database applications may iterate through the collection of returned structures, accessing the data in each structure using getter methods. Database developers are thus freed from laborious tasks such as designing classes in the application layer, the construction of object-relational mappings, and the complex programming to transform rows into collections of object structures.

In accordance with embodiments, object structure responses returned from queries are not based on a fixed object model. Consequently, rich object structures that have greater applicability than traditional ORM systems may be generated from queries.

Query structures of exemplary embodiments are simple, easy to formulate, highly readable and powerful. Often one query may suffice in cases that would otherwise require the formulation and independent execution of multiple SQL statements.

Formulating a binary relational model, as used in exemplary embodiments, is significantly simpler than previously existing approaches used in RDBMSs. In a binary relational model, consistent with embodiments described herein, a relationship between non-primitive entities may be directly expressed without the need for alternative join tables. For example, embodiments of the present invention enable the expression of a relationship between a person and an address. Similarly, a binary relationship may be expressed that is not a property. For example, the relationship between a person and the emails associated with that person can be expressed as a binary relation. Furthermore the cardinality of binary relations can be directly expressed, e.g., the relationship between a person and an address is one to one, whereas the relationship between a person and the emails is one to many. The inverse relationships can also be expressed. For example the inverse of the relationship between a person and an address is not a property whereas the inverse of the person and email relationship is a property.

Simpler model formulation and query structures and automatic inference of object responses result in significantly fewer lines of code that are easier to construct, more readable, and less convoluted. Overall, development and maintenance costs are substantially reduced. Furthermore, data is stored more efficiently than in traditional RDBMSs, thereby reducing computing resources and permitting for similarly efficient manipulation of data by database applications.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings:

FIG. 3 is a diagram illustrating an exemplary data model for use in automatically inferring query solutions, in accordance with an embodiment of the invention;

FIG. 4 is a diagram illustrating an example query template, in accordance with an embodiment of the invention;

FIG. 5 is a diagram illustrating results of an example query, in accordance with an embodiment of the invention;

FIG. 6 is a diagram illustrating example code for accessing database records using the exemplary query, in accordance with an embodiment of the invention;

FIG. 7 is a diagram illustrating results of an example query, in accordance with an embodiment of the invention;

FIG. 14 is a diagram illustrating an example of a primal hypergraph computed from a cyclic primal graph, in accordance with an embodiment of the invention;

FIG. 15 is a diagram illustrating example code for accessing database records using an exemplary query, in accordance with an embodiment of the invention;

FIGS. 19-46 are diagrams illustrating a database management system and unifying framework, in accordance with embodiments of the invention.

DETAILED DESCRIPTION

Figure 1:
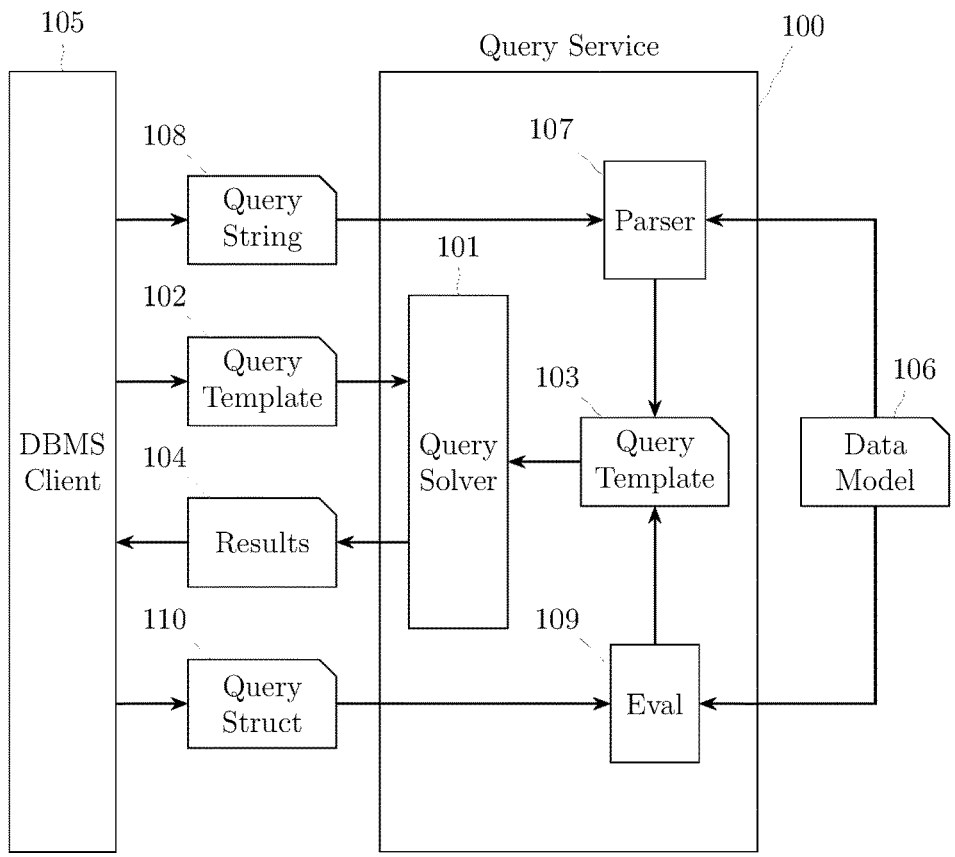
FIG. 1 is a diagram illustrating a system architecture for automatically inferring query solutions, in accordance with an embodiment of the invention.

FIG. 1 depicts an embodiment of a query solver 101 in a query service 100. The query solver outputs results 104, from a query template (102 and 103) issued by the DBMS client 105. The query template encapsulates all the information that is required in a request for data and the query results encapsulates the desired output information. Query results are rich object structures automatically inferred from query templates. The properties of query templates, query results, and the relationship of the query results to query templates are described in greater detail below.

Whereas the query template provides all the desired information of a request, the query service may also provide a means to issue a request using a query string 108, or a query structure 110. To process a query string issued by a dbms client, a parser 107 may be utilized. The parser consults the data model 106 to form a query template 103 from the query string. The resulting query template may then serve as input to the query solver that returns a query result to DBMS client. Similarly the query service can process a query structure utilizing eval 107.

Figure 2:
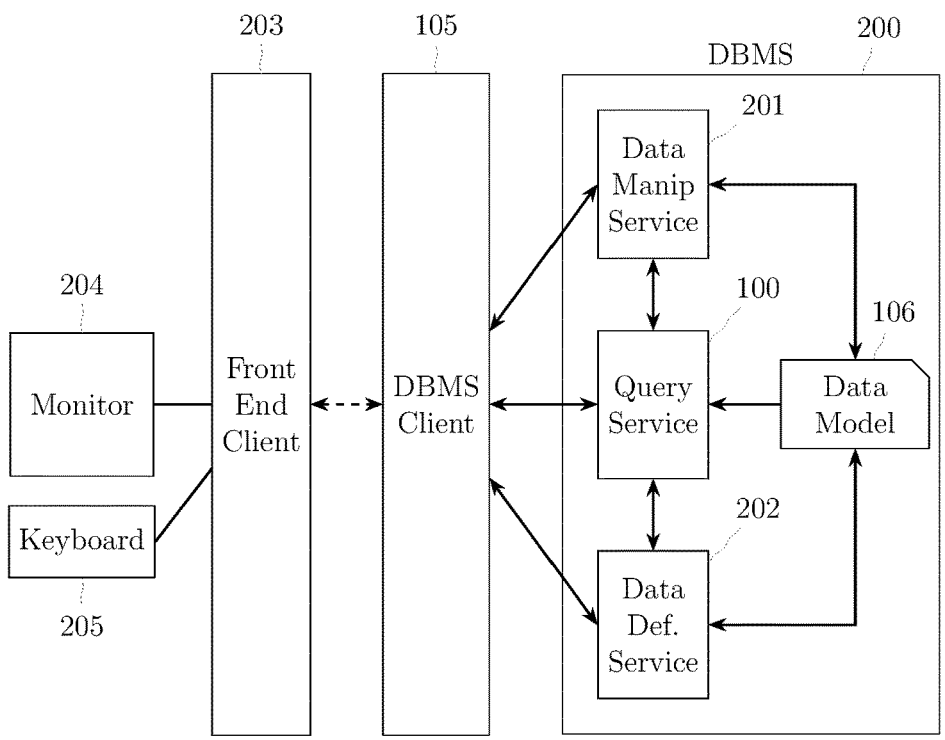
FIG. 2 is a diagram illustrating a system architecture for automatically inferring query solutions, in accordance with an embodiment of the invention.

FIG. 2 illustrates how the query service 100 may be utilized in the context of a DBMS 200. The DBMS has a Data Manipulation Service 201 which provides the means to input information to the data model 106 and a Data Definition Service 202 that provides the means to specify constraints of the data model. Also shown is an example of how the DBMS may fit in the context of a application. The front end client 203 displays information to a user. The user may initiate an information request by typing into the keyboard 205. The front end client sends information to the DBMS client 105 which processes the request.

FIG. 3, depicts a data model. The data model maintains the set of binary relations with property info and the unary sets. FIG. 3 shows information about four persons represented by the objects $P_1$, $P_2$, $P_3$, and $P_4$. Embodiments can vary the data type of persons. For example, it can be a simple string such as "Person:1". Alternatively, it can be a named tuple, of the form {("type", Type), ("id", integer)} where Type is a set of all types. Many other alternatives are possible.

Each table in FIG. 3 depicts a binary relation along with "Property Info" indicated by the terms Prop, Attr, AttrUnique. The term Prop, indicates the binary relation represented in the table is a property constraint. AttrUnique indicates the inverse of the binary relation is a property constraint. Not shown in the figure is PropUnique which indicates both the binary relation and it's inverse are property constraints. The term Attr indicates neither the binary relation nor its inverse is a property constraint.

Note how the data model depicted in FIG. 3 utilizes binary relations to model data along with property info and also that the elements of each tuple of the relation, need not be a primitive type. In contrast, current RDBMSs only allow primitive types and tend to use non-binary relations to model data. For example, when only primitive types are allowed one might use a Person table with a column for each property field, such as person id, first name and last name. For the address it might use an Address table along with a "join table" to model the relationship between addresses and persons. Since email can have multiple values for a person, an additional Email table may be used.

In accordance with embodiments, a table or relation in a traditional RDBS with more than two columns may now be represented by several binary relations between an object type that represents the table along with binary relations for each field. A unary relation may also be used to represent objects of a particular type. The Person example, shown in FIG. 3 illustrates that approach. By permitting elements to be non-primitive types, binary relations permit a more direct declaration of attributes. For example, the rEmail binary relation represents a relation between a person and their emails, even though email is not a property relation. Similarly even though addresses are themselves composed of fields, the relation of person to address can be expressed directly in the binary relation.

FIG. 4 depicts an example query template that represents the query, "Find all persons whose last name is Smith". Referring to FIG. 3, one can observe that there are two persons whose last name is Smith: John Smith with a PersonID of 1, and Mary Smith with a PersonID of 2. Both John and Mary Smith live at the same address: 1 Main St, New York, N.Y., US. John Smith has two emails and Mary Smith has one email.

A query template such as the one shown in FIG. 4 specifies what fields should be in the result. In this case, the fields of the results should include the PersonID, FirstName, LastName, Email and Address fields. Similarly, the fields of the addresses, the city, state and zip are specified in the query template.

In FIG. 4, the ordered pair LastName, {Smith} that appears in the unary templates restricts the results to those persons whose last name is Smith. The ordered pair Person, PersonType, in the unary template restricts the results to only persons that are of type PersonType. Similarly for Address, City, State, and Zip.

As shown in FIG. 4 a query template, in accordance with an embodiment, has two parts. The first part, is a set of atomic templates where each atomic template is comprised of a binary relation with property info and two variables. For example, rPersonID(Person, PersonID) is an atomic template where rPersonID is the binary relation with property info shown in FIG. 3 and having the two variables Person and PersonID. Note that although each binary relation with property info matches a binary relation in the data model shown in FIG. 3, that may not always be the case. Binary relations can be combined in various ways, for example, including but not limited to union, intersection and set difference of relations.

The property constraints of each atomic template are used to determine whether a field of a result should return only one value or multiple values. For example, since rPersonID is a property, the PersonID field of each person will contain only one value, whereas since rEmail is not a property, the Email field will contain a collection of values.

The second part of a query template is the Unary Templates. Unary templates map each variable in the atomic templates to a set. For example, since LastName is associated with the set {Smith} then all results should have a last name of Smith.

A advantage afforded by embodiments of the present invention is the ability to produce complex result structures from query templates alone. The two results of the query template, shown in FIG. 5, have an "object oriented" structure. The first result structure corresponds to information about John Smith whereas the second corresponds to information about Mary Smith. For the first result $P_1$ is the root object from the data model representing John Smith. Following that are the field:value pairs of the result structure. For example, the PersonID field has a value of 1, the FirstName is John, the LastName is Smith. Note that the Email field has multiple values and the Address field itself has a result structure with fields Street, Zip, and City, Similarly Zip and City are result structures. FIG. 6 displays example code for accessing the records in the results. Notably, the query results can be consumed by the database application in an "object-oriented" fashion.

In contrast, when using an Object Relational Mapping approach, in addition to defining the schema of the RDBMS model, a Person class would typically be defined with fields similar to what is shown in FIG. 5. Furthermore, object relational mappings must be specified. Embodiments of this invention automatically infer result structures from the query templates. The automatic inference substantially reduces the amount of coding required and the complexity of the underlying program that extracts the results.

The query under consideration, as stated, "Find all persons whose last name is Smith", on its face indicates a preference for returning a collection of person results. Embodiments of this invention may specify, in addition to a query template, a focus variable. The results shown in FIG. 5 show the results when the focus variable is Person. It is also possible, using the same query template with a different focus variable, to return a different set of results. For example, by choosing Address as the focus variable, the set of results will be addresses rather than persons. For the query template under consideration, since both John and Mary Smith live at the same address, only one result is returned as shown in FIG. 7. In this case, the Address results have a field called Person and that is has a value of two person result structures.

Figure 8:
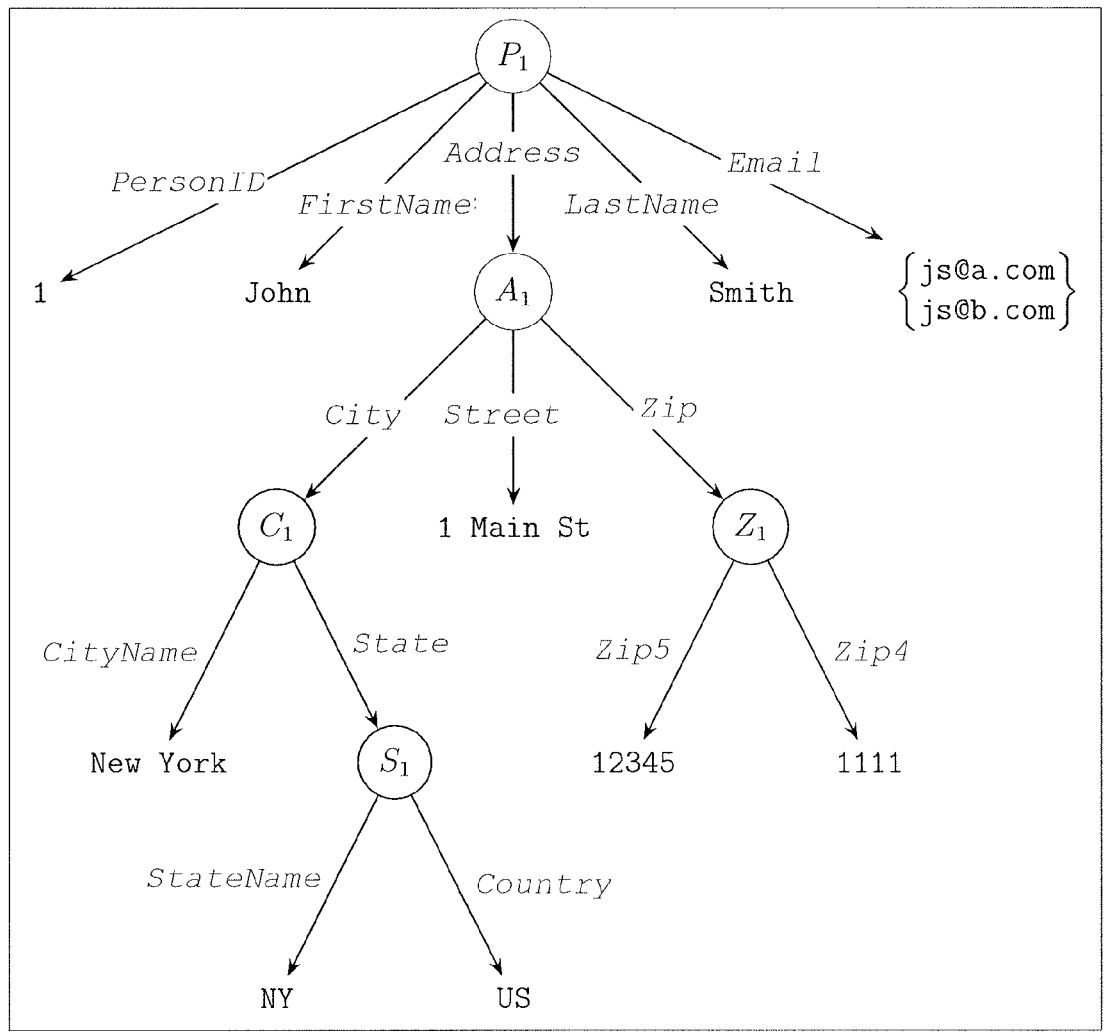
FIG. 8 is a diagram illustrating a graph representing an example query template, in accordance with an embodiment of the invention.
Figure 9:
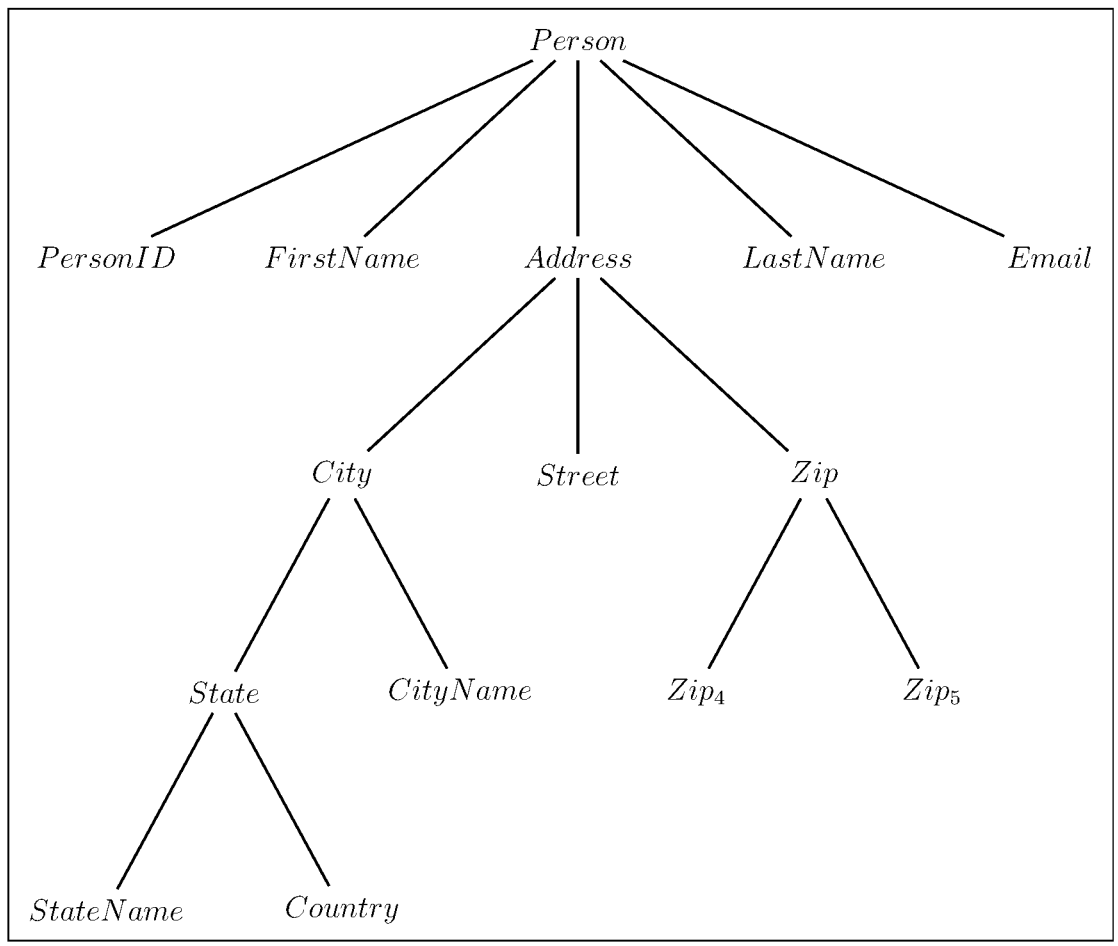
FIG. 9 is a diagram illustrating a primal graph representing an example query template, in accordance with an embodiment of the invention.

There is a specific relationship between a query template and the results. One aspect of this relationship can be observed by viewing the query template and the results as graphs. For query templates, a graph called the primal graph, formulated from the atomic templates of the query template is used. The primal graph of the query template of FIG. 4 is depicted in FIG. 9. A graph of the first result of FIG. 5 is shown in FIG. 8. A person of ordinary skill in the art will appreciate that the primal graph reveals the field structure of all the results of the query template.

The primal graph of a query template is an undirected graph where each atomic template corresponds to one edge of the graph. For example, the variables Person and PersonID is an edge in the primal graph since the first atomic template in FIG. 4 has those variables. Each of the remaining atomic templates contributes one edge each to the primal graph.

Although the variables of atomic templates in FIG. 4 are ordered, the corresponding edge in the primal graph is an unordered (i.e., a set of two variables). Since the primal graph in FIG. 9 is acyclic, choosing one variable forms a directed out-tree with root equal to the chosen variable, and imposes an ordering on the edges. For example, the directed tree shown in FIG. 10 results from choosing the Person as the root. Note the similarity of the structure between the FIG. 10 and the graph in FIG. 8. On the other if Address is chosen as the root, the directed tree shown in FIG. 11 is obtained and results will have a field structure that matches that tree.

The directed tree obtained from the primal graph is the field structure tree. In the field structure tree of FIG. 10, the vertices that have children will correspond to results with fields for each child of the tree. Those vertices with no children correspond to objects. For example, the Person, vertex in FIG. 10 has children PersonID, FirstName, Address, LastName, and Email. Therefore each returned result of the query template will have fields PersonID, FirstName, Address, LastName, and Email. Since PersonID, FirstName, LastName, and Email have no children the value of the fields will be objects. In the case of PersonID, FirstName, and LastName the field value with be one object, since the corresponding relations of the edges (Person, PersonID), (Person, FirstName), and (Person, LastName) are property constraints (as determined from the property info of the atomic template in the query template). On the other hand since (Person, Email) is not property constraints the value of the field will be a set of emails containing one or more elements.

Figure 12:
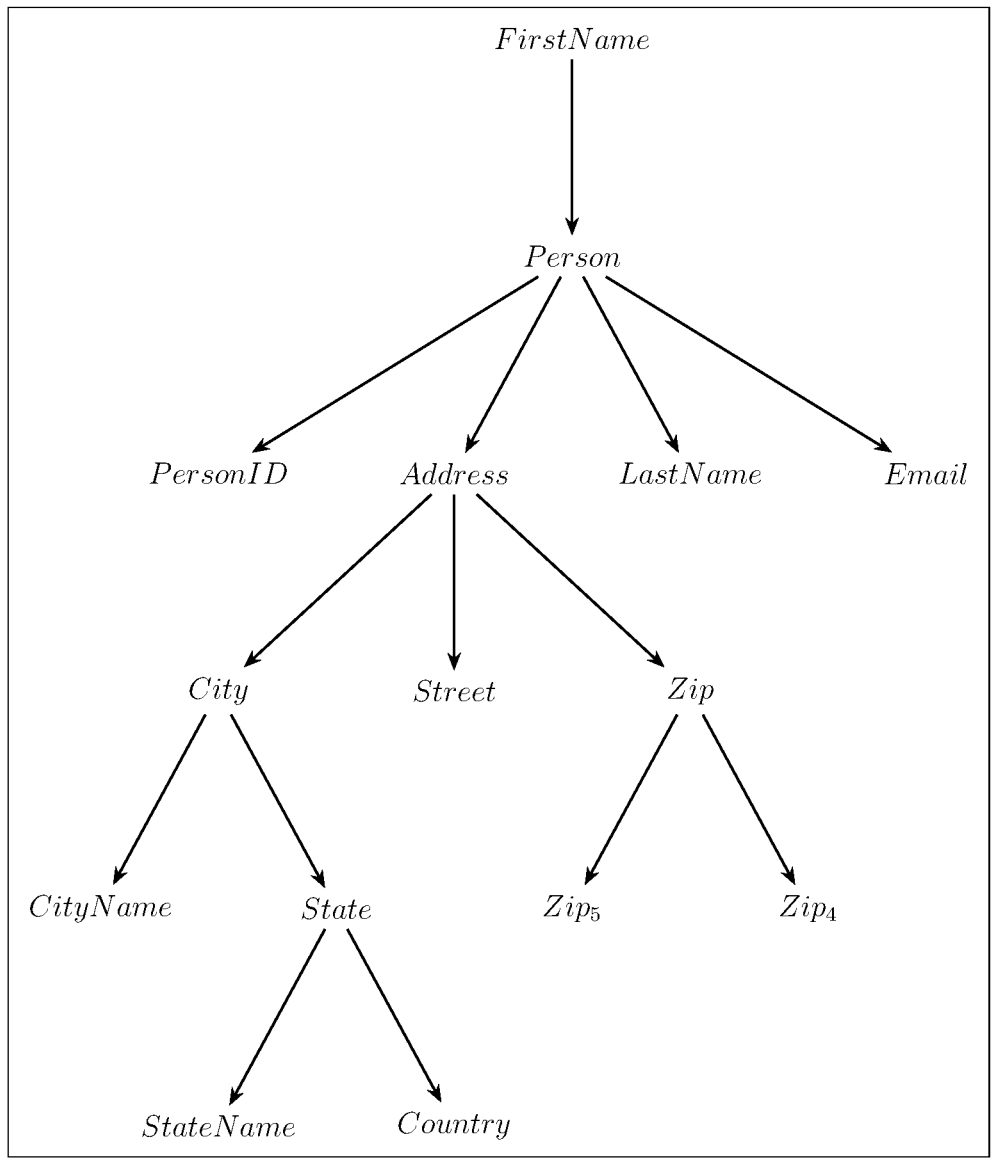
FIG. 12 is a diagram illustrating a field structure graph generated from a primal graph representing an example query template, in accordance with an embodiment of the invention.

In a traditional RDBMS, since first names are primitive types, it may seem surprising that if the focus variable is FirstName, results are returned by "first name". FIG. 12 depicts the field structure graph. The root of the graph is FirstName and it has one field, Person. Therefore the results returned would have root object equal to a first name and one field Person with a value that contains a set of one or more person results. Note that the field is a set because the relation associated with the link (FirstName, Person) is the inverse of the rFirstName relation which has a property constraint of Prop. The inverse of Prop is not a property constraint (as would be the case for PropUnique, or AttrUnique). In traditional ORM, or OORDBMS systems, the object models are fixed, whereas embodiments of this invention, as the examples demonstrate, can produce a much greater variety of useful result structures.

In addition, to the fields of a result, each result, in the case of the query template from FIG. 4 also has a root object. For example, the root object of the result shown if FIG. 8 is the $P_1$ object from FIG. 3. The value of $P_1$ corresponds to the assignment to the Person variable that is the root of the tree in FIG. 10. Similarly each variable is the graph will correspond to a value assigned to that variable in the result. If the vertex is has children it correspond to a result with fields and a root, otherwise it will correspond to an object or a set of objects.

Figure 13:
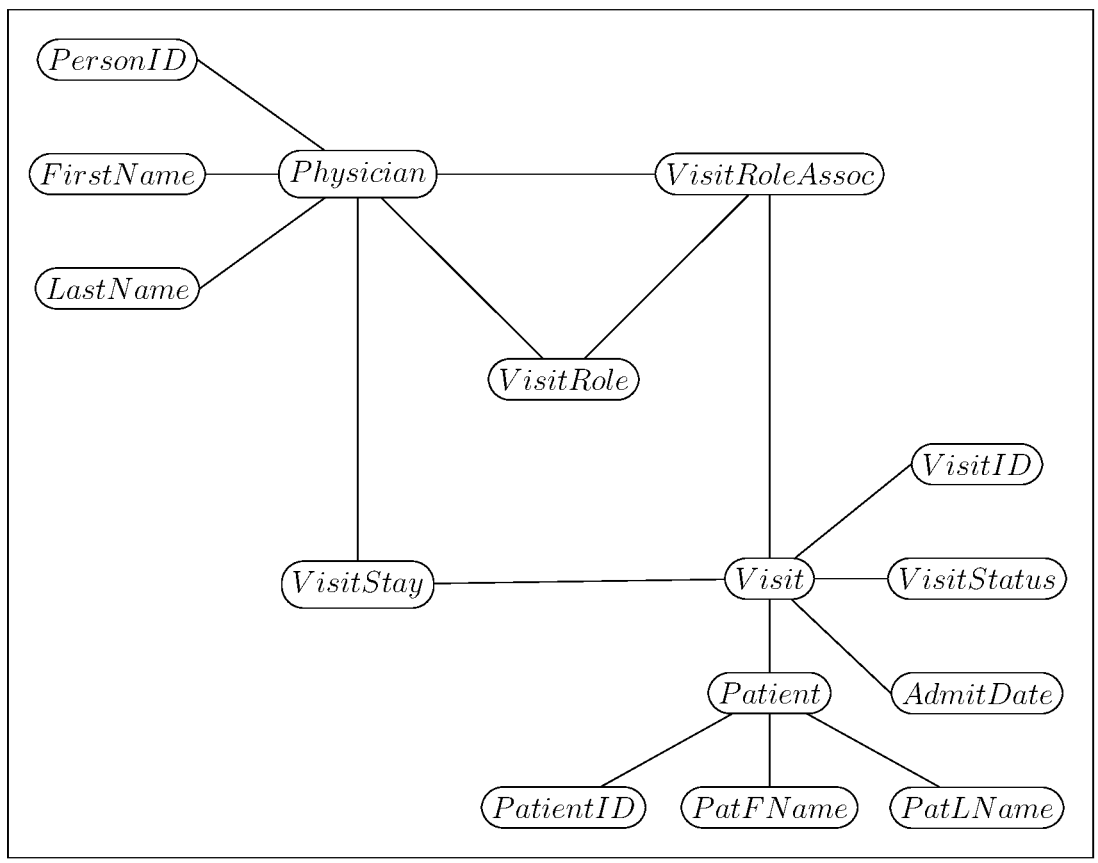
FIG. 13 is a diagram illustrating an example of a primal graph containing cycles, in accordance with an embodiment of the invention.

In accordance with embodiments of the invention, the primal graph of a query template need not be acyclic. FIG. 13 shows a primal graph of a query template (not shown) which has cycles. However, one can observe an acylic graph structure by grouping the variables Physician, VisitRoleAssoc, Visit, VisitStay, and VisitRole. The resulting acyclic graph is shown in FIG. 14. Observing the graph, one might conclude that one could represent the graph as an ordinary undirected graph where each vertex consists of a set of variables. However, such a representation, cannot account for the edges such as the edge from PersonID to Physician. The edge of an ordinary graph would be from PersonID to the vertex containing Physician, VisitStay, VisitRoleAssoc, VisitRole, and Visit. Such information is not lost if the result graph is modeled by a hypergraph. An undirected hypergraph, like an undirected graph, is a 2-tuple (V, E), but the edges can contain more than 2 vertices. For the graph shown in FIG. 14, the vertices of the hypergraph are the individual variables. 1400 depicts an edge containing the variables, Physician, VisitStay, VisitRoleAssoc, VisitRole, and Visit. 1400 is the only edge containing more than two variables in the primal hypergraph. Such an edge is called a multi-node. The edges 1401 containing variables PersonID, and Physician, and 1402 containing variables PersonID and Physician are also edges in the hypergraph. Edges such as 1401 and 1402 containing exactly two variables are called links. There are a total of ten links in the primal hypergraph of FIG. 14.

The graph shown in FIG. 14 is called the primal hypergraph of the query template. In the case where the primal graph is acyclic, the primal hypergraph and the primal graph will be the same. When the primal graph has cycles, the primal hypergraph is obtained by combining variables that are in the same simple cycles. For example, since the primal graph shown if FIG. 13 has a cycle Physician→VisitRoleAssoc→Visit→VisitStay→Physician, all the variables in the cycle, Physician, VisitRoleAssoc, VisitStay and Visit, must be in the same edge of the hypergraph. Similarly since there is a cycle Physician→VisitRoleAssoc→VisitRole→Physician, the variables Physician, VisitRoleAssoc and VisitRole must be in the same edge. Since the two sets overlap they are combined into one set, yielding the edge with variables, Physician, VisitStay, VisitRoleAssoc, VisitRole, and Visit. Generally overlapping cycles are combined to form the edges. Mathematically, the final edges, are obtained by looking at the partition of the variables in the original primal graph formed from the equivalence relation of the transitive reflexive closure of cycles. Additional details for computing the primal hypergraph are described below.

In addition to links and multi-nodes of a hypergraph, it is useful to consider singleton-nodes, which are single variables not contained in any multi-node. FIG. 14 contains the one multi-node 1400. All variables not in that node are singleton-nodes.

The definition of the primal hypergraph ensures that it is always acyclic (defined more formally below). The field structure tree is obtained from the primal hypergraph by choosing a focus variable. The node containing the focus variable imposes an ordering on the links of the primal hypergraph. For example, in FIG. 14 with focus variable, Visit, all links are oriented away from the multi-node containing Physician, VisitStay, VisitRoleAssoc, VisitRole and Visit.

The root of each result in FIG. 8 corresponds to one variable and one or more objects from the data model of FIG. 3. On the other hand, a multi-node containing several variables corresponds to a result tuple of one or more objects from the data model of FIG. 3. A result tuple, like a result, has field:value pairs. However, result tuples do not have a root object and the value of all fields is either one object or one result. For example, a result tuple corresponding to the multi-node of FIG. 14 has fields, Physician and Visit, each with a result value, and fields VisitStay, VisitRoleAssoc, and VisitRole each with an object value. FIG. 15 illustrates how the elements of the result tuple structure can be accessed. In this case, rather then returning a set of results, a set of result tuples are returned.

The result of a query template is defined in terms of an intermediate structure, called the solution of the query template. All results of a query template may be generated from a solution. The solution of query template is defined in terms of a plurality of constraint satisfaction problems (CSP) (aka constraint network). Each link and multinode in the primal hypergraph of a query template defines a CSP that is a restriction of a CSP formed from the query template. The restricted CSPs are used in the formulation of the solution as defined in Definition 50.

Figure 16:
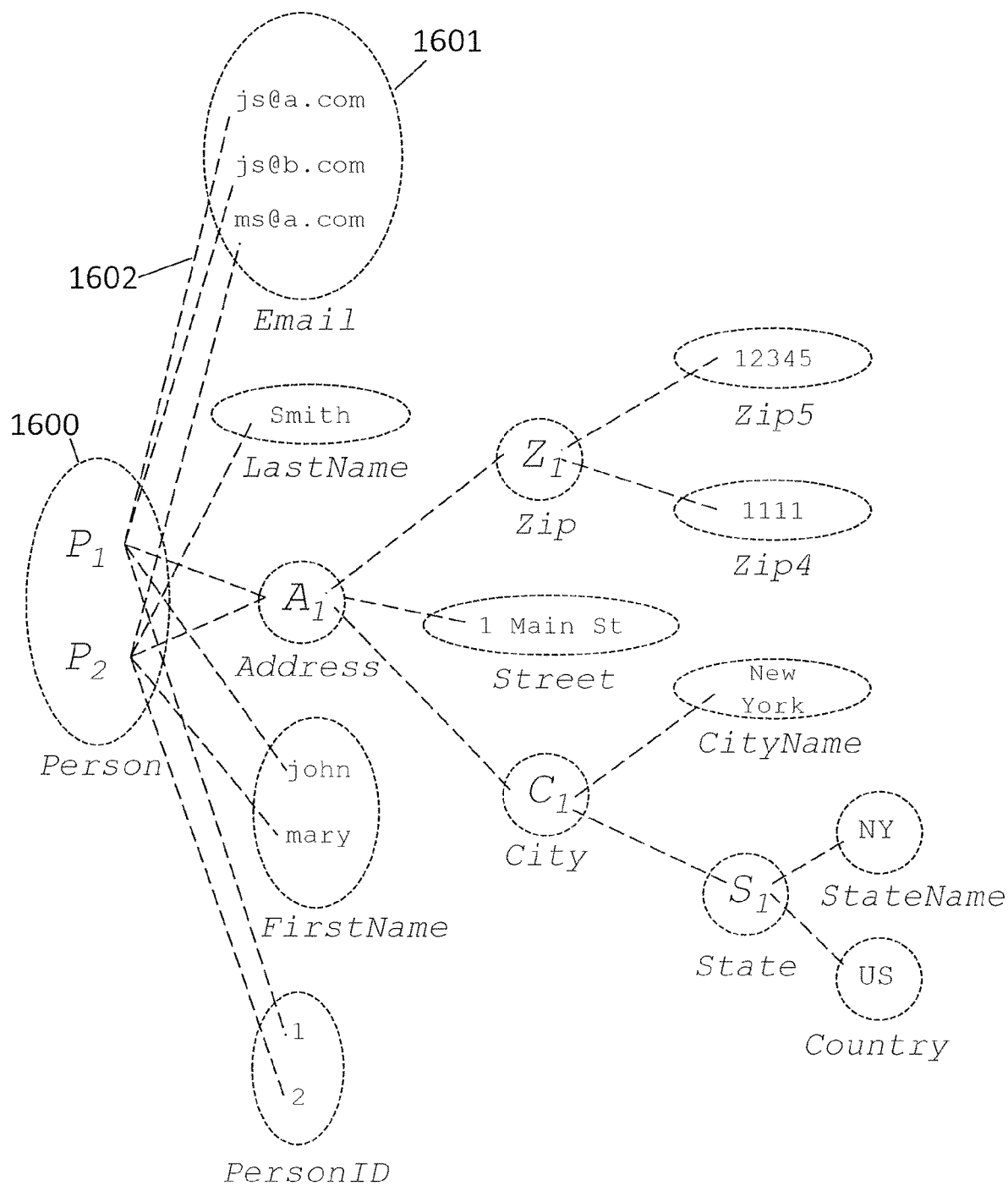
FIG. 16 is a diagram illustrating a solution for an example query template, in accordance with an embodiment of the invention.

The graph in FIG. 16 depicts a solution for the query template in FIG. 4. A solution is a kind of assignment graph. Each node in the assignment graph is associated with a node in the primal hypergraph of the query template. For example, the node 1600 containing the values $\{P_1, P_2\}$, is associated with the Person node of the primal hypergraph shown in FIG. 9 whereas the node 1601 is associated with the Email node of the primal hypergraph. Each link in the primal hypergraph of FIG. 9, is associated with a set of "assignment links". For example, the link {Person, Email} in the primal hypergraph is associated with a set of three assignment links. 1602 is one of those three assignment links with the value $P_1$ on one end and the value js@a.com on the other end. Such an assignment link can be denoted as $\{(Person, P_1), (Email, js@a.com)\}$. In this manner, the link {Person, Email} of the primal hypergraph, is associated with an atomic template of the query template and each such atomic template is associated with a binary relation. The {Person, Email} link is associated with the rEmail relation shown in FIG. 3. Each assignment link must satisfy the relation with which it is associated and also any unary templates of the variables of the corresponding link from the primal hypergraph. For example the assignment link $\{(Person, P_1), (Email, js@a.com)\}$ must satisfy the relation rPersonID and the set to which Person maps to in the unary template. In other words, $(P_1, js@a.com) \in rEmail \char`^ Person \in PersonType$.

Figure 17:
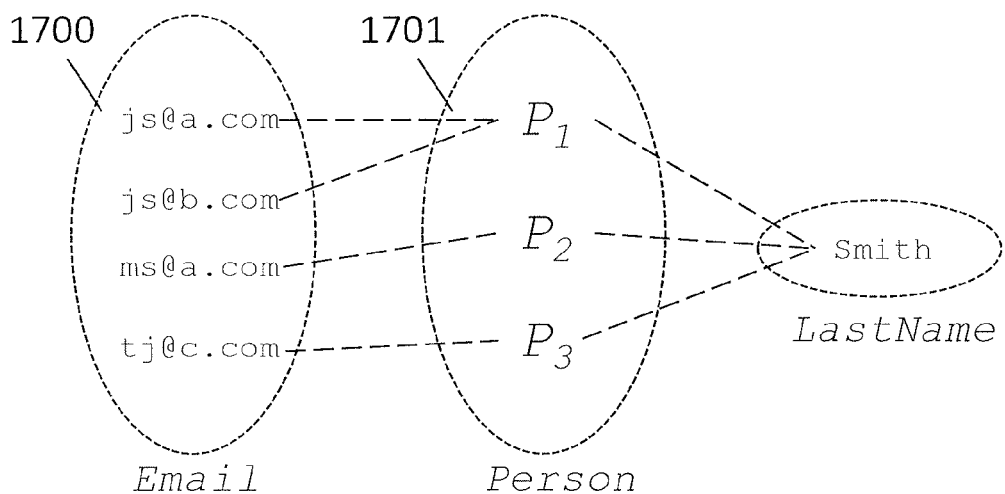
FIG. 17 is a diagram illustrating arc-consistency within a solution for an example query template, in accordance with an embodiment of the invention.
Figure 18:
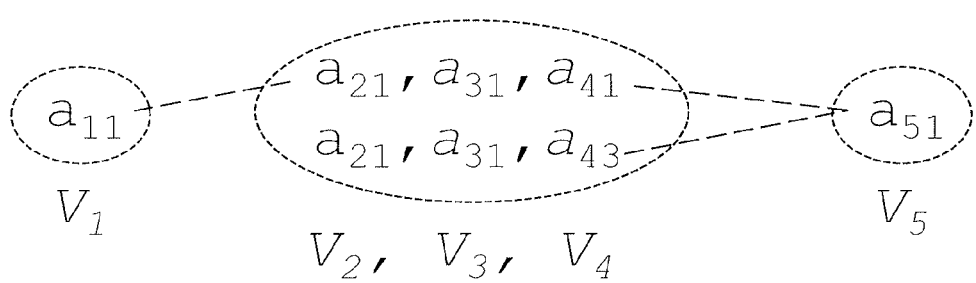
FIG. 18 is a diagram illustrating arc-consistency within a solution for an example query template, in accordance with an embodiment of the invention.

Furthermore, every value in the Person node is connected to an assignment link with a value in the Email node, and every value from the Email node is connected to an assignment link with a value in the Person node. That property of the {Person, Email} link and the assignment graph shown in FIG. 16 is called arc-consistency. In fact, all the edges, of the assignment graph shown in FIG. 16 are arc-consistent. Arc-consistency is also illustrated in FIG. 17 and FIG. 18. In FIG. 17 the link {Email, Person} is arc consistent since every email address in the Email node links to a person object in the Person node and every person object in the Person node links to an object in the Email node. However, the edge {Person, LastName} is not arc-consistent, since $P_3$ in the Person node does not link to a last name object in the LastName node. FIG. 18 shows a case of a primal hypergraph that contains a multi-node, $\{V_2, V_3, V_4\}$, with more than 2 variables. The link from $\{V_1, V_2\}$ is not arc consistent since there is no link from $a_{21}, a_{31}, a_{43}$ to a value in the V node, but the link $\{V_5, V_4\}$ is arc-consistent.

If every assignment link of an assignment graph satisfies the corresponding relation in the query template and the corresponding sets of the link variables in the unary template, and if every link from the primal hypergraph is arc-consistent, then one or more results can be generated and the assignment graph is considered to be a candidate solution. The solution, is the unique "maximal" candidate graph, that for any other candidate graph and any node, n, of the primal hypergraph, n contains the same or more values in the corresponding solution node than in the corresponding candidate graph node.

The node containing the focus variable is the root of a directed tree. For example, if Person is the focus variable, of the primal hypergraph of FIG. 9, the root node is the singleton-node containing only that variable (all nodes are singleton-nodes in this case). Each node in the directed out-tree that has out links will correspond to a set of n results, where n is the number of values associated with the corresponding node in the solution. Consider for example, 1600 of FIG. 16, the node corresponding to Person node of the primal hypergraph. That node contains two values $P_1$ and $P_2$. Each value forms a result with root equal to that value.

Each result will have fields according to the ordered links of the directed out-tree. For the Person node, the fields are Email, LastName, Address, FirstName and PersonID. Since the Email, LastName, FirstName and PersonID nodes have no out links the field values will be either an object or a set of objects, depending on the property constraints of the corresponding relation with property constraints. Since Last-Name, FirstName and PersonID correspond to rLastName, rFirstName, and rPersonID, respectively, and each of those relations are of type Prop, the values of those fields will just be one object. On the other hand, since rEmail is of type, AttrUnique, the Email field will be a set of objects (even if there is only one value). AttrUnique implies that for each person there can be one or more emails, but for each email there is only one person. However, in this case the inverse relation is not a factor due to the ordering imposed with Person as the root. The values or value of a field can be determined by looking at all the assignment links from the root object of the result. For example, focusing on the value $P_1$ in 1600, the Person node, you can see that there are two assignment links to 1601, the Email node. The end values of those assignment links are {js@a.com, js@b.com}. The Address field of $P_1$, will be a result itself with root equal to $A_1$ and fields City, Street and Zip. Similarly, the Email field of $P_2$ will be the set {ms@a.com}. The set of results returned from the query template with focus variable, Person, correspond to the two results formed from the values $P_1$ and $P_2$.

A mathematical formulation of query templates, results, and the relationship of the results to the query template is presented below. Mathematical formalism provides a clear and concise language and semantics to enable persons skilled in the art to make and use embodiments of this invention.

Standard mathematical constructs such as sets, sequences, tuples, relations, functions, graphs and hypergraphs are used. Definitions 1 to 8 clarifies the terminology of some standard constructs used herein.

Definition 1 A tuple t over S is as a function t: $\mathbb{N} \rightarrow S$ where Domain(t)=$\{1, 2, \ldots, n\}$. The notation $(o_1, o_2, \ldots o_n)$ will denote a tuple t where $t(i)=o_i$ for all i from 1 to n. The arity of a tuple, arity(t), is the number of elements in the domain. The elements of a tuple, t, Elements(t)=Range(t).

Definition 2 A tuple, t, over sets $(S_1, S_2, \ldots, S_n)$ is a tuple over $(S_1 \cup S_2 \cup \ldots \cup S_N)$ where $\{1, 2, \ldots, n\} \subseteq$ Domain(t) and for all i from 1 to n, $t(i) \in S_i$ Definition 3 A relation R of arity n over set S is a set of tuples such that for all $t \in R$, t is a tuple of arity n over S. A binary relation over S is a relation over S of arity 2.

Definition 4 A binary relation, R, over S is a property relation over S if and only if for all $x \in S$ there is at most one y such that $(x, y) \in R$ Definition 5 For any binary relation, R, over S the inverse binary relation over S, denoted as $R^{-1}$, is $\{(y, x) | (x, y) \in R\}$.

Definition 6 A named tuple, nt, over V and S is a function, nt:$V \rightarrow S$, where Domain(nt) is finite. The notation $\{(v_1, o_1), (v_2, o_2), \ldots, (v_n, o_n)\}$ over S will be used to denote an named tuple, nt, where $\{v_1, v_2, \ldots, v_n\} \subseteq$ Domain(nt) and where the $v_i$ are all distinct and for all i from 1 to n, $nt(v_i)=o_i$.

Definition 7 An undirected graph over S is a tuple (V, E) over $(\mathcal{P}(S), \mathcal{P}(\{\{x, y\} | \{x, y\} \subseteq S\}))$, where for all $\{x, y\} \in E$, $\{x, y\} \neq \emptyset$ and $x \in V$ and $y \in V$.

Definition 8 An undirected hypergraph over S is a tuple (V, E) over $(\mathcal{P}(S), \mathcal{P}(\mathcal{P}(S)))$ where for all $e \in E$, $e \neq \emptyset$ and $e \subset V$.

Definitions 9 to 16 present a formal definition of query template and various other functions associated with those structures.

Definition 9 A binary relation with property info over S, RC, is a tuple of the form (R, ($bool_1$, $bool_2$)) where R is a binary relation and {$bool_1$, $bool_2$}⊆{true, false} where if $bool_1$=true then R is a property relation over S and if $bool_2$=true the $R^{-1}$ is a property relation over S. R=rel(RC), is the relation of RC.

The values {Prop, PropUnique, Attr, AttrUnique} will denote the four possible values of ($bool_1$, $bool_2$). Prop=(true, false), PropUnique=(true, true), Attr=(false, false) and AttrUnique=(false, true). Or in other words, Prop indicates the binary relation is a property, but it's inverse is not.

PropUnique indicates both the binary relation and its inverse is a property.

Attr indicates neither the binary relation or its inverse is a property.

AttrUnique indicates the binary relation is not a property, but its inverse is.

Definition 10 For any set S and any set of variables, V, an atomic template over S and V is a tuple (RC, $v_1$, $v_2$) where RC is a binary relation with property info over S, {$v_1$, $v_2$}⊆V and $v_1 \neq v_2$. An atomic template may be denoted as RC($v_1$, $v_2$).

Definition 11 For any atomic template, att of the form (RC, $v_1$, $v_2$), where RC=(R, ($bool_1$, $bool_2$)), RelHead(att)=RC is the relation header,
Rel(att)=R is the relation
Edge(att)=($v_1$, $v_2$) is the edge,
Vars(att)={$v_1$, $v_2$} are the variables.
Constraint(ATS)=(R, ($v_1$, $v_2$)) is the constraint,
Props(ATS)=P where P contains 0, 1 or 2 elements. ($v_1$, $v_2$)∈Props if $bool_1$ is true, ($v_2$, $v_1$)∈Props if $bool_2$ is true.

of the atomic template.

Note that Constraint(ATS) is a constraint as per Definition 32.

Definition 12 For any set of atomic templates ATS,

Vars(ATS)=$\cup_{att \in ATS}$ Vars(att).
Edges(ATS)=$\cup_{att \in ATS}$ Edge(att).
UEdges(ATS)=$\cup_{att \in ATS}$ {Vars(att)}, the undirected edges of ATS.
Constraints(ATS)=$\cup_{att \in ATS}$ Constraint(att).
Props(ATS)=$\cup_{att \in ATS}$ Props(att).

Definition 13 A query template over S and V is a tuple (ATS, UT) where S and V are finite sets and:

ATS is a finite and non-empty set of atomic templates over S and V such that for all $att_1 \in$ ATS, and $att_2 \in$ ATS, if $att_1 \neq att_2$ then Vars($att_1$)≠Vars($att_2$).

UT is a named tuple over V and P(S) where Vars(ATS)=Domain(UT).

ATS is the atomic templates, UT is the unary templates.

Definition 14 For any query template, qt=(ATS, UT),

Vars(qt)=Vars(ATS)
Edges(qt)=Edges(ATS).
UEdges(qt)=UEdges(ATS).
Constraints(qt)=Constraints(ATS).
Props(qt)=Props(ATS).

Definition 15 For any query template, qt=(ATS, UT), the atomic template function of qt, ATT(qt)($v_1$, $v_2$) is equal to the atomic template, att∈ ATS where Vars(att)={$v_1$, $v_2$}. The relation function of qt is:

$$Rel(qt)(v_1, v_2) = \begin{cases} Rel(att) & \text{if } Edge(att) = (v_1, v_2) \\ (Rel(att))^{-1} & \text{if } Edge(att) = (v_2, v_1) \end{cases}$$

where att=ATT(qt)($v_1$, $v_2$).

Definition 16 A query template with focus over S and V is a tuple (qt, fv), where qt=(ATS, UT) is a query template over S and V and fv∈ Vars(qt).

From a query template with focus a set of response structures are formed. There are two kinds of response structures, a "result" structure defined in Definition 17 and a "result tuple" defined in Definition 18. The set of response structures are either a set of results or a set of result tuples. If the focus variable of the query template is a singleton-node then the response structures are result, otherwise they are result tuples.

Definition 17 A result, rs, over a set S and a set of variables V is a tuple of the form: (fv, of, rf, ocf, rcf, rtf, rtcf), where with NTS={of, rf, ocf, red, rtf, rtcf}, fv∈ Domain(of).
for all nt∈ NTS, nt is a named tuple and Domain(nt)⊆V, and
$\cup_{nt \in NTS}$ Domain(nt)=V, and
For all $nt_1$, $nt_2 \in$ NTS where $nt_1 \neq nt_2$, Domain($nt_1$)∩Domain($nt_2$)=∅, and
of(v)∈ S for all v∈ Domain(of), and
ocf(v)∈ $\mathcal{P}$ (S) for all v∈ Domain(ocf), and
rf(v) is a result over S and V, for all v∈ Domain(rf), and
rcf(v) is a set of results over S and V, for all v∈ Domain (rcf), and
rtf(v) is a result tuple over S and V, for all v∈ Domain(rtf), and
rtcf(v) is a set of result tuples over S and V, for all v∈ Domain(rtcf), the result tuple collection fields.

Domain(of) are the object fields, Domain(ocf) are the object collection fields, Domain(rf) are the result fields, Domain(rcf) are the result collection fields, Domain(rtf) are the result tuple fields, Domain(rtcf) are the result tuple collection fields of rs. The fields of rs, Fields(rs)=$\cup_{nt \in NTS}$ Domain(nt).

Definition 18 A result tuple, rst, over a set S and a set of variables V is a tuple (of, rf) where of and rf are named tuples, and Domain(of)⊆V, and Domain(rf)⊆V, and
Domain(rf) U Domain(of)=V, and Domain(rf) n Domain(of)=∅, and
of(v)∈ S for all v∈ Domain(of), and
rf(v) is a result over S and V, for all v∈ Domain(rf).

Domain(of) are the object fields and Domain(rf) are the result fields of rst. Fields(rst)=Domain(of)∪Domain(rf), the fields of rst.

In order to describe the set of response structures that represents a solution to a query template, the primal graph, the primal hypergraph and various other related function are defined in Definitions 19 to 31.

Definition 19 For any query template, qt, of the form (ATS, UT), the primal graph of qt is the graph consisting of all the undirected edges of the atomic templates:

$$PG(qt)=(Vars(qt),UEdges(qt))$$

Note that by Definition 10 all the edges of the primal graph have exactly two vertices.

Definition 20 A query template is well formed if the primal graph is connected (i.e. there exists a path between any two vertices of the graph).

From here on, all query templates are presumed to be well formed.

As shown in previous examples, a primal graph is not always acyclic. In cases where the primal graph has cycles, a primal hypergraph is formed. Definitions 21 to 23 define the primal hypergraph of a query template.

Definition 21 Let G=(V, E) be any undirected graph. For any two distinct $v_1, v_2 \in V$, SameCycle($v_1, v_2$) if and only if there exists a simple cycle of C, that contains $v_1$ and $v_2$.

Definition 22 Let G=(V, E) be any undirected graph and SameCycle* be the reflexive, transitive closure of Same-Cycle. SameCycle is an equivalence relation on V and the equivalence classes of SameCycle* is a partition, P, of V. Let EN be the edges in E where there does not exist a set s∈P where e ⊂ s. The induced acyclic hypergraph of C, IAH(C), is the hypergraph, (V, P∪EN). In other words the induced acyclic hypergraph of C contains edges that are the partitions of V by SameCycle* and the edges in the original graph that are not completely contained in one of the edges in the partition.

Note that the induced acyclic hypergraph of an undirected graph equals the undirected graph when the undirected graph is a acyclic. The induced acyclic hypergraph is an acyclic hypergraph (as defined in Definition 28).

Definition 23 For any query template, qt, with primal graph, G, the primal hypergraph of qt, PG(qt)=IAH(C).

Definition 24 Let IAH=(V, E) be the induced acyclic hypergraph of a graph, then

Links(IAH), the links of IAH, is the set of edges, e∈E with exactly two variables.

MultiNodes(IAH), the multi-nodes of IAH are the edges, $\{e \in E | |e| \geq 3\}$ SingleNodes(IAH), the singleton nodes of IAH is $\{\{v\} v \in V \wedge \nexists\, e \in \text{MultiNodes}(IAH) \text{ where } v \in e\}$ Nodes(IAH), the nodes of IAH, are:

MultiNodes(IAH)∪SingleNodes(IAH)

The nodes of an induced acyclic hypergraph contain both the edges in E that have three or more variables, and nodes, {v} where v does not occur in any edge with three more variables. Note also that a given induced acyclic hypergraph, of the form (V, E) the following relation holds:

$$V = \bigcup_{n \in \text{MNodes} \cup \text{SNodes}} n$$

and $$E = \bigcup_{e \in \text{MNodes} \cup \text{Links}} e$$

Definition 25 For a given induced acyclic hypergraph, IAH, the node link representation of IAH is:

MSL(IAH)=(MNodes,SNodes,Links)

where MNodes=MNodes(IAH), SNodes=SNodes(IAH), and Links=Links(IAH).

Definition 26 For any induced acyclic graph each variable is contained in at most one node. Therefore, for any induced acyclic hypergraph, IAH=(V, E), then functions Node(IAH), Single(IAH), and Multi(IAH), are defined as follows:

for each variable v∈V, Node(IAH)(v) is the unique n∈Nodes(IAH) where v∈n.

For all v∈V, Single(IAH)(v), v is a singleton node, if and only if {v}∈SingleNodes(IAH).

For all v∈V, Multi(IAH)(v), v is a multi-node node, if and only if Node(v)∈MultiNodes(IAH).

Definition 27 Let IAH=(V, E) be an induced acyclic hypergraph and let n be any node n∈Nodes(IAH), then Links(n)= {e∈Links(IAH)|e∩n≠∅} are the links of n. Note that for any link l∈Links(n), there is only one variable in l∩n and one variable in l−n. The notation $vl_n$ will denote the one variable in l∩n, and $vl_{\bar{n}}$ will denote the one variable in l−n.

For example, in FIG. 14, the links of the multi-node 1400 are:

{Physician, PersonId}, {Physician, FirstName}, {Physician, LastName}, {Visit, Patient}, {Visit, VisitId}, {Visit, Visit-Status}, {Visit, AdmitDate}.

From the definitions of induced acyclic hypergraph of a query template it can be shown the induced acyclic hypergraph is acyclic where a cycle is defined as in the following:

Definition 28 For any induced acyclic hypergraph IAH, a path from $N_1$ to $N_m$ is a sequence of the form ($N_1, L_1, N_2, \ldots, L_{M-1}, N_M$) where for all i from 1 to m, $N_i$ are nodes of IAH and for all i from 1 to m−1, $L_i$ are links of $N_i$ and $N_{i+1}$. A simple path is a path where all $L_1$ are distinct. A cycle is a simple path where $N_1$=Nm.

A variable imposes an ordering on the links of the induced acyclic hypergraph as follows:

Definition 29 For any induced acyclic hypergraph IAH=(V, E) and any variable, fv∈v the predicate OrdLink(IAH, fv) is defined as:

Domain(OrdLink(IAH, fv))={($v_1, v_2$)|$v_1, v_2 \in V$}

OrdLink(IAH, fv)($v_1, v_2$) is true if and only if {$v_1, v_2$}∈Links(IAH) and $v_1 \in$Node(IAH)(fv) or the path from Node(IAH)(fv) to Node(IAH)(vi) does not contain Node(IAH)($v_2$).

The set OrdLinks(IAH, fv)={($v_1, v_2$)∈$v_1, v_2 \in$ V⋁OrdLink (IAH, fv)($v_1, v_2$)}.

Definition 30 For any induced acyclic hypergraph, IAH=(V, E), and any variable fv∈ V the field structure tree of IAH and fv is a tuple:

FST(IAH,fv)=(V,MultiNodes(IAH),OrdLinks(IAH,fv))

Definition 31 For any induced acyclic hypergraph, IAH=(V, E) and any variable fv∈ V, the fields of v for IAH and fv are:

Fields(IAH,fv)(v)={w|∃(v,w)∈OrdLinks(IAH,fv)}

Figure 10:
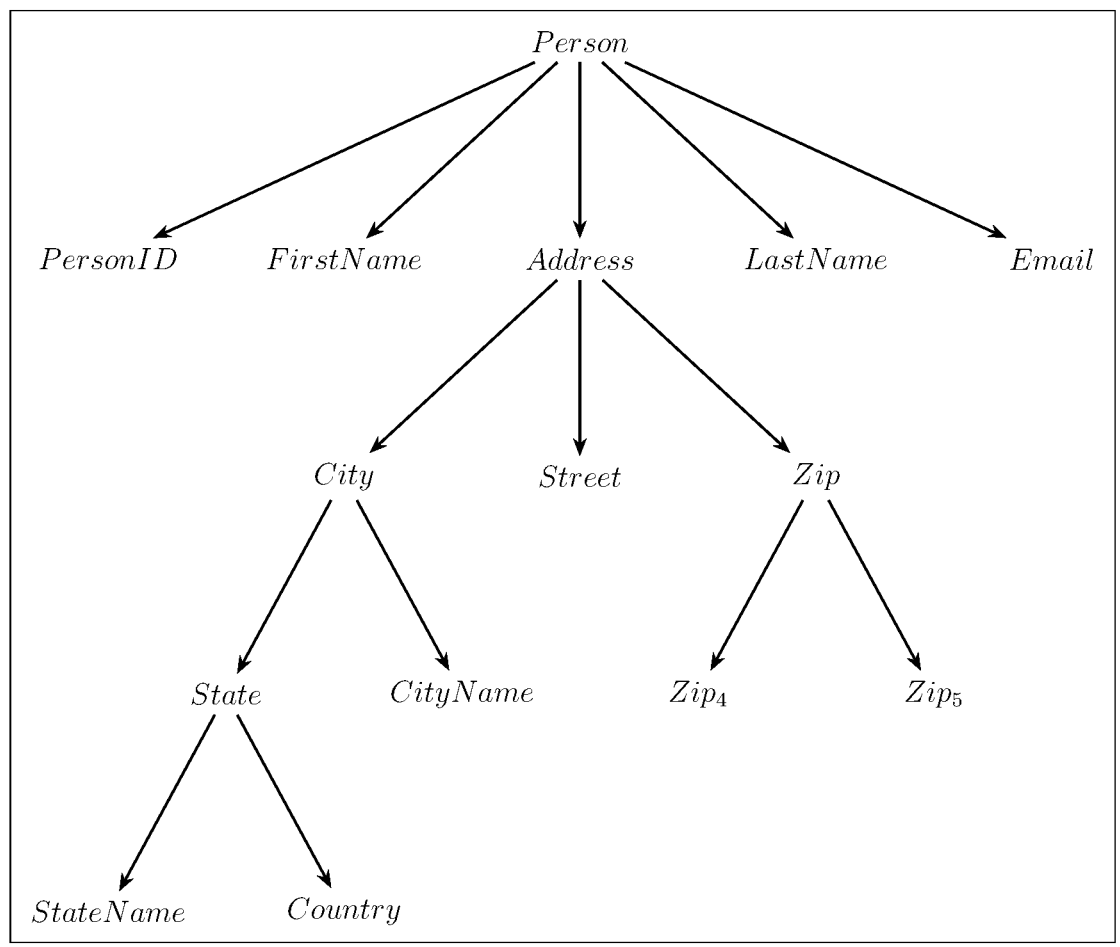
FIG. 10 is a diagram illustrating an object structure generated from a primal graph representing an example query template, in accordance with an embodiment of the invention.
Figure 11:
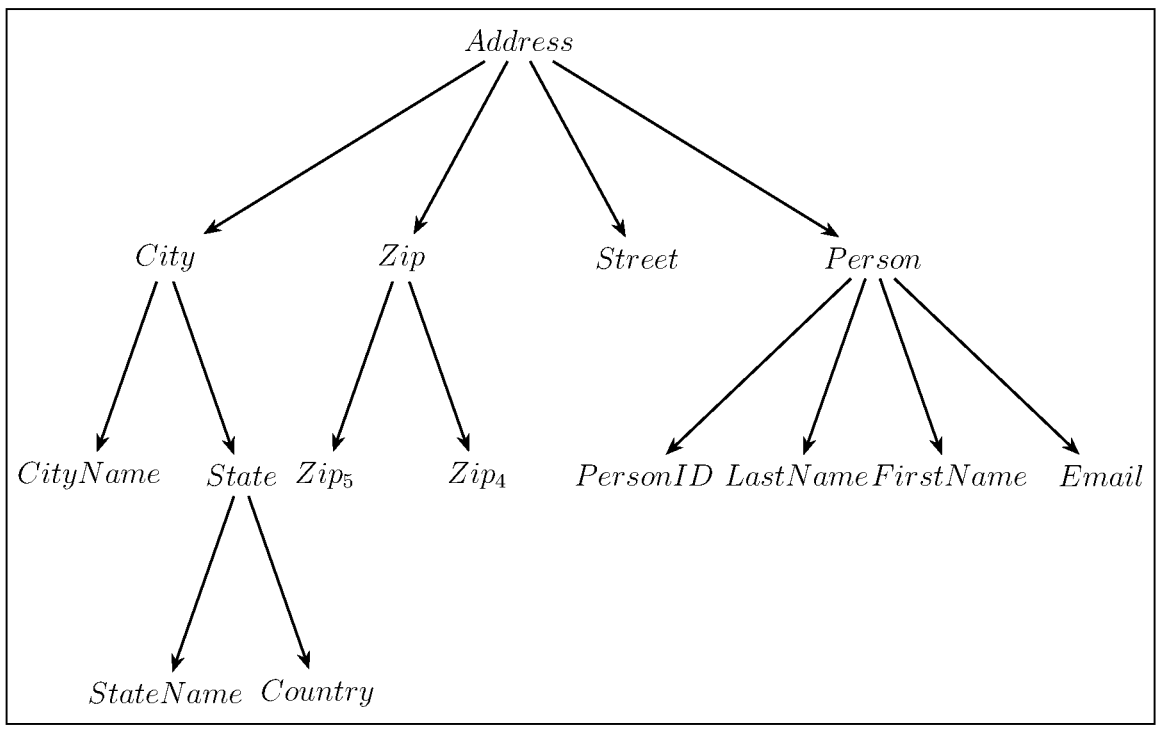
FIG. 11 is a diagram illustrating an object structure graph generated from a primal graph representing an example query template, in accordance with an embodiment of the invention.

A person of ordinary skill in the art will appreciate, for example in FIG. 10 the variable Person has fields: PersonID, FirstName, Address, LastName, and Email. The variable Address has fields: City, Street and Zip. Notice that Person is not a field of Address, due to the ordering imposed by the focus variable, Person. Some fields, such as FirstName have no fields. In fact, any leaf of the tree has no fields.

Definitions 32 to 35 present of formulation of constraint satisfaction problems and restricted constraint satisfaction problems as used herein.

Definition 32 A constraint, c over set S and V is a tuple (R, sc) where R is a relation over S and sc is a tuple over V and arity(sc)=arity(R). scope(c)=sc is called the scope of the constraint. Vars(c)=Elements(sc) are the variables of the constraint. Rel(c)=R is the relation of the constraint.

Definition 33 A set of constraints, C, over S and V, is a set where for all c∈ C, c is a constraint over S and V. For any set of constraints C, Vars(C)=$\cup_{c \in C}$ Vars(c).

Definition 34 A constraint problem over S, is a tuple (V, Dom, C) where

V is a finite set of variables

Dom is a named tuple over $\mathcal{P}$ (S) where Domain (Dom)=V

C is a finite set of constraints over S and V, where Vars(C)=V,

Definition 35 For any constraint problem, CSP=(V, Dom, C) over S and any set of variables W ⊂ V, CSP|$_W$, the restriction of CSP to W, is the constraint problem (W, Dom|$_W$, {c∈C|Vars(c)⊆W})

Definitions from 36 to 50 presents a formulation of the intermediate solution structure from which results can be generated.

Definition 36 For any query template, qt of the form (ATS, UT), $$CSP(qt)=(Vars(ATS),UT,Constraints(ATS))$$

is the constraint problem of qt

Definition 37 For any set of variables, V, and any set S, a covering assignment, AS, of V over S is a named tuple over V and S, where V⊆Domain(AS). If V=Domain(AS) then AS is an assignment of V over S.

Similarly,

Definition 38 For any set of variables, V, and any set S, a covering domain map, Dom, of V over S is a named tuple over V and $\mathcal{P}$ (S), where V⊆Domain(Dom). If V=Domain (Domain) then AS is a domain map of V over S.

Definition 39 For any constraint, c, any covering assignment, AS, over Vars(c) and any covering domain map, Dom over Vars(c), for all i from 1 to arity(scope(c)) let $$Eval(AS,c)(i)=AS(Scope(c)(i))$$

then AS satisfies c and Dom if any only if eval(AS, c)∈ Rel (c) and for all v∈ Vars(c), AS(v)∈ Dom(v).

For example consider,
AS={(Person, $P_3$), (FirstName, Ted), (LastName, Smith)}
and the constraint c=(rFirstName, (Person, FirstName)) where rFirstName is the relation shown in FIG. 3. Since ($P_3$, Ted)∈ rFirstName, and $P_3$∈ PersonType, AS satisfies c. However it does not satisfy c=(rLastName, (Person, LastName)) since ($P_3$, Smith)∉ rLastName;

Definition 40 For any set of constraints, C, and any covering assignment, AS, over Vars(C), and any covering domain map, Dom over Vars(C) then AS satisfies C and Dom if and only if AS and Dom satisfies every c∈ C.

For example, consider
AS={(Person, $P_1$), (FirstName, John), (LastName, Smith)}
and the constraints,
$c_1$=(rFirstName, (Person, FirstName)) and
$c_2$=(rLastName, (Person, LastName))
then AS satisfies the set of constraints $\{c_1, c_2\}$.

For any CSP and any convering assignment AS over V and S, AS must also satisfy Dom of the CSP:

Now we can define a solution to a CSP as,

Definition 41 For any CSP of the form (V, Dom, C) and any covering assignment, AS, over V and S, AS satisfies CSP, Sat(AS, CSP), if and only if AS satisfies C and Dom. AS is a solution to CSP, IsSol(AS, CSP) is if it is an assignment over V and S (i.e. V=Domain(AS)).

Definition 42 For any csp, the solution to the CSP is:

$$Sol(csp)=\{as|IsSol(as,CSP)\}$$

Definition 43 An assignment to a primal hypergraph, (V, E) of a query template over S is a function, SAS, where Domain(SAS)=E and for all e∈ E, SAS(e) is a set of assignments of e over S.

Definition 44 For any set of assignments, SAS, of V over S, the projection function of SAS is the function defined for all v∈ V as:

$$\pi(SAS)(v)=\{as(v)|as\in SAS\}$$

Definition 45 For any primal hypergraph, PG=(V, E) of a query template over S, and any assignment SAS of PC, and any n∈ Nodes(PG) U Links(PG), the extended assignment, SAS', is defined by:

$$SAS'(n) = \begin{cases} SAS(n) & \text{if } n \in E \\ \{(v, e) | \{v, x\} \in \text{Links}(PG) \wedge (v, e) \in SAS(\{v, x\}) & \text{if } n = \{v\} \end{cases}$$

Definition 46 For any assignment, SAS, to a primal hypergraph, PG=(V, E) of a query template over S, the projection function of SAS and PC, is the function defined for all v∈ V as:

$$\pi(SAS,PG)(v)=\pi(SAS'(\text{Node}(PG)(v)))(v)$$

Definition 47 For any assignment, SAS of a primal hypergraph, PC, of a query template over S, and any l∈ Links(PC), where l={$v_a$, $v_b$}, l is arc-consistent for SAS and PC, if and only if
for all $o_a$∈ π(SAS, PG)($v_a$) there exists $o_b$∈ π(SAS, PG) ($v_b$) and an $as_l$∈ SAS(l) such that $o_a=as_l(v_a)$ and $o_b=as_l(v_b)$ and
for all $o_b$∈ π(SAS, PG)($v_b$) there exists $o_a$∈ π(SAS, PG) ($v_a$) and an $as_l$∈ SAS(l) such that $o_b=as_l(v_b)$ and $o_a=as_l(v_a)$ Definition 48 For any assignment, SAS of a primal hypergraph, PC, of a query template over S, SAS is arc-consistent for PC, if and only if for all l∈ Links(PC), l is arc-consistent for SAS and PG.

Definition 49 For any query template, qt with primal hypergraph PG=(V, E), an assignment, SAS of PG is a candidate solution of qt if and only if
For all e∈ E, and as∈ SAS(e), as∈ Sol(CSP(qt)|$_e$).
SAS is arc-consistent for PG.

The solution to a query template is the unique "maximal" candidate solution, in the following sense:

Definition 50 For any query template, qt with primal hypergraph PG=(V, E), an assignment, SAS of PG is the unique solution of qt if and only if it is a candidate solution of qt and for all candidate solutions, CAS of qt and for all e∈ Nodes (PG), CAS'(e)⊆SAS'(e). Sol is the function defined on all qt over V and S as: Sol(qt)=SAS if SAS is the solution to qt, otherwise Sol(qt)=∅.

Definitions from 51 to 56 define the set of results corresponding to a solution of a query template.

Next the fields of a variable of a query template can be partitioned to correspond to the field types of a results. First the following two definitions are required:

Definition 51 For any query template, qt, with primal graph C=(V, E), and any variables $v_1$∈ Vars(qt), $v_2$∈ Vars(qt), IsProps(qt)($v_1$, $v_2$) if and only if there exists a path P from $v_1$ to $v_2$ where e∈ Props(qt) for all e∈ P.

Definition 52 For any query template, qt, with primal hypergraph PC, and any variable v∈ Vars(qt) where Node (PG)(v) is a multi-node, IsPropForNode(qt)(v) if and only if for all w∈ Node(PG)(v), where w≠v, IsProp(qt)(v, w).

Definition 53 For any query template with focus, qt f= (qt, fv), and any variable v∈ Vars(qt), let Fields=Fields(PC, fv) where PG is the primal hypergraph of qt then
OFields(qtf)(v)={w∈ Fields(v)|Fields(w)=∅∨
(v, w)∈ Props(qt)}, the object fields of v for qt f.
OCFields(qtf)(v)={w∈ Fields(v)|Fields(w)=∅∨
(v, w)∉ Props(qt)}, the object collection fields of v for qt f.
RFields(qtf)(v)={w∈ Fields(v)|Fields(w)≠∅∨Single(w)
∨(v, w)∈ Props(qt)} the result fields of v for qt f.
RCFields(qtf)(v)={w∈ Fields(v)|Fields(w)≠∅∨Single(w)
∨(v, w)∉ Props(qt)}, the result collection fields of v for qtf.
RTFields(qtf)(v)={w∈ Fields(v)|Fields(w)≠∅∨Multi(w)
∨(v, w)∈ Props(qt)∨IsPropForNode(w)}, the result tuple fields of v for qtf.

RTCFields(qtf)(v)={w∈Fields(v)|Fields(w)≠∅∨Multi(w) ∨((v, w)∉Props(qt)∇IsPropForNode(w))}, the result tuple collection fields of v for qt f.

Each singleton node, {v}, where v is not a leaf of the object structure tree, is associated with a set of results. All multi-nodes, are associated with a set of result tuples.

Definition 54 For any
   query template with focus, qt f=(qt, fv) with primal hypergraph, PG, and
   any v∈Vars(qt) where Fields(PG, fv)(v)≠∅ and
then a result of the form (fv, of, ocf, rf, rcf, rtf, rtcf) is a result of qt f for v and o, Result(qtf)(v, o), if and only if,
   o∈π(Sol(qt), PG)(v)
   Domain(of)=OFields(qtf)∪{fv} and or all w∈Domain (of), $$of(w) == \begin{cases} o & \text{if } w = fv \\ as_1(w) \text{ where } as_1 \in Sol(qt)(\{v, w\}) \land as_1(v) = 0 & \text{if } w \neq fv \end{cases}$$

Domain(ocf)=OCFields(qtf) and for all w∈Domain(ocf)

$$ocf(w) = \{as_1(w) | as_1 \in Sol(qt)(\{v,w\}) \lor as_1(v) = o\}$$

Domain(rf)=RFields(qtf) and for all w∈Domain(rf), $$rf(w) = Result(qtf)(w, as_1(w)) \text{ where } as_1 \in Sol(qt)(\{v,w\}) \lor as_1(v) = o$$

(Note there is only one such $as_1$.
   Domain(rcf)=RCFields(qtf) and for all w∈Domain(rcf)

$$rtf(w) = ResultTuple(qtf)(w, as_1) \begin{vmatrix} as_1 \in Sol(qt)(Node(PG)(w)) \land \\ as_1(w) = as_2(w) \land \\ as_2 \in Sol(qt)(\{v, w\}) \land as_2(v) = o \end{vmatrix}$$

(Note there is only one such $as_1$ and one such $as_2$).
   Domain(rtcf)=RTCFields(qtf and for all w∈Domain(rtcf), $$rctf(w) = \left\{ ResultTuple(qtf)(w, as_1) \begin{vmatrix} as_1 \in Sol(qt)(Node(PG)(w)) \land \\ as_1(w) = as_2(w) \land \\ as_2 \in Sol(qt)(\{v, w\}) \land as_2(v) = o \end{vmatrix} \right\}$$

Definition 55 For any
   query template with focus, qt f=(qt, fv) with primal hypergraph, PG, and
   any v∈Vars(qt), where Node(PG)(v) is a multi-node and ResultTuple(qtf)(v, $as_1$) is a result tuple of v and $as_1$ if and only if,
   $as_1$∈Sol(qt)(Node(PG)(v))
   for all w∈Node(PG)(v), where Fields(PG, fv)(w)=∅

$$of(w) = as_1(w)$$

for all w∈Node(PG)(v), where Fields(PG, fv)(w)≠∅

$$rf(w) = Result(qtf)(w, as_1(w))$$

Definition 56 For query template with focus over S, qt f=(qt, fv), The solution response of qt f, is:

$$SolResponse(qtf) = \begin{cases} \{Result(qtf)(fv, as(fv)) \mid as \in Sol'(N)\} & \text{if } Single(PG)(fv) \\ \{ResultTuple(qtf)(fv, as) \mid as \in Sol'(N)\} & \text{if } Multi(PG)(fv) \\ \emptyset & \text{if } Sol(qt) = \emptyset \end{cases}$$

where PG is the primal hypergraph of qt and N=Node(PG)(fv) and Sol'=Sol(qt)'.

As per Definition 56 the solution response is uniquely determined from the query template with focus variable. In other words, SolResponse, is a function with domain equal to the set of all query templates over S. For a given query template with focus variable, and a given solution to the query template, the solution response can be generated from definitions 54 to 56.

Algorithms 1 and 2 depict two algorithms for computing a solution to a query template. Both algorithms use a method, CPSOLVE, for solving a constraint satisfaction problem. Many such algorithms exist and are known by those of ordinary skill in the art. The two algorithms also use a method, IAH, for computing the node link representation of the induced acyclic hypergraph of an undirected graph. Algorithm 3 depicts one such method, in accordance with an embodiment. The algorithm makes use the following methods, which would be known to those of ordinary skill in the art:

FINDPART(v, Partition), give a partition of a set, returns the unique set P∈Partition that contains v.

CYCLEBASIS(V, E) returns a cycle basis of the undirected graph (V, E) or ∅ if there are no cycles.

The algorithm shown in Algorithm 1 also assumes an "arc-consistent" method defined as:

Definition 57 Given a assignment, SAS, to a primal hypergraph, PC, and the node link representation, (MNodes, SNodes, Links), of the primal hypergraph, a method is an arc-consistent solver if and only if it computes an assignment, $SAS_{AC}$ such that
   For all l∈Links, l is arc-consistent for $SAS_{AC}$ and PG.
   Let $SAS_1$ be any assignment to PG such that:
      For all l∈Links, l is arc-consistent for $SAS_1$ and PC, and
      for all e∈MNodes∪Links, $SAS_1(e) \subseteq SAS(e)$
   then for all e∈MNodes∪Links, $SAS_1(e) \subseteq SAS_{AC}(e)$ The assignment, $SAS_{AC}$, computes the "maximal" assignment contained in SAS that is arc-consistent. Such an assignment, if it exists, is unique.

An example arc-consistent solver is shown in Algorithm 4. Other methods assumed in the algorithm are:

PRIMALGRAPH(qt) returns the primal graph as in Definition 19.

EXTEND(SAS, MNodes, SNodes, Links) returns the extension of SAS as in Definition 45.

ASSIGN(qt, link) shown in algorithm 4, returns the assignments of the relation corresponding to the link according to the variables of the link:

$$\{\{v_1, t(1)\}, \{v_2, t(2)\} | t \in Rel(qt)(v_1, v_2) \lor t(1) \in UT(v_1) \lor t(2) \in UT(v_2)\}$$

where link={$v_1, v_2$} and UT is the unary template of qt.

Algorithms 1 and 2 exemplify two approaches to finding a solution of a query template. Algorithm 1 initializes the assignment to the primal hypergraph by solving the restricted constraint problem of each multi-node of the query template. The link assignments are initialized to correspond to the tuples in the relation corresponding to the link in the query template that also satisfy the unary template. Then an arc-consistent solver computes the maximal solution from that initial assignment. On the other hand, algorithm 2 utilizes the solution of the constraint problem of the entire query template to form the assignments to the multi-nodes and links. For each assignment, $as_1$, in the solution to the constraint problem of the query template and each multinode, n, as$_1$ restricted to n is added to the assignment n in the solution for the query template.

Algorithm 1 Solution of Query Template from Solutions of CSP of Multi-Nodes

```
function SOLUTIONFROMMULTINODE(qt)
(V, E) ← PRIMALGRAPH(qt)
(MNodes, SNodes, Links) IAH(V, E)
SAS ← ∅
for all nnode ∈ MNodes do
    SAS_m = CSPSOLVE(CSP(qt)|_mnode)
    if SAS_m = ∅ then return ∅
    else
        SAS (mnode) SAS_m
for all link ∈ Links do
    SAS_l = ASSIGNS(qt, link)
    if SAS_l = ∅ then return ∅
    else
        SAS(link) SAS_l
SAS' = EXTEND(SAS, MNodes, SNodes, Links)
return ARCCONS(SAS', MNodes, SNodes, Links)
```

Algorithm 2 Solution of Query Template from Solutions of CSP of Query Template

```
function SOLUTIONFROMCSPQUERYTEMPLATE(qt)
(V, E) ← PRIMAL GRAPH(qt)
(MNodes, SNodes, Links) ← IAH(V, E)
CSP ← CSP(qt)
Sol ← CSPSOLVE(CSP)
if Sol = ∅ then
    return ∅
SAS ← ∅
for all node ∈ MNodes ∪ Links do
    SAS(node) ← ∅
for all as ∈ Sol do
    for all node ∈ MNodes ∪ Links do
        SAS(node) SAS(node) ∪ {as|_node}
return EXTEND (SAS, MNodes, SNodes, Links)
```

Algorithm 3 Induced Acyclic Hypergraph of an Undirected Graph

```
function IAH(V, E)
Partition ∪_{v∈V}{{v}}              //the initial Partition
Cycles CYCLEBASIS(V,E)
if Cycles = ∅ then return (V, E)
for all cycle ∈ Cycles do
    NewP ← ∅
    for all v ∈ VARs(cycle) do
        P FINDPART(v Partition)
        if P = ∅ then continue
        Partition Partition − {P}
        NewP ← NewP ∪ P
    Partition ← Partition ∪ {NewP}
MNodes ← ∅
SNodes ← ∅
for all e ∈ Partition do
    if |e| > 2 then then
        M Nodes = M Nodes ∪ {e}
    else
        assert |e| = 1
        SNodes = SNodes ∪ {e}
Links = ∅
for all e ∈ do
    isLink ← true
    for all n ∈ MNodes do
        if e ⊂ n then
            isLink ← false
            break
    if isLink then Links = Links ∪ {e}
return (MNodes, SNodes, Links)
```

Algorithm 4 Arc Consistent

```
function ARCCONS (SAS', M Nodes, SNodes, Links)
while SAS' ≠ ∅ do
    for all link ∈ Links do
        SAS' = ARCCONSLINK(SAS', MNodes, SNodes, link)
        if SAS' = ∅ then break
return SAS'
```

Algorithm 5 Arc Consistent Link

```
Require: (V, E) is an induced acyclic hypergraph, MNodes the
multi-nodes, SNodes
    the singleton-nodes, Links the links, and {v_1, v_2} ∈ Links.
Require: SAS ≠ ∅
function ARCCONSLINK(SAS', MNodes, SNodes, Links, {v_1, v_2})
    Node_1 NODE(MNodes, SNodes, v_1)
    Node_2 NODE(MNodes, SNodes, v_2)
    vals_1 π(SAS'(Node_1))(v_1)
    vals_2 π(SAS'(Node_2))(v_2)
    SAS' ARCCONSLINKONESIDE(SAS', MNodes, SNodes, Links,
    v_1, vals_1, v_2, vals_2)
    if SAS' = ∅ then return ∅
    else
        return ARCCONS(SAS', MNodes, SNodes, Links, v_2, vals_2, v_1, vals_1)
```

Algorithm 6 Arc Consistent Link For Nodes

```
function ARCCONSLINKONESIDE(SAS', MNodes, SNodes, Links,
v_1, vals_1, v_2, vals_2)
for all val_1 ∈ vals_1 do
    found ← false
    for all AS ∈ SAS'({v_1, v_2}) do
        if AS(v_1) = val_1 ∧ AS(v_2) ∈ vals_2 then
            found ← true; break
    if ¬ found then
        SAS' REVISE(SAS' , MNodes, SNodes, Links, v_1, val_1)
        if SAS' = ∅ then
            return ∅
return SAS'
```

ADDENDUM TO DETAILED DESCRIPTION

The following technical report is included herein to provide additional discussion regarding embodiments of the invention and the implementation thereof. The report and each of the references cited therein is herein incorporated by reference for all that it teaches without exception. Note that the reference numbers hereinafter refer to the references listed after the end of this section.

1. BACKGROUND

A multitude of software systems support the development of applications that make use of "structured" information (or data). Such systems provide a means of defining a model to represent data, and a means of inserting, updating, deleting and retrieving data. They also constrain the data that may go into the system, considering certain data or combinations of data to be invalid. In addition, they must operate under the assumption that data is being input under concurrent conditions. Data is retrieved by formulating queries as provided by the system. Those queries return responses that can be further processed as required by the application. In a Relational Database Management Systems (RDBMS), models are defined by SQL data definition language (DDL) statements, updates are expressed using SQL DML statements, queries take the form of SQL queries and responses are collections of "tuples". Tuples are ordered sequences of individual data items where each data item is of a data type supported by the RDBMS. Although there is some variation amongst the different vendor implementations, to a large extent RDBMSs provide a well-defined language for defining models, for querying data, for data manipulation(insert, update, delete, etc) and a simple, clear and consistent format of the responses. Nevertheless, it has been recognized that current RDBMS relational models are lacking when modeling real world applications. The lack of a high level model makes it difficult to build distributed systems, that share data. The time it takes to develop software programs, and the lines of code produced, seem wildly out of proportion in relation to the conceptual complexity of the application. Furthermore, the code that is produced is often hard to read. The lack of readability and inordinate number of lines of code result in systems that are difficult and time consuming to maintain.

Database applications are typically developed using a modern object oriented programming language, such as Java, C++, an C#. Developers model applications utilizing "class" constructs of the language. For example to model a Person, the developer might define a Person class. Object-oriented" database management systems (OODBMS) provide a means of persisting the instances or objects of a class as well as a means of querying the persisted objects. Queries return collections of objects rather then tuples. Standards for query based languages for OODBMSs have been developed but there has not been a consensus amongst vendors to use those standards. Similarly there is no consensus regarding a data manipulation language for OODBMSs. One popular approach to OODBMSs utilizes an underlying RDBMS along with an object relational mapping(ORM). Object-relational mappings are defined from classes to the underlying relational model. Once those mappings are defined, objects can be created in the standard way as provided by the object oriented programming language and stored into the database. In the ORM approach, sometimes a language is provided for querying and other times a class library is provided for the construction of queries. In some OODBMSs, queries have a form that is similar to SQL. OODBMSs tend to work for simple queries and data inserts, but often there is a need to resort to standard SQL to retrieve the data. The requirement to create mappings adds complexity to the programming effort. Although OODBMSs can reduce the time to create code, they still require significant effort and produce obscure, hard to read code.

2. DETAILED DESCRIPTION

The figures are intended as an aid to the teaching of a database system that highlight some notable features and demonstrates the utility of, and various components of, an embodiment, implemented as computer programs running on one or more computers.

2.1. A Simple Person Model

FIG. 21 And FIG. 22 show a complete example of creating a model (embodied in the schema component), populating the model, and querying the model. Only minor details are left out, such as import statements and some class headings. The intention of this example is not to teach every aspect of the language constructs, but rather to highlight the readability of the constructs, the rich structure of the responses, the types of components that are used, and to gain an overall basic understanding of the system. Of particular note is that although no classes are defined or generated, the response can be extracted in an object-oriented fashion, using "getter" methods. To those skilled in the arts, the ability to produce rich object oriented responses without classes may seem surprising. The means by which that is accomplished is elaborated in the sections following the presentation of the examples.

An embodiment provides for variable declarations that are used to define schemas, queries and data manipulation statements. 2120 and 2130 show several such variables that are constructed using the declaration factory shown in 2110. The declaration factory takes a string argument that represents the namespace of the components that are created. The namespace serves to prevent name clashes when utilizing different schemas. 2120 illustrates how to construct Entity-Type components. EntityType components represent the elements whose creation is handled by the database system and which are associated with constraints as defined in a Schema. A schema is created in 2140. The first create statement shown in 2150 constrains entities of type State-Type to have two string properties: a StateName property and a Country property. Note that StateName and Country are variables defined in 2130. This declaration introduces two relations: one named "StateName" a subset of the Cartesian product, StateType×String, and another named "Country" of type StateType×String. Since StateName is declared to be a property, there can be at most one String for any entity of type StateType. Similarly for the Country property. Both properties together are a primary key of StateType. A primary key uniquely identifies an instance of an entity type. In this case, any entity of type StateType can be uniquely identified by the StateName and Country properties. Since both StateName and Country are part of the primary key all entities of type StateType must have a StateName and a Country.

Entity types are similar to "tables" in a typical RDBMS and the declaration in 2150 is similar form to a "CREATE TABLE" declaration in a RDBMS. For instance, is such a system one might declare:

```
    CREATE TABLE State (
(1) StateName varchar(128) NOT NULL,
    Country varchar(128) NOT NULL,
    PRIMARY KEY ('StateNames', 'Country'))
```

"CREATE TABLE" statements in an RDBMS results in the declaration of one relation rather then many. In the case shown there is one binary relation, of type Varchar xVarchar. Typically, RDBMSs tables often have arity greater then two. For instance, for the State table shown, many developers will add a "StateID" column and declare it to be the PRIMARY KEY as follows:

```
    CREATE TABLE State (
(2) StateID int NOT NULL AUTO_INCREMENT,
    StateName varchar(128) NOT NULL,
    Country varchar(128) NOT NULL,
    UNIQUE KEY UX_StateName_Country ('StateNames', 'Country'))
```

The State table declares a relation of arity three, a subset of type INTxVARCHARxVARCHAR. The StateID column is declared in order to avoid foreign keys consisting of multiple columns. In an embodiment, such artifacts are not required since, as demonstrated by the CityType declaration shown in 2160 and the AddressType declaration shown in 2170, both primitive and entity type fields can be part of a primary key. The CityType declaration defines two properties, the CityName string property and the State property and introduces two corresponding binary relations. The CityName relation of type CityType×String and the State relation of type CityType×StateType. Also of particular note is that the State property is also part of the primary key. Entity type declarations differ from RDBMS table declarations in that they introduce multiple binary relations rather then one relation with multiple columns. Furthermore, the "columns" can be either "properties" or "attributes". A property column results in an "at most one" or a "exactly one" binary relation, whereas an attribute column results in either a "one to many" or "many to many" relation. For instance in the declaration 2180, PersonID, LastName, FirstName and Address are properties, whereas AnyEmail and AnyPhoneNumber are attributes. By convention, attributes are prefixed with "Any". The declaration also demonstrates the that entity types can be required or optional associations, using the mustHave and optional constructs respectively.

2210 demonstrates how to get data into the system using instance expressions. Note how easy it is to read the expression. It inserts an instance of a Person with PersonID set to 1, and a last name of "smith", a first name of "john", and address of "123 Main St, New York, N.Y. 12345", with multiple emails and multiple phone numbers. Instance expressions can be of several forms. In this case the instance is created only if it does not already exists, otherwise it is updated. Other forms of instance expressions only perform updates if the entity exists, otherwise it generates an error. There is also a form of an instance expression that creates a new instance only. In a traditional SQL based RDBMS, getting data of this form into the system would require several individual insert statements and the programmer would have to take care to set the appropriate transaction isolation levels and to issue a rollback if an exception is generated before the transaction completes.

2250, 2260 and 2270 illustrates add, remove and update operations. The add operation associates an additional email with the person identified by PersonID of 2. The remove operation removes the email association of that person with "marysmith@bb.com". The update operation sets the association to "marysmith@aa.com" and "marysmith@dd.com", removing any other associations.

2220 demonstrates a query which returns the person ID, first name, address, emails and phone numbers of persons whose last name is smith.

2230 extracts the results of the query. Collections of result structures produced by queries in an embodiment are analogous to collections of object instance in object oriented programming languages. Note the use of the "get" methods which extracts data, analogous to "getter" methods used to extract data from objects. The "get" method can return an instance of a primitive type, a collection of instances of primitive types, a result, or a collection of results depending on whether the type of it's variable argument. For instance, since LastName is declared to be a string property variable, the get method returns a string. Since AnyPhoneNumber is declared to be a string attribute variable, the get method returns a collection of strings. Since Address is an entity property the get method returns a result.

The example demonstrates a remarkable aspect of embodiments whereby object oriented response structures are produced despite the lack of class definitions in the code. The developer need not define classes and an embodiment need not generate classes. Even without class definitions, rich object oriented structures can be produced. Object oriented structures can be inferred from queries, rather then from class definitions. In fact, even primitive types can form the root of an object-oriented result structure. For instance, in 2230, note the call 2240. It appears as if AnyPhoneNumber an instance variable of person. Using the features of an embodiment one could also issue queries like:

```
(3)
EntityVariableAttribute AnyPersonWithPhoneNumber =
  getInverse(PersonType, AnyPhoneNumber);
EntityExpression phoneNumberQuery =
  AnyPhoneNumber.has(
    AnyPersonWithPhoneNumber.has(PersonID,LastName, FirstName));
Collection<Result> phoneNumbers = db.entitySolve(phoneNumberQuery);
if(!Util.isEmpty(phoneNumbers)) {
  for(Result phoneNumber : phoneNumbers){
    System.out.println(phoneNumber.getEntity( )+" "
    phoneNumber.get(AnyPersonWithPhoneNumber));
  }
}
```

The query returns, for each phone number, the person ID, the last name and the first name of persons with that phone number. Notice the call to phoneNumber.get(AnyPersonWithPhoneNumber). Although phoneNumber is a primitive string type the call is analogous to a getter call on a "phoneNumber" object, which returns a collection of persons with that phone number.

Of particular note is the fact the nulls are only used in responses, and not in schema declaration, queries or instance expressions. In this example, Person.get(FirstName) can return a null value, to indicate that no FirstName has been associated with a particular person. In schema declarations, the mustHave operation provides functionality similar to "not null" columns, and the optional operator provides functionality similar to "null-able" columns. The "find" query construct provides a means for returning responses where the getter method may return a null or empty response. There is no need to indicate that a person has no first name by setting the first name column to null. Instead the first name getter method returns null if no first name has been associated with a person. If a person has a first name, instead of setting it to null, it can be removed.

2.2. an Electronic Medical Record Example

The examples in FIG. 21 and FIG. 22 demonstrate how simple object oriented structured responses can be returned from queries, without any class definitions. In addition, more complex structures can be returned. For instance in some cases it is appropriate to return a collection of tuple responses where each tuple is a mapping from variables to primitive type instances or variables to results.

To illustrate the ease with which models and queries can be formulated and responses extracted, a more complex example based on an "Electronic Medical Records" (EMR) application is shown. The following is an informal outline of the entity types in the model shown in FIG. 24.

A Visit is intended to model a patient visit (in a hospital or physician's office for example).

A Visit must have the following properties:
  A unique VisitID
  A VisitStatus which can be one of {Active, Discharged, PreAdmit, PreReg}
  A VisitStay which can be one of {InPatient, OutPatient, ERPatient}
  A Patient (of type Person)
A Visit can optionally have the following properties:
  An AdmitDate
  A DischargeDate
  A Visit can be associated with one or more VisitRoleAssoc where A VisitRoleAssoc is intended to model a person that has a role in caring for the patient
    A VisitRoleAssoc has the following properties
    A VisitRole which can be one of {Attending, Admitting, Referring, Consulting}
    A Person
A PhysicianGroup is intended to model a Physician Group Practice.
    A PhysicianGroup has the following properties:
    A GroupID
    A GroupName
    A PhysicanGroup is associated with at least one member: AnyPerson
Users of the EMR can set preferences that affect the list of patients displayed on a landing page. These preferences are:
    An ActiveStayPref that can be one or more of {InPatient, OutPatient, ERPatient}. For example, if only InPatient is set, then the user will only see inpatients on the landing page.
    A VisitRolePref to indicate the roles that either they or anyone in their physician group has. The role must be one of {Attending, Admitting, Referring, Consulting}.
    The user can also explicitly exclude certain visits.
    The schema declaration for the model is shown in 2410 and 2420.
    The landing page should display active visits that the user has some relationship with. The user will have a relationship to a visit if they have some role in the patient care, or if a person in a physician group they belong to has a role. The role of the user or the associated group member must be one that the user has indicated in their preferences. Furthermore the visit stay type (InPatient, OutPatient, or ERPatient) must be one that the user has specified in their preferences. Finally the visit should not be one that the user has explicitly excluded. For each such visit that the user has a relationship with, display the visit ID, the admit date, the visit stay, the patient person ID, last name and first name, Furthermore, for each visit display the physicians (with person id, last name and first name) and their roles in the patient care.
    The query in 2510 returns a response, part of which is shown in 2530, that displays all the required information for every user in the system along with the users person id, last name and first name. The query is formatted for clarity. Associations of the same entity type are left aligned. So for example, PersonID, LastName, AnyVisitRolePref, AnyPhysicianGroup, and FirstName are all left aligned under Person and are associated with Person.
    In this case a collection of result tuples is returned. By considering all the result tuples in the response, it is possible to extract out the elements required for display. However, using the "mapBy" feature, rather then returning a collection of result tuples, a collection of results can be returned. Each result is a structure that contains for each Person, the visits for that person, and for each visit the persons in the user's physician group that has a role, and for each such person the roles they have in patient care. A map by query is shown in 2610 and part of the response is shown in 2620.
    The example demonstrates how a rather complex query can be formulated, and the complex structured responses can be conveniently extracted from the collection of responses, even though no classes are defined.

2.3. Overview

Current RDBMSs assume a fixed set of primitive types, comprising types such as Integer, Floats, Strings (Varchar), and Dates. Relations are defined based on those fixed types. For example, one might define a table Person that has a FirstName column which is of type String, a LastName column of type String, a PersonID column of type Integer, and a BirthDate column of type Date. Corresponding to that Person table, the RDBMS would store relations consisting of 4-tuples of type (String, String, Integer, Date).

From a modeling perspective, it is also possible to model fit name, last name, person id, and birth date as binary relations. For instance, last name, could be modeled as a binary relation between a Person type and a String type. In fact, from a modeling perspective, application data can be modeled using only binary relations. However, there are a variety of reasons why modeling applications using only binary relations is difficult using current RDBMSs. Consider, for example, that using current RDBMSs there is no way to add a Person type that can serve as the field of a table and which is treated equivalently to any other type. Furthermore, using binary relations would also require that all tables contain only two columns. Executing SQL statements would require numerous joins, impacting performance as well as resulting in clunky SQL statements.

In the approach of this teaching, it is suggested to model applications using only binary relations, although relations of arity greater then two are also supported. A number of constructs are introduced to accommodate modeling using binary relations, First of all, adding new types to the relational model is supported. For example, for the person model previously considered, a new type PersonType can be introduced. PersonType is an example of a kind of entity type. Instance expressions, provides a means for creating new instances of any entity type. To model a last name, a LastName relation is constructed, where LastName is a binary relation between instances of type PersonType and strings. Similarly, FirstName, is binary relation between a PersonType and a string, PersonID is a binary relation between a PersonType and an integer and BirthDate is a binary relation between a PersonType and a date.

Modeling using binary relations and entity types is easier then using relations of arity greater then two and there is less variability in the models. For example, continuing with the person model, suppose the application needs to model postal addresses. Using the approach suggested in this teaching, one could introduce an new type, AddressType, and new Address binary relation between a PersonType and an AddressType. If a person can have only one address then the Address relation can be stated to be a property. If a person can have multiple addresses, then the property constraint can be removed. In fact, it would be easy to change whatever decision is made initially by either adding or removing the property constraint. On the other hand, using current RDBMSs, there are no direct constructs provided to declare a relation between a person type and an address type. Instead, the Person table, can use a foreign key of the Address table. However, that approach only works if a Person can have at most one address. If a person can have multiple addresses, then a new PersonAddress table can be used to represent that relation. So for example, if you start out assuming that a person can have only one address but subsequently decide a person can have more then one address, the table would have to change. But note also that a PersonAddress table could be used in the case where a person can have only one address. Thus implementing the relation between a Person and Address can be accomplished in a variety of ways using current RDBMS constructs.

Another remarkable and surprising consequence of using binary relations is that object structures can automatically be inferred from queries and schemas.

2140 shows how several entity types can be created in a schema.

RDBMSs also support a variety of constraints, which constrain the valid forms of data. One type of constraint, a property constraint is not directly supported in RDBMSs. Consider for example a model of a Person whereby the Person can have at most one first name and at most one address. Using current RDBMSs the first name would be a column of the Person table. By virtue of it being a column there can be at most one first name per person. Similarly, if the Address table primary key is used as a column (or columns in the case of a multiple column primary key) of the Person table, than there can be at most one address per person. However, there is nothing which prevents a developer from created a PersonAddress table even in the case where there is as most one address per person. In that case, the developer would have to declare the person foreign key in the PersonAddress table to by the primary key of the PesonAddress table. Note that there is no explicit way to declare a property constraint in current RDBMSs. However, using the approach introduced here, property constraints are explicitly stated and can be declared on any binary relation, whether the relation involves an entity type and a primitive type or an entity type and another entity type. For the Person example, under consideration, both first name and address would be property constraints of Person.

Current RDBMSs also support constraints such as keys and primary keys, and null constraints. In this teaching those constraints are also supported, although they take on a different form. In current RDBMSs a key is a constraint on a relation, whereas in this teaching a key is a set of binary relations. Rather then null constraints, must-have constraints are introduced.

The query shown in 2220 illustrates how intuitive and readable queries are in contrast to SQL queries. The query form also lends itself to programmatic constructs and XML syntax. In fact, the query as shown is Java code, but it could be implemented easily in any modern programming language. The query returns the person id, first name, address, all phone numbers, and all emails of all persons whose last name is "smith". The query only returns persons with a person id and a last name of smith. The first name, the address, the phone numbers and the emails are optional. For example, if the person has a person id and a last name of smith but no phone numbers, the person is still returned, but with an empty set of phone numbers.

The query has two parts. The first part,

Person.has(PersonID, LastName.is("Smith")), is the required part of the query. The second part are a set of optional queries, that are related to the results of the required part. The "find" operator applies Person to each of it's subexpressions to produce the optional expressions. In this case 4 optional expressions produced:

1. Person. has (FirstName)
2. Person. has (AnyPhoneNumber)
3. Person. has (Email)
4. Person. has (Address.has(Street, Street2,
   City.has(CityName,State.has(StateName,Country)),
   Zip.has(Zip5,Zip4)))

Each optional expression is evaluated for each person found in the required part.

Note that the response produced as shown in 2230 has the desired object structure even though no classes are defined. Optional expressions are a means of chaining expressions, whereby the optional expressions depend on the results of the parent expressions. Remarkably, the dependent queries still result in a set of rich object oriented responses.

There are multiples ways to handle this scenario in SQL, but much more coding is required. In the first approach, multiple SQL statements can be used.

(4)   Select PersonID, FirstName
      From Person
      where LastName = "smith"

Then with the PersonIDs, $(p_1, p_2, \ldots, p_n)$ found in the first query you can issue the queries:

(5)   Select Street1, Street2, CityName, StateName, Country, Zip5, Zip4
      From PersonAddress
      where PersonID in $(p_1, p_2, \ldots p_n)$
(6)   Select PhoneNumber
      From AnyPhoneNumber
      where PersonID in $(p_1, p_2, \ldots p_n)$
(7)   Select email
      From AnyEmail
      where PersonID in $(p_1, p_2, \ldots p_n)$ If the number of person ids returned from the first query is large, then alternate SQL statements must be used, such as putting the results into a temporary table. If multiple statements are used, then the programmer also needs to make sure to appropriately handle transactions. For example, the first statement can return persons whose last name is Smith, but some of those persons names could be changed prior to issuing the remaining statements, or the person may have been deleted altogether. Programming correctly for transactions can be complicated and be the source of many subtle bugs.

With optional expressions, these kinds of scenarios can be handled with one expression and an embodiment can take care of the complex transactional coding.

Alternatively, using SQL, one could issue one statement using left outer joins, such as the following:

Select PersonID, FirstName,
Street1, Street2, CityName, StateName, Country, Zip5, Zip4,
PhoneNumber
Email
From Person
left outer join PersonAddress
  on (PersonAddress.PersonID = Person.PersonID)
left outer join AnyEmail
  on (AnyEmail.PersonID = Person.PersonID)
left outer join AnyPhoneNumber
  on (AnyPhoneNumber.PersonID = Person.PersonID)
where LastName = "smith"

A left join must me used since first name, address, phone number and emails are all optional, and an inner join would only show persons that have at least one first name, and at least one address, and at least one phone number and at least one email. The given SQL query will produce n×m rows for each person having n emails and m phone numbers. In order to produce a Person object with FirstName, AnyEmail, AnyPhoneNumber fields an application developer would be required to process the rows and re-form them into the appropriate object structure.

Each required query in 2220 is an abbreviation of a conjunctive predicate logic expression. For example, the required expression, Person.has(PersonID, LastName.is("Smith")), is an abbreviation for the conjunctive expression:

PersonID(Person, PersonID)∧LastName(Person, LastName)

Note how the PersonID and LastName are used as relation names and variable names in the same expression.

Although the expression is interpreted as a conjunctive expression, it is also compatible with the familiar object oriented interpretation whereby Person is an entity with fields PersonID and LastName, and where the LastName is "Smith".

Such abbreviations greatly simplify the formulation of and the readability of queries. The queries have an object oriented flavor that simplifies the formulation of the query. Furthermore, it reduces the number of characters in the query. This becomes more salient with more complex queries. For example, the expression

```
Person.has(Address.has(Street, Street2,
    City.has(CityName, State.has(StateName, Country)),
    Zip.has(Zip5, Zip4)))
``` is an abbreviation for the conjunctive query:

```
Addresss(Person, Address)^
Street1(Address, Street1)^
Street2(Address, Street2)^
City(Address, City)^
Zip(Address, Zip)^
CityName(City, CityName)^State(City, State)^
StateName(State, StateName)^Country(State, Country)^
Zip4(Zip, Zip4)^Zip5(Zip, Zip5)
```

Instance expressions are introduced as a convenient form to insert, delete and update data. To illustrate instance expressions, consider the Address type. The Address type is defined to have fields Street1, Street2, City and Zip, where City has fields CityName and State, and State has fields StateName and Country and Zip has fields Zip5 and Zip4. Using a standard relational database Address, City, State and Zip would each be tables. Embodiments of the present disclosure can define entity types, AddressType, CityType, StateType and ZipType. Suppose an application needs to insert an address, "110 Main St.", "New York", "NY", "12345-2222". In order to do so the application must first check if the state, "NY" (in country "US") exists. If it does not then, it must insert it and retain the primary key of the newly inserted row. If it does, then it must retrieve the primary key of the existing row. Similarly it must check for the Zip. Then with that state primary key it must check if the city exists and finally with the zip primary key and the city primary key it must check for the existence of the address row.

The following instance expression can accomplish the insert with just one statement:

```
Address.instance(
    Street.is("123 Main st"),
    Street2.is(""),
    City.instance(
        CityName.is("New York"),
        State.instance(StateName.is("NY"), Country.is("US"))),
    Zip.instance(Zip5.is("12345"), Zip4.is("")))
```

There are various forms of instance expressions. All instance expressions must be formed with fields consisting of the primary key of the type being updated. For example, for AddressType, the primary key (also a key) is defined in the schema to consist of Street, Street2, City and Zip fields. Another form of instance expression, uses the "exists" operator, as shown in 2250, 2260 and 2270. An instance expression created using the exists operator, are expected to already exist in the database. An exception is generated if they do not exists.

In current RDBMSs results take the form of rows of data. In object oriented systems the results take the form of objects. However, typical approaches to building object-oriented database systems assume that at any particular instance there is a "fixed" object-oriented model. The object-oriented model can be altered and added to, but when a query is issued, the response will be based on the "fixed" object model at the time of the query. An alternative approach is offered in this teaching. Instead of a fixed object model, rich object structures are "inferred" from the query and the relational schema. No class definitions or object-relational mappings are required. A greater variety of useful object responses can be produced. When constructing a query, developers need only consider the relational schema and the relations of interest as required by the application.

In the view introduced here, objects are automatically inferred views of the underlying relational database. Objects are generally viewed as having fields, and associated with each field is a collection of other objects. Some fields associated with an object are properties where the collection of objects associated with the field will contain at most one element. In order to effectively process objects, it's structure must be known. The structure must identify not just the immediate fields of the object but also, recursively, the fields of the objects pointed to by the fields. In it's simplest form, object structure is a tree whose nodes are associated with one variable. An example is shown in FIG. 27. However to accommodate more complex structures, a specialized tree hypergraph representation that is a generalization of a simple tree structure is used. A hypergraph is a generalization of a graph that contains edges with more then 2 vertices. FIG. 29 illustrates a generalized object structure formed from the application query in 2510.

As an illustration, the object structure of FIG. 27 is inferred from the query in 2220. One can see the correspondence between that query and the structure. Note how the distinguished variable, Person, of the required expression Person. has (PersonID, LastName. is ("Smith")) becomes the root of that tree and PersonID and LastName within the "has" leads to edges from Person to PersonID and from Person to LastName. Similarly, there is an edge formed from each of the variables in the "find", resulting in edges from Person to FirstName, Person to AnyPhoneNumber, Person to AnyEmail, and Person to Address. Those edges are marked with a * since they are formed from the fields with the optional "find" subexpression. Edges are added for Address, City, State and Zip in a similar manner. The resulting graph, reveals the object structure. The Person object will have fields PersonID, LastName, FirstName, Address, AnyPhoneNumber and AnyEmail. Address will have fields Street, Street2, City and Zip; City will have fields CityName and State; State will have fields Statename and Country; Zip will have fields Zip5 and Zip4. From the schema it can be determined that all fields are properties other than the AnyPhoneNumber and AnyEmail fields.

The graph of shown in FIG. 28 is constructed in a similar manner from the query in 2510. However, the resulting graph has cycles, so the graph must be further processed to compute it's object structure. Looking at the graph in FIG. 29, you can note that there is a cycle:

AnyPhysicianGroup→AnyPerson→AnyVisitRoleAssoc→VisitRole→AnyVisit→VisitStay→Person→AnyPhysicianGroup.

and another cycle that overlaps with it:

AnyVisitRoleAssoc→AnyVisit→Person→VisitRole→AnyVisitRoleAssoc and another cycle that overlaps with that:

AnyVisit→VisitStay→Person→AnyVisit

The nodes from those three overlapping cycles are grouped to form a node containing the variable AnyPhysicianGroup, AnyPerson, AnyVisitRoleAssoc, VisitRole, AnyVisit, VisitStay, Person, AnyVisitandVisitStay as shown in FIG. 29. The other nodes, GroupID, PersonID, VisitID and VisitStatus are leaves, not contained in any cycle. The resulting structure is a tuple of objects. The AnyPhysicianGroup object will have a GroupID field, the Person object a PersonID field and the AnyVisit will have a VisitID and a VisitStatus field. The other objects will not have any fields.

The graph structures presented in the previous examples only represent the structure of objects but not the data. Various structures are defined in this teaching to represent both the object structure and the data, comprising assignment structures, results and result tuples as outlined in Section 2.4.5. As shown in that section there is a relationship between the object structures and data. For example, assignment structures can be used to generate rws of responses. The assignment structures are more compact representations then rws of responses.

To be more concrete, consider that a person can have many emails and many phone numbers. One can formulate a query to find all emails and phone numbers of a particular person. Using relational algebra, one can generate 3-tuple solutions to represent the answer to the query. For example if a person identified by person id of 1 has emails, john@aa.com, and john@bb.com and phone numbers, 555-1212, 555-1313 the three tuple solutions are(1, john@aa.com, 555-1212), (1, john@aa.com, 555-1313) (1, john@bb.com, 555-1212) and (1, john@bb.com, 555-1313). However, an object solution, might simply be represented as (1, (email, {john@aa.com, john@bb.com})), (phonenumbers, {555-1212, 555-1313})). Notice how, the tuple set solution can be generated from the object solution. The solution will consist of all tuples of the form (1, email, phone) where email is any one of {john@aa.com, john@bb.com} and phone is any one of {555-1212, 555-1313}. The object solution seems more fundamental and compact, in that the three tuple solution can be generated from the object solution.

2.4. Foundations

In the following sections certain standard mathematical constructs are used.

Definition (1) For any set, S, |S| will denote the cardinality of S.

Definition (2) A tuple is an ordered sequence of the form $(e_1, e_2, \ldots, e_n)$.

Definition (3) For any tuple t of the form $(e_1, e_2, \ldots, e_n)$, the elements of t, Elements (t), is $\{e_1\} \cup \{e_2\} \cup \ldots \cup \{e_n\}$.

Definition (4) For any set of tuples, TS of the form, $\{t_1, t_2, \ldots t_m\}$, the elements of TS, Elements (TS), is the set Elements $(t_1) \cup$ Elements$(t_2) \cup \ldots \cup$ Elements$(t_m)$.

Definition (5) The arity of a tuple of the form, $(e_1, e_2, \ldots, e_n)$, is n.

Definition (6) For any sequence of domains, $D_1, D_2, \ldots, D_N$, the cross product, $D_1 \times D_2 \times \ldots \times D_N$, is the set of all $(d_1, d_2, \ldots, d)$ such that for all i from 1 to n, $d_1$ is in $D_1$.

Definition (7) For any domain D, $D^n$, is $D \times D \times \ldots \times D$ (n times).

Definition (8) For any sequence of domains, $D_1, D_2, \ldots, D_N$, a relation R over $D_1, D_2, \ldots, D_N$ is a set of tuples such that all for all t in R, t is in $D_1 \times D_2 \times \ldots \times D_N$. $R:D_1 \times D_2 \times \ldots \times D_N$ will denote such a relation.

Definition (9) A function is a relation, $F:D_1 \times D_2$, where all $d_1$ in $D_1$, there exists one and only one $d_2$ in $D_2$ such that $(d_1, d_2)$ is in F. $F:D_1 \to D_2$ will denote such a function.

Definition (10) For any relation, $R:D_1 \times D_2$, and any domain $D_{11} \subseteq D_1$ and $D_{21} \subseteq D_2$ the restriction of R to $D_{11}$ and $D_{12}$, Restrict(R):$D_{11} \times D_{12}$, is the set of (x, y) in R where x is in $D_{11}$ and Y is in $D_{21}$.

Definition (11) For any relation, $R:D_1 \times D_2$, GroupBy(R) is a map from $D_1 \to \wp (D_2)$ where GroupBy(R)(x)=$\{y|(x, y) \in R\}$.

Definition (12) For any finite set of sets, SS, of the form $\{S_1, S_2, \ldots S_N\}$ the elements of SS, Elements (SS), is the set $S_1 \cup S_2 \cup \ldots \cup S_n$.

Definition (13) For any function $F:D \to \wp (S)$ where domain (F) is finite, the range elements of F, RangeElements(F), is Elements(Range(F)).

Lemma (1) Let $D, D_1, D_2 \ldots D_n$ be sets where for all i from 1 to n, $D_i \subseteq D$ and for all j from 1 to n, where $i \neq j$ $D_i \cap D_j = \emptyset$. Suppose also there are sets $R, R_1, R_2, \ldots R$. where for all i from 1 to n, $R_i \subseteq R$ and mappings, $F_1:D_1 \to R_1$, $F_2:D_2 \to R_2, \ldots, F_n:D_n \to R_2$ then $F_1 \cup F_2 \cup \ldots \cup F_n$ is also a mapping.

Definition (14) A directed graph is comprised of a finite set of vertices V and a set of edges of the form $(v_1, v_2)$ where v and $v_2$ are in V. DG (V, E) will denote a directed graph with vertices, V, and edges E. Similarly for any directed graph dg, V (dg) will denote the vertices, and E (dg) will denote the edges. Sometimes vertices are also called nodes.

Definition (15) A directed labeled graph is comprised of a finite set of vertices V and a set of edges of the form $(v_1, l, v_2)$ where $v_1$ and $v_2$ are in V and $l$ is the label of the edge. DLG (V, E) will denote a graph with vertices, V, and edges, E.

Definition (16) A root vertex, v, in an acyclic directed graph, ADG, is a vertex for which there is no other vertex $v_1$ where $(v_1, v)$ is in ADG.

Definition (17) A leaf vertex, v, in an acyclic directed graph, ADG, is a vertex for which there is no other vertex vi where $(v, v_1)$ is in ADG.

Definition (18) For any acyclic directed graph, ADG, and any vertex, v, in the graph, the depth of v in ADG, is defined to be the length of the largest path from v to any other vertex in ADG.

Definition (19) For any acyclic directed graph, ADG, the depth of ADG, is defined to be the length of the longest path in ADG.

Lemma (2) For any acyclic directed graph, ADG, the longest path is from a root vertex to a leaf vertex.

Definition (20) A undirected graph is comprised of a finite set of vertices V and a set of edges of the form $\{v_1, v_2\}$ where v, and $v_2$ are in V. UG (V, E) will denote a undirected graph with vertices, V, and edges E. Similarly for any undirected graph ug, V (ug) will denote the vertices, and E (ug) will denote the edges. Sometimes vertices are also called nodes.

Definition (21) The undirected graph of a directed graph, DG (V, E), UG (DG) is the undirected graph, UG (V, UE), where UE the set of all $\{v_1, v_2\}$ such that $(v_1, v_2)$ in E.

Definition (22) An undirected tree is an undirected graph comprised of vertices V, edges E, and a root vertex R where UG (V, E) is acyclic and connected. UT (R, V, E) will denote an undirected tree with root node R, vertices V and edges E.

Definition (23) A directed tree is a directed graph comprised of vertices V, edges E, and a root node R in V such that UG (DG (V, E)) is acyclic and connected. DT (R, V, E) will denote a tree with vertices, V, edges E and root vertex R.

Definition (24) For any set of enumerable values, R, and any other set of enumerable values V, and any maps $M_1: D_1 \to \wp(V), M_2: D_2 \to \wp(V), \ldots, M_n: D_n \to \wp(V)$ where for all i from 1 to n, $D_i \subseteq R$, the merge of $M_1, M_2, \ldots M_n$ denoted $M_1 \oplus M_2 \oplus \ldots \oplus M_n$ is the map M defined as (24.1) $\text{Domain}(M) = \text{Domain}(D_1) \cup \text{Domain}(D_2) \cup \ldots \cup \text{Domain}(D_n)$ (24.2) For any d in Domain(M) let $M_{i1}, M_{i2}, \ldots, M_{ik}$ be the set of all maps in $\{M_1, M_2, \ldots M_n\}$ where for all j from 1 to k, d is in Domain($M_{ij}$) then $M(d) = M_{i1}(d) \cup M_{i2}(d) \cup \ldots \cup M_{ik}(d)$.

Definition (25) For any finite set $\{e_1, e_2, \ldots e_n\}$ and any Map, where $\{e_1, e_2, \ldots e_n\} \subseteq \text{Domain}(\text{Map})$, (25.1) apply (Map, $\{e_1, e_2, \ldots e_n\}$) = $\{\text{Map}(e_1)\} \times \{\text{Map}(e_2)\} \times \ldots \cup \{\text{Map}(e_n)\}$ Definition (26) For any finite set E and any one to one map, $\text{Map}_1$, and a map, $\text{Map}_2: DM \to \wp(\text{Domain}(\text{Map}_1))$ where $DM \subseteq \text{Domain}(\text{Map}_1)$, apply($\text{Map}_1$, $\text{Map}_2$) is the map, apply, where (26.1) Domain(apply) = apply ($\text{Map}_1$, Domain($\text{Map}_2$)) and (26.2) for any v in DM, apply($\text{Map}_1(v)$)) = apply($\text{Map}_1$, $\text{Map}_2(v)$)).

2.4.1. Notation

In the following sections various constructs are defined in terms of other constructs. Those other constructs are either standard constructs such as mappings, sets, tuples, relations, graphs, or constructs that have been defined previously here. The construct itself is given a name, as is the constructs it uses in the definition. For example, in Definition (35) a relational schema is defined and given a name "RS". It is defined in terms of a "TypeVals" mapping construct and a "RelHeaders" mapping. The notation RS(TypeVals, RelHeaders) is used in any definition following to indicate the sub-constructs. Alternatively, TypeVals(RS) and RelHeaders (RS) is used to refer to the sub-constructs for a given relational schema RS. When the RS context is unambiguous, the "(RS)" is left out and just TypeVals and RelHeaders is used.

More generally, constructs are given a name, C, and are defined in terms of other constructs with names, $C_1, C_2, \ldots, C_n$. Then $C(C_1, C_2, \ldots, C_n)$ is used in subsequent definitions to refer to a C construct with sub-constructs $C_1, C_2, \ldots, C_n$. Alternatively, $C_1(C), C_2(C), \ldots, C_n(C)$ or just $C_1, C_2, \ldots, C$ is used when the C context is clear.

2.4.2. Component Overview

In the following sections, numerous components are defined, comprising query expressions, query templates, relational schema, entity relational schema, relation set instance, assignment structures, result and result tuple structures, acyclic problem trees, instance expressions, instance structures, and instance structure graphs. The term "result structure" will be used to denote either results or result tuples. FIGS. 19 and 20 illustrate typical uses of those components. Each row in those diagrams illustrates a component handler, which takes component inputs and outputs another component. For example, 1950 illustrates a query evaluator handler, which takes a query expression, a relational schema, and and relation set instance and returns a collection of result structures i.e results or result tuples. The relationship of the collection of result structures output to the query expression, relational schema and relation set instance inputs is defined in the following sections. In some case the relationship is a "composition" of other handlers. For example, the composition of 1910, 1920, 1930, and 1940 results in the handler shown in 1950. Similarly the handler shown in 2040 is a composition of those shown in 2010, 2020 and 2030.

2.4.3. Relational Schema, Relation Set Instance and Entity Relational Schema

In this and the following sections,

DomainNames, is an enumerable set of domain names,

RelationNames is an enumerable set of relation names,

Values is an enumerable set of values.

Definition (27) A relation header, RH, is comprised of a relation name R in RelationNames, and a n-tuple of domain names, DN where Elements (DN) $\subseteq$ DomainNames. $R(d_1, d_2, \ldots d_n)$ will denote a relation header with relation name R and domain names $(d_1, d_2, \ldots d)$. RelationHeaders will denote the enumerable set of all relation headers.

Definition (28) For any relation header, RH, of the form, $R(d_1, d_2, \ldots d_n)$, (28.1) The arity of RH, arity (RH) is n.

(28.2) the ith domain name of RH, $dn^i(RH)$, is $d_i$.

(28.3) The domains of RH, Domains(RH), is $\{d_1\} \cup \{d_2\} \cup \ldots \cup \{d_n\}$.

In some formulations of relational models, relation headers are associated with a set of attribute names. In this formulation, attribute names are not required, however they could easily be introduced. In particular, a relation header for the form, $R(d_1, d_2, \ldots d_n)$, could be associated with a sequence of n attribute names.

Definition (29) A relation set instance, RSI:RHS$\to$Values", is a mapping where RHS is finite. RelationSetInstances with denote the enumerable set of all relation set instances.

Definition (30) For any relation set instance, RSI, assume Domain(RSI) = $\{rh_1, rh_2, \ldots, rh_n\}$, then the universe of values of RSI, Values(RSI), is Elements (RSI($rh_1$)) $\cup$ Elements(RSI($rh_2$)) $\cup \ldots \cup$ Elements(RSI($rh_n$)). In other words, any value that occurs in any tuple of any relation in the range of RSI.

Definition (31) A relation set instance constraint is a computable function, RSIC:RelationSetInstances$\to$\{True, False\}.

Definition (32) A relation set instance, RSI, satisfies a relational set instance constraint, RSIC, if and only if RSIC(RSI) = True.

Definition (33) For any finite set of relation set instance constraints, $\{C_1, C_2, \ldots, C_N\}$, the intersection of the constraints $C_1 \cap C_2 \cap \ldots \cap C_N$, is a relation set instance constraint, defined as $C_1 \cap C_2 \cap \ldots \cap C_N(RSI) = C_1(RSI) \vee C_2(RSI) \vee \ldots \vee C_N(RSI)$.

Definition (34) A multi-constraint based schema is a relation set instance constraint, CBS, comprised of finite set of relation set instance constraints, $\{C_1, C_2, \ldots, C_N\}$, where $CBS = C_1 \cap C_2 \cap \ldots \cap C_N$.

Definition (35) A relational schema is multi-constraint based schema comprised of TypeVals, RelHeaders, and a relation set instance constraint, RelHeadersConstraint where (35.1) TypeVals is a mapping, TypeVals:TV$\to \wp$(Values), where TV is finite and TV$\subseteq$DomainNames and for all dn in TV, TypeVals(dn) is an enumerable set of values contained in Values.

(35.2) RelHeaders is a finite set of relation headers of the form $R(d_1, d_2, \ldots d_n)$ where $\{d_1\} \cup \{d_2\} \cup \ldots \cup \{d_n\} \subseteq \text{Domain}(\text{TypeVals})$.

(35.3) For any relation set instance, rsi, ReHeadersConstraint(rsi) is true if and only if Domain(rsi)⊆RelHeaders and for all $R(d_1, d_2, \ldots d_n)$ in Domain(rsi), $rsi(R(d_1, d_2, \ldots d_n)) \subseteq \text{TypeVals}(d_1) \times \text{TypeVals}(d_2) \times \ldots \times \text{TypeVals}(d_n)$.

Notice that RelHeadersConstraint are can be determined solely from TypeVals and RelHeaders. Therefore a relational schema can be determined solely from TypeVals and RelHeaders. As described in Section 2.4.1 a relational schema of the above form will be denoted as RS(TypeVals, RelHeaders). Alternatively, for any relation schema, RS, TypeVals(RS), RelHeaders (RS) will be used. When RS is clear from the context, "(RS)" will be omitted and TypeVals, RelHeaders will be used.

Definition (36) For any relational schema, the extension function, Ext (RS), is a mapping Ext:Values→℘ (DomainNames) such that for any value v in Values, Ext(v) returns all dn in Domain(TypeVals) such that v is in TypeVals(d). Note that since Domain(TypeVals) is finite and TypeVals(d) is enumerable, the Ext function can always be computed.

Definition (37) For any relational schema, RS, and any relation set instance RSI, the extension map of RS and RSI, Ext (RS, RSI) is a map where Domain(Ext)=TypeVals(RS) and for all d in Domain(Ext), Ext(d)=Ext(RS) (d)∩Values (RSI). When the context of RS and RSI is clear from the context, Ext will denote Ext(RS, RSI).

A relational schema can also be comprised of various constraints that limit the valid models. Property, must-have, and keys constraints are particularly useful.

Definition (38) For any domains $D_1$ and $D_2$, a relation, R over $D_1 \times D_2$, is a property relation over $D_1$ and $D_2$ if for all $d_1$ in $D_1$ there is at most one $d_2$ in $D_2$ such that $(d_1, d_2)$ is in R.

Definition (39) For any domains $D_1$ and $D_2$, a relation, R over $D_1 \times D_2$, is an inverse property relation over $D_1$ and $D_2$ if and only if for all $d_2$ in $D_2$ there is at most one $d_1$ in $D_1$ such that $(d_1, d_2)$ is in R.

Definition (40) A relational schema with property constraints, RSP, is a relational schema comprised of (in addition to TypeVas, ReHeaders, ReHeadersConstraint), Props, InverseProps, and constraints PropsConstraint, and InversePropsConstraint where (letting Ext=Ext(RSP, rsi) for any relation set instance rsi)
  (40.1) Props is a set of binary relation headers contained in RelHeaders
  (40.2) InverseProps is a set of binary relation headers contained in RelHeaders.
  (40.3) For any relation set instance, rsi, PropsConstraint (rsi) is true if and only if for all $R(d_1, d_2)$ in Props, $rsi(R(d_1, d_2))$ is a property relation over Ext($d_1$) and Ext($d_2$).
  (40.4) For any relation set instance, rsi, InversePropsConstraint(rsi) is true if and only if for all $R(d_i, d_2)$ in InverseProps, $rsi(R(d_i, d_2))$ is an inverse property relation over Ext($d_1$) and Ext($d_2$).

RSP (TypeVals, RelHeaders, Props, InverseProps) will denote a relational schema with property constraints of the above form.

Definition (41) For any domains $D_1$ and $D_2$, a relation $R_1$ over $D_1 \times D_2$, and a relation $R_2$ over $D_2 \times D_1$ are inverse relations if and only if $R_2 = \{(x_2, x_1) | (x_1, x_2) \text{ is in } R_1\}$.

Definition (42) For any domain D, a relation, R, over D×D is commutative if and only if for all (x, y) in R, (y, x) is in R.

Definition (43) A relation schema with inverse relation constraints, RSIR, is a relational schema comprised of InverseRelHeaders, CommutativeRes, and constraints InverseRelHeadersConstraint, and CommutativeRelsConstraint, where (letting Ext=Ext (RSIR, rsi) for any relation set instance rsi)
  (43.1) InverseRelHeaders is a set of sets of exactly two distinct relation headers of the form, $\{R_1(d_1, d_2)_1, R_2(d_2, d_1)\}$, where for all $\{R_1(d_1, d_2)_1, R_2(d_2, d_1)\}$ in InverseRelHeaders $R_1(d_1, d_2)$ and $R_2(d_2, d_1)$ appear in no other set in InverseRelHeaders.
  (43.2) CommutativeRels is a set of relation headers of the form R(d, d).
  (43.3) For any relation set instance, rsi, InverseReHeadersConstraint(rsi) is true if and only if for all $\{R_1(d_1, d_2)_1, R_2(d_2, d_1)\}$ in InverseRelHeaders, $rsi(R_1(d_1, d_2))$ over Ext($d_1$)×Ext($d_2$) and $rsi(R_1(d_2, d_1))$ over Ext ($d_2$)× Ext ($d_1$) are inverse relations.
  (43.4) For any relation set instance, rsi, CommutativeResConstraint(rsi) is true if and only if for all R(d, d) inCommutativeRels, rsi(R(d, d)) over Ext(d)×Ext(d) is commutative.

RSIR(TypeVals, RelHeaders, InverseReHeaders) will denote a relational schema with inverse relation constraints of the above form.

Definition (44) For any domains $D_1$ and $D_2$, a relation, R over $D_1 \times D_2$, is a must-have relation over $D_1$ and $D_2$ if and only if for all $d_1$ in $D_1$ there is at at least one $d_2$ in $D_2$ such that $(d_1, d_2)$ is in R.

Definition (45) For any domains D, $D_1, D_2, \ldots, D_n$ the relations, $R_1:D \times D_1, R_2:D \times D_2, \ldots R_n:D \times D_n$ is a key over D, $D_1, D_2, \ldots, D_n$ if and only if for all v in D there is at most one tuple, $(w_1, w_2, \ldots w_n)$, where for all i from 1 to n, (v, $w_i$) is $R_i$.

Definition (46) An entity relational schema ERS, is a relation schema with property and inverse relation constraints, comprised of, EntityTypes, PrimitiveTypes, ERHeaders, Hierarchy, MustHaves, PrimaryKeys, Keys and constraints MustHavesConstraint, KeysConstraint, and HierarchyConstraint, ResoveHeaderConstraint where (letting Ext=Ext (ERS, rsi) for any relation set instance rsi)
  (46.1) EntityTypes is a finite set where
    (46.1.1) EntityTypes⊆DomainNames and
    (46.1.2) Domain(PrimaryKeys)=Domain(MustHaves)= Domain(Keys).
  (46.2) PrimitiveTypes is a finite set where PrimitiveTypes⊆EntityTypes.
  (46.3) PrimitiveTypesnEntityTypes=∅
  (46.4) For any domain named in PrimitiveTypes and e in EntityTypes, TypeVals(d)∩TypeVals(e)=∅.
  (46.5) ERHeaders⊆RelHeaders and all elements of ERHeaders are relation headers of the form R(e, d) where e is in EntityTypes and d is in PrimitiveTypes or d is in EntityTypes.
  (46.6) For any $R_1C(e, d)$ in ERHeaders, where e≠d there exists an $R_2(d, e)$ such that
    (46.6.1) $R_2(d, e)$ is in RelHeaders not in ERHeaders
    (46.6.2) either d is not in EntityTypes or $R_2(d, e)$ is not in MustHaves (d) and,
    (46.6.3) $\{R_1(e, d), R_2(d, e)\}$ is in InverseRelHeaders.
  (46.7) For any $R_1(e, e)$ in ERHeaders, either
    (46.7.1) There is an $R_2(e, e)$ in RelHeaders where $\{R_1(e, e), R_2(e, e)\}$ is in InverseRelHeaders and not in MustHaves and not in ERHeaders, or (not both)
      (46.7.1.1) $R_1(e, e)$ is in CommutativeRels.

(46.8) Hierarchy is a mapping, Hierarchy:Entity-Types→$\wp$ (EntityTypes) such that
(46.8.1) For any et in EntityTypes, there is at most one et, in Hierarchy (et) such that PrimaryKeys(et$_p$)≠∅.
(46.8.2) Let SubEntity be the set of ($e_2$, $e_1$) such that $e_2$ is in Hierarchy ($e_1$).
(46.8.2.1) Then the transitive closure of SubEntity, denoted as SubEntity$^+$, is a partial order. SubEntity* will denote the reflexive transitive closure.
(46.8.2.2) If ($e_2$, $e_1$) is in SubEntity$^+$ and ($e_3$, $e_2$) is in SubEntity then ($e_3$, $e_1$) is not in SubEntity.
(46.8.2.3) If ($e_2$, $e_1$) is in SubEntity
(46.8.2.3.1) and PrimaryKeys($e_1$)≠∅ then PrimaryKeys($e_2$)=PrimaryKeys($e_1$).
(46.8.2.3.2) MustHaves($e_1$)⊆MustHaves($e_2$).
(46.8.2.3.3) Keys ($e_1$)⊆Keys($e_2$).
(46.8.2.3.4) TypeVals($e_2$)⊆TypeVals($e_1$).
(46.8.2.4) Let DisjointEntity be the set of $\{e_1, e_2\}$ where $e_1 \neq e_2$ and where there does not exist an $e_3$ such that ($e_3$, $e_1$) is in SubEntity+ and ($e_3$, $e_2$) is in SubEntity+ then TypeVals($e_1$)∩TypeVals($e_2$)≠∅.
(46.9) TypeOf is a mapping, TypeOf:VL→EntityTypes such that
(46.9.1) For val in VL,
(46.9.1.1) val is in TypeVals(TypeOf(val)) and
(46.9.1.2) there does not exist an e such that (e, TypeOf(val)) is in SubEntity$^+$ and val is in TypeVals(e).
(46.9.2) VL=Range($e_1$)∪Range($e_2$)∪ . . . ∪Range($e_n$) where $\{e_1, e_2, \ldots, e_n\}$=EntityTypes.
(46.10) MustHaves is a mapping, MustHaves:EntityTypes→$\wp$ (ERHeaders) where for all $e_2$ in EntityTypes, and for all rh in MustHaves ($e_2$) there exists and $e_1$ such that ($e_2$, $e_1$) is in SubEntity$^+$ and rh is of the form R($e_1$, d).
(46.11) Keys is a mapping, Keys:EntityTypes→$\wp$ ($\wp$ (ERHeaders)) where for all $e_2$ in EntityTypes, and for all sets s in Keys ($e_2$), for every relational header rh in S,
(46.11.1) rh is in Props and
(46.11.2) there exists an $e_1$ such that ($e_2$, $e_1$) is in SubEntity$^+$ and rh is of the form R($e_1$, d) and. Furthermore for all $e_2$ in EntityTypes, and for all distinct sets $s_1$ and $s_2$ in Keys ($e_2$), $s_1 \not\subseteq s_2$.
(46.12) PrimaryKeys is a
mapping, PrimaryKeys:EntityTypes→$\wp$ (ERHeaders) where for all $e_2$ in EntityTypes, and for every rh in PrimaryKeys ($e_2$) there exists and $e_1$ such that ($e_2$, $e_1$) is in SubEntity$^+$ and rh is of the form R($e_1$, d). Furthermore for every e in EntityTypes,
(46.12.1) PrimaryKeys(e)⊆MustHaves(e) and
(46.12.2) PrimaryKeys(e) is in Keys (e).
(46.13) For any $e_2$, $e_3$ in EntityTypes, $e_2$ is MH-dependent on $e_3$ if and only if there is an R($e_1$, $e_3$) is in PrimaryKeys($e_2$)∪MustHave($e_2$). The relation MH$^-$ dependent$^+$ is the transitive closure of MH-dependent.
(46.13.1) There does not exist an e in EntityTypes such that e is MH-dependent$^+$ one.
(46.14) For any relation set instance, rsi, MustHavesConstraint(rsi) is true if and only if for all e in EntityTypes, and for all R(e, d) in MustHaves (e), rsi(R(e, d)) is a must-have relation over Ext(e) and Ext(d).
(46.15) For any relation set instance, rsi, KeysConstraint (rsi) is true if and only if for all e in EntityTypes, for all $\{R(e_1, d_1), R_2(e_2, d_2), \ldots, R_n(e_n, d_n)\}$ in Keys (e), the relations Restrict(rsi($R_1(e_1, d_1)$)):TypedExt(e)×Ext($d_1$), Restrict(rsi($R_2(e_2, d_2)$)):TypedExt(e)×Ext($d_2$) . . . , Restrict(rsi($R_n$(en, $d_n$))):TypedExt(e)×Ext($d_n$) is a key over Ext(e), Ext($d_1$), . . . , Ext($d_n$) where TypedExt is TypedExt(ERS, rsi) as define in Definition (47).
(46.16) For any relation set instance, rsi, HierarchyConstraint(rsi) is true if and only if for all $e_1$ and $e_2$ if ($e_2$, $e_1$) is in SubEntity and if val is in Ext ($e_2$) then val is in Ext($e_1$).
(46.17) For any relation set instance, rsi, ResoveHeaderConstraint(rsi) is true if and only if for all R in RelationNames, e in EntityTypes, there is a most one relation header of the form, R($e_1$, d) in ERHeaders, where (e, $e_1$) is in SubEntity*.

An entity relational schema ERS of the above form will be denoted as ERS(TypeVals, Props, InverseProps, InverseRelHeaders, CommutativeRels, EntityTypes, PrimitiveTypes, ERHeaders, Hierarchy, TypeOf, MustHaves, PrimaryKeys, Keys). Alternatively, TypeVals, Props, InverseProps, InverseRelHeaders, CommutativeRels, EntityTypes, PrimitiveTypes, ERHeaders, Hierarchy, TypeOf, MustHaves, PrimaryKeys and Keys will be used when the ERS context is unambiguous. SubEntity will denote the relation defined in (46.8.2). SubEntity ($e_2$, $e_1$) will denote the predicate ($e_2$, $e_1$) is in SubEntity. SubEntity$^+$ ($e_2$, $e_1$) will denote the predicate ($e_2$, $e_1$) is in SubEntity$^+$. DisjointEntity the set defined in (46.8.2.4). JoinedEntity is the set of $\{e_1, e_2\}$ where $e_1 \neq e_2$ and $\{e_1, e_2\}$ is not in DisjointEntity.

Definition (47) For any entity relation schema, ERS, and any relation set instance, rsi, the typed extension of rsi for ERS, TypedExt (ERS, rsi), is a mapping TypedExt:EntityTypes→$\wp$ (Values), where for any e in EntityTypes, TypedExt(e)=Ext(ERS, rsi)(e)∩{vl|TypeOf(vl)=e}.

Definition (48) For any entity relation schema, ERS, and any R($e_1$, $d_2$) in ERHeaders, is said to be
(48.1) a primitive relation header over $e_2$, if ($e_2$, $e_1$) is in SubEntity$^+$ and $d_2$ is in PrimitiveTypes,
(48.2) an entity relation header over $e_2$ if ($e_2$, $e_1$) is in SubEntity$^+$ and $d_2$ is in EntityTypes.
(48.3) The set of all primitive relation headers of ERS, is denoted as PrimitiveHeaders(ERS)
(48.4) and the set of all entity relation headers of and entity relational schema ERS is denoted EntityHeaders (ERS).
(48.5) For any entity type, e, the primitive headers of ERS over e, PrimitiveHeaders(ERS, e) denotes all primitive headers over e,
(48.6) and the entity headers of ERS over e, EntityHeaders(ERS, e) denotes all entity headers over e.

Definition (49) For any entity relation schema, ERS, and any e in EntityTypes,
(49.1) the primitive primary key of e, PrimitivePrimaryKey(ERS, e) is the set of all relation headers rh in PrimaryKey(e) where the second domain of rh is in PrimitiveTypes.
(49.2) the entity primary key of e, EntityPrimaryKey (ERS, e) is the set of all relation header rh in PrimaryKey(e) where the second domain of rh is in EntityTypes.

2.4.4. Variables and Queries

In this and the following sections it is assumed that

Definition (50) VarKeys is an enumerable set of variable keys, and VarNames is an enumerable set of variable names.

Definition (51) Variables are comprised of a variable key, vk⊆VarKeys, a variable name, vn⊆VarNames, and a domain name, dn⊆DomainNames. V(vk, vn, dn) will denote a variable with variable key, vk, variable name vn, and domain name dn. Variables will denote the enumerable set all variables.

Note that two distinct variables can have the same name and domain name if they have different variable keys. For any variable, v, dn(v), will denote the domain name of v and vn(v) will denote the variable name of v, and vk(v) will denote the variable key.

Definition (52) For any variable, V (vk, vn, dn), and any non-empty string yn, the rename of V to yn, Rename (V, yn) is the variable V(vk, yn, dn). For the empty string Rename (V, " ")=V.

Definition (53) An atomic template is comprised of a relation header, $R(d_1, d_2, \ldots, d_n)$ and a sequence of variables, $(x_1, x_2, \ldots, x_n)$.

Note that the relation header has domain names as do each variable. However, it is not required for $d_i=dn(x_i)$, although that will often be the case.

Definition (54) The arity of an atomic template is the arity of the relation header. A binary atomic template is one with arity equal to 2.

Definition (55) For any atomic template, AT, with variables $(x_1, x_2, \ldots, x_n)$, the variables of AT, Vars(AT) is $\{x_1\} \cup \{x_2\} \cup \ldots \cup \{x_N\}$.

Definition (56) A conjunctive template is comprised of a set of variables, Vars, and a finite set of atomic templates, ATS. If ATS is empty then Vars contains at most one variable, otherwise assume ATS is of the form, $\{A_1, A_2, \ldots, A_n\}$, then Vars=Vars($A_1$)∪Vars($A_2$)∪ ... ∪Vars($A_n$).

CT(Vars, ATS) will denote a conjunctive template of the above form.

Definition (57) A trivial conjunctive template, CT, is one where ATS=Ø.

Definition (58) A non trivial conjunctive template, CT, is one where ATS≠Ø.

Definition (59) The primal constraint graph of a conjunctive template, CT(Vars, ATS) is an undirected graph of the form (Vars, E) where E is the set of edges $\{v_1, v_2\}$ such that there exists an atomic template, at in ATS where $\{v_1, v_2\} \subseteq$ Vars (at).

Definition (60) A restriction mapping, RM, is a mapping of the form:RM:Vars→℘ (Values) where Vars⊆Variables.

Definition (61) For any restriction mappings, $RM_1$ and $RM_2$, and any variable v in Domain($RM_1$)∩Domain($RM_2$), the merge of $RM_1$ and $RM_2$ for v, Merge($RM_1$, $RM_2$, v) is the set $RM_1(v) \cap RM_2(v)$.

Definition (62) For any restriction mappings, $RM_1$ and $RM_2$, let $v_1, v_2, \ldots, v_n$ be the variables in Domain($RM_1$)-Domain ($RM_2$) and let $w_1, w_2, \ldots, w_n$ be the variables in Domain($RM_2$)-Domain($RM_1$), and let $y_1, y_2, \ldots, y_k$ be those variables in Domain($RM_1$)∩Domain($RM_2$), then the merge of $RM_1$ and $RM_2$, denoted by $RM_1 \cap RM_2$ is the set of mappings
$\{v_1 \rightarrow RM_1(v_1), v_2 \rightarrow RM_1(v_2), \ldots, v_n \rightarrow RM_1(v_n),$
$w_1 \rightarrow RM_2(w_1), w_2 \rightarrow RM_2(w_2), \ldots, w_n \rightarrow RM_2(w_m),$
$y_1 \rightarrow Merge(RM_1, RM_2, y_1), y_2 \rightarrow Merge(RM_1, RM_2, y_2), \ldots, y_1 \rightarrow Merge(RM_1, RM_2, y_k)\}$ Definition (63) The merge operation of any two restriction mappings is both associative and commutative. Hence for and set of restrictions $RM_1, RM_2, \ldots, RM_n$ the merge of $RM_1, RM_2, \ldots, RM_n$ denoted by $RM_1 \cap RM_2 \cap \ldots \cap RM_n$ is well defined.

Definition (64) A query template, Q, is comprised of a conjunctive template, CT, called the required part, a set of optional query templates, OPT, and a restriction mapping, RM.

Q(CT, OPT, RM) will denote an optional expression of that form; Similarly for any query template, q, CT(q) will denote the required conjunctive template, OPT(q) with denote the set of optional query templates and RM(q) will denote the restriction mapping.

Definition (65) For any query template Q(CT, OPT, RM), the variables of Q, Vars(Q) is equal to
(65.1) Vars(CT) if OPT=Ø
(65.2) Otherwise assuming OPT=$\{Q_1, Q_2, \ldots, Q_n\}$ then Vars(Q)=Vars(CT)∪Vars($Q_1$)∪Vars($Q_2$)∪ ... ∝Vars ($Q_n$)

Definition (66) For any query template Q, a tree of queries, the query tree of Q, QTree(Q) is a directed tree whose vertices are query templates defined recursively as follows:
(66.1) If OPT(Q)=Ø then QTree(Q)=DT(Q, {Q}, Ø)
(66.2) Otherwise let $Q_1, Q_2, \ldots Q_n$ be the optional query templates of Q and assume (inductively) for all i from 1 to n, QTree($Q_i$)=($Q_i, V_i, E_i$) then OTree(Q)=DT (Q, V, E) where V=Q∪$V_1$∪$V_2$∪ ... ∪$V_n$ and E=$\{(Q, Q_1), (Q, Q_2), \ldots, (Q, Q_n)\} \cup E_1 \cup E_2 \cup \ldots \cup E_n$.

FIG. 32 Illustrates the query tree for the query in 2220.

Definition (67) A query template, Q, is well formed if and only if
(67.1) For any node in QTree(Q) with query template $Q_c$, the primal constraint graph of CT($Q_c$) is connected.
(67.2) For any edge ($Q_p, Q_c$) in QTree(Q), there exists a variable, v, such that Vars(CT($Q_c$))∩Vars(CT($Q_p$))={v} and v is not in any cycle of the primal constraint graph of CT($Q_c$).
(67.3) For any queries $Q_1$ and $Q_2$ in QTree(Q), if $Q_1$ is not a sibling, parent or child of $Q_2$ in QTree(Q) then Vars(CT($Q_1$))∩Vars(CT($Q_2$))=Ø.
(67.4) For any edges ($Q_p, Q_1$) and ($Q_p, Q_2$) in QTree(Q), there is at most one variable, v, in Vars(CT($Q_1$))∩Vars (CT($Q_2$)) and if there is such a variable, v, then v is also in Vars(CT($Q_p$)).

Optional queries provide a means of chaining expressions, whereby the evaluation of the child optional queries depend on the results of the parent query. The chained query still returns an object structure. Chaining combined with automatic object inference, leads to a significant reduction in lines of code and complexity of coding, since transactions can be handled by the framework, rather than the developer.

From here on out, any reference to a query template, is assumed to be well formed.

2.4.5. Assignment Structures, Results and Result tuples

In this section, the formalization of the structure of objects and result structure that represents a solution to a query is presented.

Definition (68) A tree hypergraph, TH, is comprised of a set of nodes N, and set of links L where
(68.1) each node in N, is a set of variables, and each link in L is set of two distinct variables.
(68.2) For any two distinct nodes, $n_1$ and $n_2$, $n_1$ and $n_2$ must be disjoint.
(68.3) For any link, $\{v_1, v_2\}$, there must be a unique pair of two distinct nodes node $n_1$ and $n_2$ where n contains $v_1$ and $n_2$ contains $v_2$. The set $\{n_1, n_2\}$ is the nodes of link $\{v_1, v_2\}$ in TH, denoted as Nodes (TH, $\{v_1, v_2\}$).
(68.4) Furthermore for any two nodes n, and $n_2$ there is at most one link, l, where l∩$n_1$≠Ø and l∩$n_2$≠Ø.

TH(N, L) will denote a tree hypergraph of the above form.

Definition (69) The graph of an tree hypergraph, TH(N, L), Graph (TH), is the undirected graph, UG (N, E) where E consists of all $\{n_1, n_2\}$ such that there is a link $\{v_1, v_2\}$ where $v_1$ is in $n_1$ and $v_2$ is in $n_2$.

Definition (70) A tree hypergraph is well formed if and only if Graph (TH) is acyclic and connected.

FIG. 31 Shows a tree hypergraph intended to aid in the formal definitions above. In that figure, $\{x_1, x_2, x_3\}$, $\{x_4, x_5,$ $x_6\}$, $\{x_7, x_8, x_9\}$, $\{x_{10}\}$, $\{x_{11}, x_{12}, x_{13}\}$ and $\{x_{14}, x_{15}, x_{16}\}$ are nodes. The root node is $\{x_1, x_2, x_3\}$. The links are $\{x_1, x_4\}$, $\{X_1, X_7\}$, $\{x_3, x_{10}\}$, $\{x_5, x_{12}\}$ and $\{x_7, x_{15}\}$.

From here on out all tree hypergraphs are assumed to be well-formed.

Definition (71) For any tree hypergraph, TH, if $\{n_1, n_2\}$ is an edge in Graph (TH) then the link of $n_1$ and $n_2$ in TH, Link(TH, $n_1$, $n_2$), is the unique link, l, where $l \cap n_1 \neq \emptyset$ and $l \cap n_2 \neq \emptyset$.

Definition (72) For any tree hypergraph, TH(N, L), and any node n in N, the links of n in TH, Links(TH, n) is the set of links l in L where $l \cap n \neq \emptyset$.

Definition (73) An edge of TH is any edge in Graph (TH).

Definition (74) A hypergraph is a tree hypergraph if its edges can be partitions into edges N and L where TH(N, L) is a tree hypergraph.

Definition (75) For any tree hypergraph, TH, with nodes $n_1$, $n_2$, ..., $n_m$, the variables of TH, Vars(TH), is $\{n_1 \cup n_2 \cup \ldots \cup n_m\}$.

Definition (76) For any tree hypergraph, TH, and any variable v, the unique node of TH that contains v is the node of v in TH denoted as Node(TH, v).

Definition (77) For any tree hypergraph, TH, and any variable v, let $\{v, f_1\}$, $\{v, f_2\}$, ..., $\{v, f_n\}$ be all the links in TH that contain v, then the fields of v in TH, Fields(TH, v), is $\{f_1, f_2, \ldots, f_n\}$.

Definition (78) An ordered tree hypergraph, OTH, is a tree hypergraph comprised of nodes N, links L along with a node n in N called the root node. OTH(N, L, n) will denote an ordered tree hypergraph with nodes N, links L and root node n.

Definition (79) If TH(N, L) is a tree hypergraph and n any node in N, there is an induced ordered tree hypergraph, OTH(N, L, n).

Definition (80) Since for any ordered tree hypergraph, OTH(N, L, n), Graph (OTH) is acyclic, an ordered tree hypergraph induces a directed tree on Graph (OTH) with root node n. The tree will be denoted as Tree(OTH).

Definition (81) The ordered links of OTH(N, L, n) consist of $(v_1, v_2)$ where $\{v_1, v_2\}$ is in L and Node(OTH, $v_1$) is the parent of Node(OTH, $v_2$) in Tree(OTH).

Definition (82) For any ordered tree hypergraph, OTH, and any variable v, let $(v, f_1), (v, f_2), \ldots, (v, f_n)$ be all the ordered links in OTH that contain v, then the ordered fields of v in OTH, OFields(OTH, v), is $\{f_1, f_2, \ldots, f_n\}$. The ordered fields of v can further be partitioned into the singleton fields and the tuple fields. A singleton field is any f in $\{f_1, f_2, \ldots, f_n\}$ where Node(OTH, f) contains only one node. Otherwise the field is a tuple field.

Definition (83) For any tree hypergraphs, $TH_1(N_1, L_1)$ and $TH_2(N_2, L_2)$, suppose $N_1$ contains a node $n_1$ and $N_2$ contains a node $n_2$, such that $n_2 \subseteq n_1$ and that for all other $m_1$ in $N_1$ and $m_2$ in $N_2$, $m_1 \cap m_2 \neq \emptyset$. Then $TH_1$ and $TH_2$ are merge-able on $n_1$ and $n_2$, and the merge of $TH_1$ and $TH_2$, Merge($TH_1$, $TH_2$)) is the tree hypergraph $TH(N_1 \cup (N_2 - \{n_2\}), L_1 \cup L_2)$.

Any undirected graph can be transformed to a tree hypergraph using an equivalence relation defined on the cycles of the graph:

Definition (84) For any undirected graph, G of the form (V, E) the equivalence relation Cyc*(G), defined on vertices from V, is the reflexive transitive closure of Cyc(G) where Cyc(G)($v_1$, $v_2$) if and only if $v_1$ and $v_2$ are in a simple cycle of G.

Definition (85) For any undirected graph, G of the form (V, E), the tree hypergraph of G, TH(G) is TH(N, L) where N consists of the sets of variables that are equivalent under Cyc*(G) and L consists of edges $\{v_1, v_2\}$ from the E that are not contained in any set of N.

Definition (86) An assignment, α, is a mapping, α:Vars→Values, where Vars⊆Variables. α:Vars will denote an assignment whose domain is the set of variables Vars.

Definition (87) The restriction of an assignment, α, to a set of variables V, Restrict(α, V) is the assignment consisting of all (v, vl) where (v, vl) is in α and v is in V.

Definition (88) For any set of assignments, AS, and any set of variables V, Restrict(AS, V) is the set of assignments of the form, Restrict(α, V) for all α in AS.

Definition (89) For any set of assignments, AS, and any variable v, the range of AS for v, Range(AS, v), is the set consisting of α(v) for all α in AS.

Definition (90) For any set of assignments, AS, any variable v, and any value a, AS restricted to variable v set to a, Restrict(AS, v, a) is the set of assignments, α, from AS where α(v)=a.

Definition (91) For an set of assignments, AS, and any set of variables, Vars, the assignments of Vars in AS, Assign(AS, Vars) is the set of assignments α in AS where Domain(α)= Vars.

Definition (92) A set of assignments, AS over Vars, is a set of assignments where for all α in AS, Domain(α)=Vars.

Definition (93) For any set of assignments, AS over Vars and any sequence of distinct variables $(v_1, v_2, \ldots, v_n)$, where $\{v_1, v_2, \ldots, v_n\}$=Vars, the induced tuple set of AS over $(v_1, v_2, \ldots, v_n)$, ITS(AS, $(v_1, v_2, \ldots v_n)$) is the set of tuples of the form $(α(v_1), α(v_2), \ldots, α(v_n))$ for all α in AS.

Definition (94) An assignment structure, AST, is comprised of a tree hypergraph, TH, a set of node assignments, NAS, of the form, α:n, where n is a node of TH, and a set of link assignments, LAS, of the form α:l where l is a link of TH. For any assignment structure, AST, TH(AST) will denote the tree hypergraph of AST and NAS(AST) will denote set of node assignments NAS and LAS(AST) will denote the set of link assignments LAS. AST(TH, NAS, LAS) will denote an assignment structure with tree hypergraph TH and node assignments NAS and link assignments LAS.

Definition (95) For any assignment structure, AST(TH, NAS, LAS), and any node n in TH, the assignments of n in AST, Assign(AST, n)=Assign(NAS, n).

Definition (96) For any assignment structure, AST(TH, NAS, LAS), and any variable v in Vars(TH), the range of v in AST, Range(AST, v), is Range(Assign(AST, Node(TH, v)), v).

Definition (97) For any assignment structures, AST, (TH, $NAS_1$, LAS) and $AST_2$(TH, $NAS_2$, LAS), and any node n in TH, $AST_1$ is almost equivalent to $AST_2$ for node n, if and only if Assign($AST_1$, n)⊆Assign($AST_2$, n) and for all $n_1$ in TH where $n_1 \neq n_2$ Assign(AST1, n1)=Assign(AST1, n1).

Definition (98) For any assignment structure, AST(TH, NAS, LAS), and any link $\{v_1, v_2\}$ in TH, GroupBy (AST, $v_1$, $v_2$)=GroupBy (ITS(Assign(AST, $\{v_1, v_2\}$), $(v_1, v_2)$)).

Definition (99) Let $AST_1(TH_1, NAS_1, LAS_1)$, $AST_2(TH_2, NAS_2, LAS_2)$ be assignment structures where $TH_1$ and $TH_2$ are merge-able on $n_1$ and $n_2$. Then $AST_1$ and $AST_2$ are merge-able on $n_1$ and $n_2$ and the merge of $AST_1$ and $AST_2$, Merge($AST_1$, $AST_2$), is the assignment structure AST(Merge($TH_1$, $TH_2$), $NAS_1 \cup (NAS_2 - Assign(AST_2, n_2))$, $LAS_1 \cup LAS_2$).

Definition (100) For any assignment structure AST(TH, NAS, LAS), any link $\{v_1, v_2\}$ in TH with associated nodes $n_1$ and $n_2$, and any assignment $α_1:n_1$ in NAS, the assignment $α_1:n_1$ has a match in AST for $\{v_1, v_2\}$ if there exists an $α_2:n_2$ in NAS such that $\{v_1 \to α_1(v_1), v_2 \to α_2(v_2)\}$ is in LAS.

Definition (101) For any assignment structure AST(TH, NAS, LAS), any link $\{v_1, v_2\}$ in TH with associated nodes $n_1$ and $n_2$, and any assignment $\alpha:\{v_1, v_2\}$ in LAS, the assignment $\alpha:\{v_1, v_2\}$ has a match in AST for $\{v_1, v_2\}$ if there exists an $\alpha_1:n_1$ and a $\alpha_2:n_2$ in NAS such that $\alpha_1(v_1)=\alpha(v_1)$ and $\alpha_2(v_2)=\alpha(v_2)$.

Definition (102) For any assignment structure AST(TH, NAS, LAS) and any link $\{v_1, v_2\}$ in TH with associated nodes $n_1$ and $n_2$, the link $\{v_1, v_2\}$ is arc consistent in AST if every $\alpha_1:n_1$ in NAS has a match in AST for $\{v_1, v_2\}$ and every assignment $\alpha:\{v_1, v_2\}$ in LAS has a match in AST for $\{v_1, v_2\}$.

Definition (103) An assignment structure AST(TH, NAS, LAS) is arc consistent if for every node $n_1$ in TH, Assign(AST, $n_1$)$\neq \emptyset$ and for every link l in TH, l is arc consistent in AST.

Definition (104) A assignment structure, $AST_1$(TH, $NAS_1$, $LAS_1$) satisfies AST(TH, NAS, LAS) if $NAS_1 \subseteq NAS$, $LAS_1 \subseteq LAS$ and $AST_1$ is arc consistent. An assignment structure AST is satisfiable if and only if there is a assignment structure that satisfies AST.

Definition (105) A tree path of an assignment structure, AST(TH, NAS, LAS), is an assignment structure TP that satisfies AST where the size of Assign(TP, n)=1 for all n in TH.

Definition (106) For any assignment structure, AST, the tree paths of AST, TreePaths(AST) is the set of all tree paths of AST.

Definition (107) For any tree path, TP, of and assignment structure, AST(TH, NAS, LAS), assume the nodes of TH are $n_1, n_2, \ldots, n_m$. For i from 1 to m let $\alpha_i:n_i$ be the one assignment of Assign(TP, $n_i$). Then the assignment of the tree path, Assign(TP)=$\alpha_1 \cup \alpha_2 \cup \ldots \cup \alpha_m$.

Lemma (3) If an assignment structure, AST(TH, NAS, LAS) is satisfiable, there exists a unique assignment structure $AST_s$(TH, $NAS_s$, $LAS_s$) such that $AST_s$ satisfies AST and for every assignment structure $AST_1$(TH, $NAS_1$, $LAS_1$) that satisfies AST, $NAS_s$ is a superset of $NAS_1$.

Definition (108) The solution structure of an assignment structure AST, SolStruct(AST), is the unique assignment structure from Lemma (3)

The procedure, 3310, shown in FIG. 33 finds a solution structure of an assignment structure, AST. Initially all the links of TH(AST) are added to a queue. Then each link, l, in the queue with nodes $\{n_1, n_2\}$, in the queue is processed by calling the procedure 3320. The procedure 3320 removes assignments from Assign(NAS(AST), $n_1$), Assign(NAS (AST)), $n_2$), and Assign(LAS(AST), l) that have no matches for l. If Assign(NAS (AST), $n_1$) changes the links of $n_1$ in TH(AST) other than l are added to the queue. Similarly, if Assign(NAS(AST), $n_2$) changes the links of $n_2$ in TH(AST) other than l are added to the queue. The procedure, 3310, ends when either false is returned or the queue is empty. If the queue is empty then true is returned and the input assignment graph will have be altered to contain the solution structure.

Lemma (4) For any assignment structure, AST, that has a solution, TreePaths(AST)=TreePaths(SolStruct(AST)).

Assignment structures are rich structures that can be navigated to provide information about query responses. Examples are shown in FIG. 34 and described in more detail in Section 2.4.7. The following definitions are utilized to navigate assignment structures:

Definition (109) For any assignment structure, AST(TH, NAS, LAS), any variable v in Vars(TH), any value a in Range(AST, v), let n be Node(v, TH), $\{f_1, f_2, \ldots, f_m\}$ the fields of v in TH, and for all i from 1 to m, $n_i$=Node(TH, $f_i$), then the assignment of v for a in AG, Assign(AST, v, a) is the mapping F:Variable$\to \wp$ (Assignment) with domain $\{f_1, f_2, \ldots, f_m\}$ where $F(f_i)$ is the set of all $\beta:n_i$ in NAS where there exists an $\alpha:\{v, f_1\}$ in LAS such that $\alpha(v)=a$ and $\alpha(f_i)=\beta(f_i)$.

Definition (110) An assignment structure tuple over node n is comprised of an assignment structure AST(TH, NAS, LAS) and an assignment $\alpha:n$ in Assign(AST, n). ASTuple (AST, $\alpha:n$) will denote a assignment structure tuple of that form.

Node(ASTuple) will denote the node n of ASTupe.

Definition (111) An assignment structure tuple set is a set of assignment structure tuples over some node n.

Definition (112) An assignment structure object is comprised of an assignment structure, AST(TH, NAS, LAS), a variable v in Vars(TH), and a value a in Range(AST, v). ASO(AST, v, a) will denote an assignment structure object of that form.

Definition (113) For any assignment structure AST(TH, NAS, LAS), GetASTS is a function from nodes of TH onto a assignment structure tuple set, where GetASTS(AST, n) is the set of all assignment structure tuples of the form ASTuple (AST(TH, NAS, LAS), $\alpha:n$) for all $\alpha:n$ in Assign (AST, n).

Definition (114) For any assignment structure object, ASO (AST(TH, NAS, LAS), v, a), the following functions are defined:

(114.1) The value of ASO, GetValue(ASO)=a (114.2) The assignment structure tuple set function, GetASTS with domain equal to Fields(TH, v), where for any f in Fields(TH, v), getASTS(ASO)(f) is the set of assignment structure tuples ASTuples(AST, $\alpha:n$) for all $\alpha:n$ is in Assign(AST, v, a)(f).

Definition (115) For any assignment structure tuple, ASTupe (AST, $\alpha:n$), the following functions are defined:

(115.1) The get assignment function getAssign(ASTuple)=$\alpha$.

(115.2) The get object function, GetASO, where for any variable v in n, getASO(ASTupe)(v)=ASO(AST, v, $\alpha(v)$).

Assignment structures provide rich and flexible structures for navigating results, however, the full information provided by those structures is often not required. Furthermore, navigating the structure in the presence of singleton nodes of the tree hypergraph, require many method calls to retrieve the required information. Ordered assignment structures, along with results and result tuples, provide an alternative way to navigate an assignment structure:

Definition (116) An ordered assignment structure, OAS, is an assignment structure along with a node n in the tree hypergraph of OAS. OAS(TH(N, L), NAS, LAS, n). will denote the ordered assignment structure with node n. OAS (OTH(N, L, n), NAS, LAS) will denote the ordered tree hypergraph with induced ordered tree hypergraph OTH(N, L, n).

Next, results and result tuples, which have been used in previous examples are defined:

Definition (117) A result, contains a variable, v, a value a, a result mapping F from variables onto a set of results, and a result tuple mapping FT, from variables onto a set of result tuples. Result(v, a, F, FT) will denote a result of that form.

Definition (118) A result tuple is a mapping from variables onto results.

Definition (119) For any ordered assignment graph, OAS (OTH(N, L, n), NAS, LAS) the following will be defined:

(119.1) For each node v in Vars(OTH), and value a in Range(OAS, v), a result of v over a in OAS, Result (OAS, v, a).

(119.2) For each variable v in Vars(OTH) and set S⊆Assign(OAS, {v}), the results of v over S in OAG, Results(OAS, v, S)

(119.3) For each node n in N and any set S⊆Assign(OAS, n) the result tuples of n in OAS for S, ResultTuples (OAS, n, S).

(119.4) Results(OAS, v, S) is the set of results of the form Result(OAS, v, α(v)) for all α in S (119.5) Where v has no ordered fields in OTH the result of v over a in OAS is Result(v, a, ∅, ∅) for all α in S.

(119.6) Otherwise, let $f_1, f_2, \ldots, f_l$ be the ordered fields of v in OTH, where Node(OTH, $f_i$) contains only one variable $f_i$ and let $ft_1, ft_2, \ldots, ft_p$ be the ordered fields of v in OTH where Node(OTH, $ft_i$) contains more then one variable and let $nt_i$ be Node(OTH, $ft_i$). Let $S_i$ be Assign(OAS, v, a)($f_i$) and $ST_i$ be Assign(OAG, v, a)($ft_i$). Let F be the mappings $\{f_1 \rightarrow$Results(OAS, $S_1$, $\{f_1\}$), $f_2 \rightarrow$Results(OAS, $S_2$, $\{f_2\}$), . . . , $f_l \rightarrow$Results(OAS, $S_l$, $\{f_l\}$)$\}$ and let FT be the mappings $\{ft_1 \rightarrow$ResultTuples(OAS, $ST_1$, $nt_1$), $ft_2 \rightarrow$ResultTuples(OAS, $ST_2$, $nt_2$), . . . , $ft_p \rightarrow$ResultTuples(OAS, $ST_p$, $nt_p$)$\}$. Then Result(OAS, v, a) is Result(v, a, F, FT).

(119.7) For nodes of the form $\{v_1, v_2, \ldots, v_k\}$ where $\{v_1, v_2, \ldots, v_k\}$ is a leaf node in OTH, the result tuples are mappings of the from $v_i \rightarrow$Result(OAS, $v_i$, α($v_i$)) for all α in S.

An algorithm for constructing result structures is shown in FIG. 35. The method shown in 3510 constructs a result from an ordered assignment structure, oas, a variable v, and a value a. The method shown in 3520 retrieves the results from an assignment structure, oas, a variable v, and a set of assignments. The method shown in 3530 retrieves result tuples. The method shown in 3540 retrieves the results of any node with only one variable and finally the method shown in 3550 retrieves the result tuples of a node.

The result and result tuple structures defined above correspond to the results and result tuples illustrated in the examples in sections 2.1 and sections 2.2. Those examples, further categorize the variable fields of a result into those that are properties and those that are not. Properties map to fields whose collection of result tuples or results map to only one result or one result tuple. Properties are determined from the constraints of the relational schema.

Generating an assignment structure from a query and a relational model will entail setting up a tree of constraint problems based on the query and the relational model. The tree of constraint problems has a corresponding tree hypergraph, TH, and an assignment structure, AST, that represents the solution to the constraint problem tree. In the next section, the foundations for constraint problems is presented and in the section following that, a method for generating the assignment structure of a query and a relational model is described.

2.4.6. Constraint Problems

Definition (120) A constraint, C, is a pair (S, R) where S is a sequence of variables, $(x_1, x_2, \ldots x_m)$ and R is a finite relation over $D_1 \times D_2 \times \ldots \times D_m$. The variables of the constraint, Vas(C), is $\{x_1\} \cup \{x_2\}, \ldots, \cup \{x_m\}$. The arity of the constraint, Arity (C), is |Var(C)|.

Definition (121) A constraint problem, CP, is a set of constraints, $\{C_1, C_2, \ldots, C_n\}$. The variables of CP, Vars(CP), is Vars($C_1$)∪Vars($C_2$)∪ . . . ∪Vars($C_n$).

Definition (122) For any constraint problem, CP, and any set of variables Vars, the restriction of CP to Vars, Restrict(CP, Vars) is the set of constraints C in CP where Vars(C)⊆Vars.

Definition (123) An assignment, α, satisfies a constraint of the form, $((x_1, x_2, \ldots x_n), R)$, if and only if $(\alpha(x_1), \alpha(x_2), \ldots, \alpha(x_n))$ is contained in R.

Definition (124) An assignment, α, satisfies a constraint problem, CP, if and only if Domain(α)=Vars(CP) and if it satisfies every constraint in CP.

Definition (125) A solution of CP, denoted by Sol(CP), is the set of all assignments, α, that satisfies CP.

There are many known methods for determining a solution to a constraint problem. See [1].

Definition (126) For any set of constraint problems CPS=$\{CP_1, CP_2, \ldots, CP_n\}$ the solution of CPS, Sol(CPS), is Sol($CP_1 \cup CP_2 \cup \ldots \cup CP_n$)

Definition (127) For any set of assignment AS over Vars, and any sequence of distinct variables $(x_1, x_2, \ldots, x_n)$, where $\{x_1, x_2, \ldots, x_n\}$=Vars, the induced constraint of AS for $(x_1, x_2, \ldots, x_n)$, InducedConstraint(AS, $(x_1, x_2, \ldots, x_n)$), is the constraint$((x_1, x_2, \ldots, x_n)$, ITS(AS, $(x_1, x_2, \ldots, x_n)$)).

Definition (128) The primal constraint graph corresponding to a constraint problem, CP, PCG(CP), is an undirected graph, (Vars(CP), E) where E is the set of edges $\{v_1, v_2\}$, such that for some constraint C in CP, $\{v_1, v_2\}$⊆Vars(C).

Definition (129) The constraint tree hypergraph corresponding to a constraint problem, CP, TH(CP), is the tree hypergraph of the primal graph, i.e. TH(PCG (CP)) (see Definition (85)).

Definition (130) The assignment structure of a constraint problem CP, AST(CP), is comprised of the tree hypergraph TH(CP), the set of all node assignment of the form α:n where n is in TH(CP) and α is in Sol(Restrict(CP, n)) and the set of all link assignments α:l where α is in Sol(Restrict (CP, l)).

Definition (131) The solution structure of a constraint problem CP, SolStruct(CP), is SolStruct(AST(CP)).

Lemma (5) From any tree path, TP, of AST(CP), Assign(TP) satisfies CP.

The next lemma implies that the solution of CP can be obtained from a solution graph, by generating all tree paths in the solution graph.

Lemma (6) For any solution structure SS of a constraint problem CP the set Assign(TP) for all tree paths TP in SS is a solution to CP.

The previous lemma provides a means of finding a solution to a constraint problem, by breaking the problem into smaller problems. First create the assignment graph of the constraint problem by solving the constraint problems of the nodes of the tree hypergraph of the constraint problem. Then generate the solution structure, SS, using the arcConsistent procedure shown in FIG. 33. The set Assign(TP) for all tree paths, TP, of the solution structure is a solution to the constraint problem.

Conversely, the solution structure can be obtained from a solution to the constraint problem Lemma (7) The solution structure for a constraint problem, CP, can be obtained from the solution, sol, of CP. In particular, let AST be comprised of TH(CP), the set of node assignments of the form α:n where n is a node in TH(CP) and α is in Restrict(sol, n) and the set of link assignments of the form α:l where l is a link in TH(CP) and α:l is in Restrict(sol, l). Then AST is a solution structure of CP.

As will be shown in subsequent sections, queries, containing optional expressions, lead to a chain of constraint problems, where all problems except the root problem depend on the solution to previous problems in the chain. Next we formalize the notion of constraint problem chain.

Definition (132) A constraint problem chain is a directed acyclic, connected graph, DG (CPS, E), where every vertex of CPS is a constraint problem. CPC (CPS, E) will denote a constraint problem chain with vertices CPS and edges E.

Definition (133) For and constraint problem chain, CPC (CPS, E), (133.1) $CP_2$ is said to depend on $CP_1$ if and only if ($CP_1$, $CP_2$) is in E in the graph.

(133.2) For any constraint problem CP in CPS, (133.2.1) the parents of CP, Parents (CPC, CP), is the set of all $CP_p$ where ($CP_p$, CP) is in E.

(133.2.2) The ancestors of CP, Ancestors (CPC, CP), is the set of all $CP_A$ where ($CP_A$, CP) is in the transitive closure of CPC.

Definition (134) For any constraint problem chain, CPC ($\{CP_1, CP_2, \ldots CP_N\}$, E), the variables of CPC, Vars(CPC)= Vars($CP_1$)∪Vars($CP_2$)∪ . . . ∪Vars($CP_N$).

Definition (135) For any constraint problem chain, CPC (CPS, E), a solution map of CPC, SolMap(CPC), is a map, SolMap:CPS→$\wp$ (Assignment), where for each constraint problem CP in CPS, SolMap(CP)=Sol({CP}∪Ancestors (CP)).

Here we focus on a special class of constraint problem chains.

Definition (136) An acyclic constraint problem tree, ACPT, is a constraint problem chain where (136.1) The chain is a directed tree with one root node (136.2) for all CP in the chain except the root node, let $CP_p$ be the parent of CP. Then TH(CP) contains as least 2 nodes and there is one and only node $\{v\}$ in TH(CP) and a node $N_p$ in TH($CP_p$) where v is in $N_p$. The unique pair ($N_p$, $\{v\}$), the common pair of CP in ACPT, will be denoted as Common (ACPT, CP). The node $\{v\}$, the root of CP in ACPT, will be denoted as Root (ACPT, CP).

(136.3) For all nodes CP in the chain, CP has no variables in common with any other constraint that is not a parent, child or sibling of CP.

(136.4) If $CP_1$ and $CP_2$ are siblings with parent $CP_p$ then the only variables in common between $CP_1$ and $CP_2$ are those that occur in $CP_p$.

Definition (137) Given a constraint problem CP with parent CP, in an acyclic constraint problem tree, ACPT, the induced constraint problem of CP, Induced(ACPT, CP), is CP ∪ InducedConstraint(Sol($CP_p$), Root(ACPT, N))(see Definition (127)) For the root node, CP, of ACPT, Induced(ACPT, CP)=CP.

Lemma (8) For any acyclic constraint problem tree, ACPT, and for all CP in ACPT, let SolMap(ACPT)(CP) be the solution to Induced(ACPT, CP). The SolMap(ACPT) is a solution map for ACPT.

Definition (138) For any acyclic constraint problem tree, ACPT, the tree hypergraph of ACPT, TH(ACPT) is TH($CP_1$∪$CP_2$∪ . . . ∪$CP_N$) where $CP_1$, $CP_2$, . . . , $CP_N$ are all the constraint problems in ACPT.

Definition (139) For any acyclic constraint problem tree, ACPT, any assignment structure, AST(TH(ACPT), NAS, LAS), and any constraint problem, CP, in ACPT, the restriction of AST to CP for ACPT, Restrict(ACPT, AST, CP)

(139.1) If CP is the root of ACPT, is the assignment structure consisting of TH(CP), the set of node assignments of the form α:n where n is a node in TH(CP) and α:n in AST, and the set of link assignments of the form α:l where l is a link in TH(CP).

(139.2) Otherwise, with Common (ACPT, CP)=($n_p$, $\{v\}$), is the assignment structure consisting of TH(CP), the set of node assignments of the form α:n where n is a node in TH(CP) and α:n in AST combined with the set of node assignments of the form Restrict(α:$n_p$, $\{v\}$) α:$n_p$ is in NAS, and the set of link assignments of the form α:l where l is a link in TH(CP).

Lemma (9) For any acyclic constraint problem tree, ACPT, any assignment structure, AST(TH(ACPT), NAS, LAS), and any constraint problem, CP, in ACPT, TH(ACPT, AST, CP)=TH(AST(Induced(ACPT, CP)))=TH(CP).

Definition (140) For any acyclic constraint problem tree, ACPT, the solution structure of ACPT, SolStruct(ACPT), is an assignment structure, AST(TH(ACTP), NAS, LAS) where for all CP in ACPT, Restrict(AST, CP) is almost equivalent (see Definition (97)) to SolStruct(Induced(ACPT, CP)).

The following lemma implies that the solution to all the induced constraint problems can be obtained from the solution graph of the acyclic constraint problem tree:

Lemma (10) For any acyclic constraint problem tree, ACPT, any solution structure, AST of ACPT, and for all CP in ACPT, the set Assign(TP) for all tree paths in Restrict(AST, CP) is a solution to Induced(ACPT, CP).

FIG. 36 shows an algorithm for finding a solution structure of an acyclic problem tree.

In the following sections, a method of producing and object tuples set from a query is formulated. The method comprises solving a tree of constraint problems formulated from the query and the relational model.

2.4.7. Assignment Graphs from Queries and a Relation Model.

Definition (141) For any set S, $S^1$ is the set of all 1-tuples of the form (x) for all x in S.

Definition (142) A variable V(vk, vn, d) is well formed for a relation schema, RS, if and only if d is in Domain (TypeVals).

Definition (143) A set of variables, Vars, is well formed for a relation schema, RS, if and only if it is well formed for every variable v in Vars.

Definition (144) An atomic template AT of the form, R($d_1$, $d_2$, . . . , $d_m$)($x_1$, $x_2$, . . . , $x_m$), is well formed for a relation schema, RS, if and only if for all i from 1 to m, $d_i$ is in Domain(TypeVals) and dn($x_i$) is in Domain(TypeVals).

Definition (145) A set of atomic templates ATS, is well formed for a relation schema, RS, if and only if it is well formed for every AT in ATS.

Definition (146) A conjunctive template, CT(Vars, ATS), is well formed for a relation schema, RS if and only if it is well formed for Vars and for every atomic template at in ATS.

Definition (147) A restriction mapping, RM:Vars→$\wp$ (Values), is well formed for a relation schema, RS, if and only if it is well formed for Vars and for v in Vars, RM(v)⊆ TypeVals(dn(v)).

Definition (148) A query template, Q(CT, OPT, RM), is well formed for a relation schema, RS, if and only if CT and RM are well formed for RS, and every optional query template in OPT is well formed.

Definition (149) For any relational schema, RS and any relation set instance, RSI, that satisfies, RS, and any and any set of variables $\{v_1, v_2, \ldots, v_n\}$ well formed for RS, the unary constraints of $\{v_1, v_2, \ldots, v_n\}$ over RS and RSI, UnaryConstraint(RS, RSI, $\{v_1, v_2, \ldots, v_n\}$)=$\{((v_1), \text{Ext}(dn (v_1))^1, ((v_2), \text{Ext}(dn(v_2))^1 \ldots, ((v_n), \text{Ext}(dn(v_n))^1\}$.

Definition (150) For any relational schema, RS(TypeVals, RelHeaders) and any relation set instance, RSI, that satisfies, RS, and any atomic template AT of the form, $R(d_1, d_2, \ldots, d_m)(x_1, x_2, \ldots, x_m)$, well formed for RS, the constraints of AT over RS and RSI, Constraints (RS, RSI, AT), is $\{((x_1), \text{Ext } (d_1)^1), ((x_2), \text{Ext } (d_2)^1), \ldots, ((x_n), \text{Ext } (d_n)^1)\} \cup \{((x_1, x_2, \ldots, x_n), \text{RSI}(R(d_1, d_2, \ldots, d_n))\}$ Definition (151) For any relational schema, RS(TypeVals, RelHeaders) and any relation set instance, RSI, that satisfies, RS, and any set of atomic templates ATS well formed for RS, the constraints of ATS over RS and RSI, Constraints(RS, RSI, ATS) is (151.1) Constraints(RS, RSI, $AT_n$)∪Constraints(RS, RSI, $AT_2$)∪ . . . ∪Constraints(RS, RSI, $AT_n$), if ATS≠∅ and ATS={$AT_1, AT_2, \ldots, At_n$}, (151.2) otherwise if ATS=∅ then Constraints(RS, RSI, ATS)=∅.

Definition (152) For any relational schema, RS(TypeVals, RelHeaders) and any relation set instance, RSI, that satisfies, RS, and a conjunctive template, CT(Vars, ATS), well formed for RS, the constraints of CT over RS and RSI, Constraints (RS, RSI, CT), is UnaryConstraints(RS, RSI, Vars)∪Constraints(RS, RSI, ATS)

Definition (153) For any relational schema, RS(TypeVals, RelHeaders) and any relation set instance, RSI, that satisfies, RS, and any restriction mapping, RM:Variables→℘ (Values), well formed for RS, the unary constraints of RM over RS and RSI, UnaryConstraints (RS, RSI, RM), is $\{((v_1), RM(v_1)), ((v_2), R(v_2)^1), \ldots, ((v_m), R(v_m)^1)$.

The previous two definitions can be used to construct a constraint problem corresponding to the required conjunctive expression of a query and the restriction mapping. For queries in general that can contain optional expressions, for each optional expression in the optional expression tree of the query a constraint problem can be constructed, whereby the formulation of the constraint problem for a query depends on the solution the constraint problem of the parent expression. This mapping from optional expressions to constraint problems is formulated in the following definition.

Definition (154) The acyclic constraint problem tree of a relational schema, RS, and a relation set instance, RSI, that satisfies rs, and a query template, Q, well formed for RS ACPT (Q, RS, RSI), is the acyclic constraint problem tree where each node is the constraint problem, CP, formed from a query $\Omega(CT_\Omega, OPT_\Omega, RM_\Omega)$ in QTree(Q) where CP is Constraints(RS, RSI, $CT_\Omega$)∪UnaryConstraints(RS, RSI, $RM_\Omega$).

Definition (155) The solution structure of a relational schema, RS, and a relation set instance, RSI, that satisfies rs, and query template, Q, well formed for RS, SolStruct(RS, RSI, Q), is SolStruct(ACPT(RS, RSI, Q)).

Given a query, template Q, and a solution graph of that query, the functions defined in Definition (111) and Definition (115) can be used to navigate the results. FIG. 34 demonstrates how to navigate an assignment graph for the query 3410 with tree hypergraph shown in 3420. The procedure shown in 3450 retrieves all the values associated with an assignment graph object and a given field, and the procedure shown in 3440 retrieves just one value. Using those procedures, the procedure shown in 3430 displays the first name, last name, person id, and emails of all persons in the result of the query. Using a similar approach, however, the same structure can be used to print the persons associated with each first name in the result.

While an assignment graph provides great flexibility in navigating the results of a query, it also requires several function calls to retrieve values in the case where the nodes contain only a single variable. For many queries, such as the one shown in FIG. 34, all of the nodes may contain only a single variable. Also, navigating in many directions is often not required. To facilitate navigation in such cases, a more convenient result object structure is used. The result object structure utilizes the ordered tree hypergraph of the query.

2.4.8. Query Expressions

The expressions shown in 2220 and 2510 are "abbreviations" of query templates as defined in Definition (64). Such expressions, denoted as query expressions, make it easier to formulate a query, as well as improve the readability of the query. As simple case, consider the simple query expression, State. has(StateName, Country), that has an "object" like interpretation of an entity State with fields StateName and Country. However, in the framework of this teaching, the expression is interpreted as a conjunctive expression StateName(State, StateName)∨Country(State, Country).

Note how StateName and Country contribute both a variable and a relation name to the interpretation.

The expression State. has(StateName, Country) can also occur inside other expressions as in City.has(CityName, State.has(StateName, Country)).

Again each inner expression contributes to the interpretation. The first inner expression, CityName, contributes CityName (City, CityName) and the second inner expression, State.has(StateName, Country) contributes State(City, State) conjoined with it's interpretation, StateName(State, StateName)∨Country(State, Country). The final interpretation is CityName(City, CityName)∨State(City, State)∨StateName(State, StateName)∨Country(State, Country)

Instead of using the "has" keyword", the find keyword can be used as in

City.has(CityName).find(State.has(StateName, Country)).

In this case State. has(StateName, Country) contributes the conjunctive expression State(City, State)∨StateName (State, StateName)∨Country(State, Country) as in the previous example, but the expression becomes the optional part of the interpretation. In other words, the final interpretation is the query with required conjunctive expression, CityName(City, CityName), and optional query:

State(City, State)∨StateName(State, StateName)∨Country(State, Country)

Notice in the above examples where x.has(y, z) is used as an inner expression of some outer expression, E, it was necessary to interpret x.has(y, z) as y(x, y)∨z(x, z) but also to keep track of the distinguished variable of the inner expression and the distinguished variable, w of the outer expression. The variables x and w are used to form an additional atomic expression, x (w, x), that gets added to the interpretation y(x, y)∨z(x, z). The final interpretation of the inner expression in the context of the outer expression, either contributes the required conjunctive expression of the interpretation of the outer expression (in the case of "has"), or to the optional expressions of the interpretation of the outer expression (in the case of "find")), The framework permits variables to be renamed as in the expression:

State.has(StateName.as("SN"), Country)

which gets interpreted as:

StateName(State, "SN")∨Country(State, Country)

Variables can also be restricted as in:

State.has(StateName.is("NY"), Country)

That will be interpreted as a query StateName(State, StateName)∨Country(State, Country)

with a restriction of the variable StateName to {"NY"}.

The syntax of query expressions are quite simple as shown in the extended BNF(EBNF) of FIG. 37. Certain non terminals are not defined there. The non-terminals K_AS, K_IS, K_EQ, K_FIND, and K_HAS are the keywords, typically set to "as", "is", "eq", "find", and "has" respectively (where case may be ignored). The non-terminal VARNAME is typically an identifier consisting of a mixture of ASCII character and digits that starts with an ASCII character. However, depending on the environment, VARNAME can take on other forms. For example, it can include a name a type, such as in Person:PersonType, or FirstName:String. The non-terminal value are the literals of the language that might include string literals or integer literals, or constructors (such as new Date("2011-1-01")). The non-terminals <STRING_LITERAL> are typically defined to consists of any characters in quotes.

Definition (156) For any grammar G and non-terminal X, the strings of X in G, L(X, G), is the set of all strings that are generated from all rules in G whose left hand side is X.

For any grammar, G, when a right hand side of a rule contains a non-terminal, X if followed by a ?, it means that the non-terminal is optional. Alternatively, the one can replace every occurrence of X? in G by a non-terminal X?, where X? is the rule X?: " "|X. The resulting grammar is equivalent to G. To simplify:

Definition (157) For any grammar, G, and any non-terminal X the string of X?, L(X?, G), is L(X, G)∪{" "}.

Definition (158) An query expression compatible grammar, QEG, is one that includes the rules as shown in FIG. 37 and also has definitions of the non-terminals, K_AS, K_IS, K_EQ, K_FIND, K_HAS, STRING_LITERAL, value and VARNAME.

Definition (159) For any query expression compatible grammar, QEG, a query expression is any string in L(qexpr, QEG).

As illustrated in the examples above every query expression that is part of an inner expression contributes a variable and a relation name to the outer expression. Or in other words every query expression is interpreted as a query with a "distinguished" variable and a relation name. More formally:

Definition (160) An extended query is a query comprising, in addition to the elements of Definition (64), a variable v and a relation name rn where v is in Vars(CT). QE(CT, OPT, RS, v, rn) will denote an extended query with required conjunctive template CT, optional templates OT, restriction RS, variable v, and relation name rn.

In the following it will be shown how to translate any query expression of an query expression compatible grammar into an extended query. The translation of the query can occur in various environments:

Definition (161) An environment, Env(EV, Res, Value, Str, QEG), is comprised of an query expression compatible grammar QEG and:
(161.1) An evaluate variable function, EV:String→Variable, and
(161.2) A resolve function Res:StringxDomainNamexDomainName→RelationHeader.
(161.3) A value function Value:L(value, QEG>)→Values.
(161.4) A string value function Str:L(STRING_LITERAL, QEG)→String Definition (162) For any environment Env (EV, Res, Value, St, QEG), any variable v and any extended queries of the form, $QE_1(CT_1, OPT_1, RS_1, v_1, rn_1)$, $QE_2(CT_2, OPT_2, RS_2, v_2, rn_2)$, ..., $QE_n(CT_n, OPT_n, RS_n, v_n, r_n)$, the merge of v and $QE_1, QE_2, \ldots, QE_n$, Merge(Env, v, {$QE_1, QE_2, \ldots, QE_n$}), is the set of queries: {$Q_1(CT_1\lor Res(rn_1, dn(v), dn(v_1))(v, v_1), OPT_1, RS_1)$, $Q_2(CT_2\lor Res(rn_2, dn(v), dn(v_2))(v, v_2), OPT_2, RS_2)$, ..., $Q_m(CT_m\lor Res(rn_m, dn(v), dn(v_m))(v, v_m), OPT_m, RS_m)$}

Definition (163) For any extended query QE (CT, OPT, RS, v, rn) and any set of queries, QS, of the form {$Q_1(CT_1, OPT_1, RS_1)$, $Q_2(CT_2, OPT_2, RS_2)$, ..., $Q_m(CT_m, OPT_m, RS_m)$} the has merge of QE and {QE, $Q_2, \ldots, Q_m$}, HasMerge(QE, QS) is the extended query:
$QE_h(CT\lor CT_1\lor CT_2\lor \ldots \lor CT_m$, $OPT\cup OPT_1\cup OPT_2\cup \ldots \cup OPT_m$, $RS\cap RS_1\cap RS_2\cap \ldots \cap RS_m$, v, rn) if QS is not empty, otherwise HasMerge(QE, Env, QS)=QE.

Definition (164) For any extended query QE (CT, OPT, RS, v, rn) and any set of queries QS, the find merge of QE and QS, FindMerge(QE, QS), is the extended query, $QE_f$(CT, OPT∪QS, RS, v, rn), if QS is not empty, otherwise FindMerge(QE, QS)=QE.

Definition (165) For any query expression compatible grammar QEG, and any given environment, Env(EV, Res, Value, Str, QEG), any string in L(therename, QEG), is of the form. •the•(vrn). The relation rename function for QEG and Env, RelRN:L(therename, QEG)→String, is RelRN(s)=EV (vrn).

Definition (166) For any query expression compatible grammar QEG, and any given environment, Env(EV, Res, Value, Str, QEG), any string in L(asrename, QEG), is of the form .the(sl) or of the form .the(sl)•tr where tr is in L(therename, QEG). The as rename function for QEG and Env, AsRN:L(therename, QEG)×String×String→(String, String) is
(166.1) AsRN(s, v, r)=(Str(sl), r), if the s is of the form .the(sl).
(166.2) AsRN(s, v, r)=(Str(sl), RelRn(tr)), if the s is of the form .the(sl) tr.

Definition (167) For any query expression compatible grammar QEG, and any given environment, Env(EV, Res, Value, Str, QEG), any string in L(eqrename, QEG), is of the form.eq(vn) or of the form.eq(vn)•tr where tr is in L(eqrename, QEG). The eq rename function for QEG and Env, AsRN:L(eqrename, QEG)×String×String→(String, String) is
(167.1) EqRN(s, v, r)=(EV(vn), r), if the sis of the form .eq(vn).
(167.2) EqRN(s, v, r)=(EV(vn), RelRn(tr)), if the s is of the form .eq(vn)•tr.

Definition (168) Note that for any query expression compatible grammar QEG, and any given environment, Env(EV, Res, Value, Str, QEG), any string in L(varrename, QEG) is generated from: asrename|eqrename|therename. The rename function for QEG and Env, RN:L(varrename?, QEG)×String×String→(String, String) is
(168.1) RN(s, v, r)=(v, r) if varrename is empty.
(168.2) if therename rule is applied, RN(s, v, r)=(v, RelRn(vr))
(168.3) if asrename rule is applied, RN(s, v, r)=AsRN(vr, v, r)
(168.4) if eqrename rule is applied is RN (s)=EqRN(v r, v, r)
where vr is the value of varrename in the parse tree.

Definition (169) Note that for any query expression compatible grammar QEG, any string in L(restriction, QEG), is generated from one or more applications of the value rule. For any environment, ENV (EV, Res, Value, Str, QEG), and any string in L(restriction, QEG), let $s_1, s_2, \ldots, s_n$ be the strings of the <value>rule, then the restriction function of ENV, Restrict:L(restriction?, QEG)→$\wp$ (Values) is Restrict(s)={Value($s_1$), Value($s_2$), ..., Value($s_n$)}. If sis the empty string Restrict(s)=∅.

Note that for any query expression compatible environment, QEG, any string s in L(qexpr, QEG), is formed from a string of the form vs•vrn•res•h•f where vs is in L(VAR-NAME, QEG), vrn is in L(varrename?, QEG), res is in L(restriction?, QEG) and h is in L(has?, QEG) and f is in L(find?, QEG).Any expression in L(has?, QEG) is formed from a set of expressions of the form $eh_1, eh_2, \ldots, eh_n$, where for all i from 1 to n, $eh_i$ is in L(qexpr, QEG). Similarly any expression in L(find?, QEG) is formed from a set of expressions of the form $ef_1, ef_2, \ldots, ef_m$, where for all i from 1 to m, $ef_i$ is in L(qexpr, QEG).

Definition (170) For any environment, ENV (EV, Res, Value, Str, QEG), the query evaluation function, QueryEval: L(qexpr, QEG)→Extended Query, is defined (recursively) as:

```
FindMerge(
  HasMerge(
    QE(v, ø, Restrict, v, r),
    Merge(ENV, v, {Eval(eh₁), Eval(eh₂), . . . , Eval(eh_n)}),
    Merge(ENV, v, {Eval(ef₁), Eval(ef₂), . . . , Eval(ef_m)})
    where RN(vrn, vn(EV(vs)), vn(EV(vs))) = (v₁, r) and
    v = Rename(EV(vs), v₁) and Restrict = v→Restrict(res) if
    Restrict(res) ≠ ø otherwise Restrict = ø;
```

2.4.9. Instance Structures and Instance Expressions

To create entity type instances and to insert, update and remove from relations where at least one domain is an entity type, one can execute an instance expression(which are representations of instance structures). Executing an instance expression(or instance structure), may result in updates to relation set instance mapping, RSI. For example, the instance expression, State.instance(StateName.is ("NY"), Country.is("US"))
will result in adding the tuples, $(st_1, NY")$ to RSI(State (StateType, String)) and $(st_1, "US")$ to RSI(Country(State-Type, String) where $st_1$ is a value in TypeVals(StateType) if there is no current value in TypeVals(StateType) with those RSI mappings. If there is an existing instance then that instance is returned.

Well formed instance structures, can be checked against a schema, independent of the actual data stored, and provides certain guarantees:
1. They evaluate to at most one value.
2. They avoid certain run-time constraint violations including:
   a. Must-have constraints.
   b. Property constraints
   c. Primary key constraints

3. THE RESULTS ARE INDEPENDENT OF THE ORDER OF EXECUTION

The third guarantee above is intended to avoid instance expressions such as

```
Person.instance(PersonID.is(1)).
  add(AnyEmail.is("jon@aa.com")).
  remove(AnyEmail.is("jon@aa.com")
```

In such a case, if the email is added and then removed, there is no effect, however if the email is first removed and then added, the effect may be to add an email.

Instance expressions have an intuitive, easy to formulate, object oriented flavor. They are amenable to an XML representation, providing a means, for example, of sending updates over a network. Instance expressions are also more amenable for use in object oriented programming languages.

For example, an instance expression, can be implemented as classes as shown in the Java code examples 2210, 2250, 2260, and 2270. The recursive structure of instance structures, whereby instance structures contain other instance structures, permit multiple updates to occur with just one instance expression. To implement the underlying updates represented by just one instance expression in an RDBMS could require several SQL DML statements implemented within procedural code that must also provide transaction management, such as setting a transaction isolation level, starting and ending the transaction, handling error conditions, and rollbacks. Instance expressions free the developer from complex transaction management coding.

In the following, a formulation of instance structures and executing instance structures is presented. Following that, an EBNF is presented for instance expressions, and methods are presented that convert instance expressions to instance structures.

Definition (171) Instance types, denoted as InstanceTypes, are comprised of EXISTS, INSTANCE, and NEWINSTANCE.

Definition (172) Operation types, denoted as OperationTypes, are comprised of UPDATE, ADD, REMOVE and REPLACE.

Definition (173) UpdateOperationTypes, are comprised of UPDATE, ADD, and REMOVE.

Definition (174) An instance structure, IS, is comprised of:
  (174.1) it, an instance type
  (174.2) et in EntityTypes, the entity type
  (174.3) PKM:PKER→Values, the primitive key map where for all rh in PKER, rh is a binary relation header.
  (174.4) IKM:EKER→Instance Structure where for all rh in EKER, rh is a binary relation header.

IS(it, et, PKM, IKM) will denote an instance structure of that form.

Definition (175) For any set of instance structures, $SI=\{is_1, is_2, \ldots, is_n\}$, the instance structure set of SI, ISS(SI), is

```
SI∪ISS(Range(IKM(is₁))∪
  ISS(Range(IKM(is₁))∪
  ISS(Range(IKM(is₂))∪ . . . ∪
  ISS(Range(IKM(is_n))
```

Definition (176) For any entity relation schema, ERS, a set of instance structures, SI, is well formed for ERS if and only if for all i s in SI
  (176.1) PrimaryKeys(et)≠Ø.
  (176.2) Domain(PKM)=PrimitivePrimaryKey(ERS, et)
  (176.3) For all R(e, d) in Domain(PKM), PKM(R(e, d)) is in TypeVals(d).
  (176.4) Domain(IKM)=EntityPrimaryKey(ERS, et).
  (176.5) For all $R(e_1, e_2)$ in Domain(IKM), the entity type of $IKM(R(e_1, e_2))$ is e, where $e=e_2$ or $(e, e_2)$ is in SubEntity$^+$.
  (176.6) If it is EXISTS, then every instance structure in the Range(IKM) must be of instance type EXISTS.
  (176.7) Every instance structure in the Range(IKM) must be well formed.
  (176.8) For every $is_1$ in ISS(SI), where $is_1 \neq is$, and $is_1$ is header equivalent to is, $it(is_1)=it(is)$.

"Equivalent" instance structure can appear multiple times within an instance expression. For example, in the following instance expression

```
Person.exists(PersonID.is(1)). update(Guarantor.exist-
  s(PersonID.is(1))
``` where Person and Guarantor are variables whose domain type is the PersonType entity type, the subexpressions Person. exists (PersonID.is(1)) and Guarantor. exists(PersonID.is(1))) both refer to the same person instance. Instance structures are equivalent if the primary keys are set to the same values. Since the value of a primary key can be an instance structure, equivalent expression must be defined recursively.

Definition (177) An instance structure, $is_1$ of the form $IS_1(it_1, et_1, PKM_1, IKM_1)$ is header equivalent to $is_2$ of the form $IS_2(it_2, et_2, PKM_2, IKM_2)$, denoted as $HEquiv(is_1, is_2)$, if and only if $et_1=et_2$ and $PKM_1=PKM_2$ and $Domain(IKM_1)= Domain(IKM_2)$ and (recursively) for all rh in $Domain(IKM_1)$, $IKM_1(rh)$ is header equivalent to $IKM_2(rh)$.

Lemma (11) HEquiv is an equivalence relation (reflexive, transitive and commutative).

Definition (178) For any set of instance structures, $SI=\{is_1, is_2, \ldots is_n\}$, the header equivalent partition of SI, HEPartition(SI), is the partition of SI using the equivalence relation, HEquiv defined in Definition (177).

Definition (179) For any set of header equivalent instance structures, SI, the entity type of SI, $et(SI)=et_x$ where $et_x$ is the entity type of all instance structures in SI.

Definition (180) For any set of header equivalent instance structures, SI, the primitive key map of SI, $PKM(SI)=PKM_x$ where $PKM_x$ is the primitive key map of all instance structures in SI.

Definition (181) Two sets of instance structures, $S_1$ and $S_2$ are disjoint under header equivalence if and only if for all $is_1$ in $S_1$ and $is_2$ in $S_2$, $is_1$ is not header equivalent to $is_2$.

Definition (182) An update instance structure, UIS, is an instance structure with the following added components:
- (182.1) PM:UpdateOperationTypes→(PER→℘(Values)), the primitive modify map, where for all rh in PER, rh is a binary relation header.
- (182.2) PR:PER→(RV→℘(Values)), the primitive replace map, where for all rh in PER,
  - (182.2.1) rh is a binary relation header,
  - (182.2.2) Domain(PR(rh))∪RangeElements (PR(rh)) ⊆Values, and
  - (182.2.3) for all vl in Domain(PR(rh)), PR(rh)(vl)≠∅.
- (182.3) IM:UpdateOperationTypes→(EER→℘(Update Instance Structure)), the instance modify map, where for all rh in EER, rh is a binary relation header, and every element of EER(rh) is an update instance structure.
- (182.4) IR:EER→(UInst→℘(Update Instance Structure)), the instance replace map where for all rh in EER,
  - (182.4.1) rh is a binary relation header,
  - (182.4.2) for all inst in Domain(IR(rh))∪RangeElements(IR(rh)) is an update instance structure,
  - (182.4.3) for all inst in Domain(IR(rh)), IR(rh)(inst)≠∅.
  - (182.4.4) For any $inst_1$, $inst_2$ in Domain(IR(rh)), $inst_1 \neq inst_2$, $inst_1$ is not header equivalent to $inst_2$. (See Definition (177)). UIS(it, et, PKM, IKM, PM, PR, IM, IR) will denote an update instance structure of that form.

Definition (183) For any update instance structure, UIS, let $rh_1, rh_2, \ldots, rh_n$ be the Domain(IR), the immediate update instance structures of UIS, IUISS(UIS), is RangeElements(Domain(IM(Add)))∪
RangeElements(Domain(IM(Update)))∪
RangeElements(Domain(IM(Remove))).

-continued

Domain(IR($rh_1$))∪RangeElements(IR($rh_1$))∪
Domain(IR($rh_2$))∪RangeElements(IR($rh_2$))∪
. . .
Domain(IR($rh_n$))∪RangeElements(IR($rh_n$))

Definition (184) For any set of update instance structure, $SI=\{uis_1, uis_2, \ldots uis_n\}$ the update instance structures of SI, UISS(SI), is ISS(SI)∪UISS(IUISS($uis_1$))∪
UISS(IUISS($uis_2$))∪ . . . ∪
UISS(IUISS($uis_n$))

(In other words, the set of all update instance structures that appear anywhere (recursively) in any update instance structure of SI.

Definition (185) For any set of header equivalent instance structure with updates, $\{uis_1, uis_2, \ldots uis_n\}$ and any op in UpdateOperationTypes, the instance structures are pairwise update disjoint for op, if and only if for all i, j from 1 to n, where i≠j, $PM(uis_i)(op) \cap PM(uis_j)(op)=\emptyset$ and $IM(uis_i)(op) \cap IM(uis_j)(op)=\emptyset$.

Definition (186) For any set of header equivalent instance structure with updates, $\{uis_1, uis_2, \ldots uis_n\}$ the instance structures are pairwise replace disjoint if and only if for any relation header rh in Domain(PR($uis_1$))∪Domain(IR($uis_1$))∪Domain(PR($uis_2$))∪Domain(IR($uis_2$))∪ . . . ∪ Domain(PR($uis_n$))∪Domain(IR($uis_n$)) and for all i, j from 1 to n, where i≠j,
- (186.1) if rh is in Domain(PR($uis_i$))∩Domain(PR($uis_j$)) then then Domain(PR($uis_i$)(rh))∩Domain(PR($uis_j$)(rh))=∅.
- (186.2) if rh is in Domain(IR($uis_i$))∩Domain(IR($uis_j$)) then Domain(IR($is_i$)(rh)) and Domain(IR($is_j$)(rh)) are disjoint under header equivalence.

Definition (187) For any set of update instance structures, $SI=\{uis_1, uis_2, \ldots uis_n\}$, any operation type, op, the primitive update map merge of SI for op, PM(op, SI)=PM($uis_1$)(op)⊕PM($uis_2$)(op)⊕ . . . (op)⊕PM($uis_n$)(op) (see Definition (24))

Definition (188) For any set of update instance structures, $SI=\{uis_1, uis_2, \ldots uis_n\}$, any operation type, op, the instance update map merge of SI for op, IM(op, SI)=IM($uis_1$)(op)⊕IM($uis_2$)(op)⊕ . . . (op)⊕IM($uis_n$)(op) (see Definition (24))

Definition (189) For any set of update instance structures, $SI=\{uis_1, uis_2, \ldots uis_n\}$ the primitive replace merge of SI, PR(SI) is defined as:
- (189.1) Domain(PR(SI))=Domain(PR($uis_1$))∪Domain(PR($uis_2$))∪ . . . ∪Domain(PR($uis_n$)).
- (189.2) For all rh in Domain(PR(SI)), let $uis_{i1}, uis_{i2}, \ldots, uis_{ik}$, be the set of all instance structures in SI where for all i from 1 to k, rh is in Domain(PR($uis_{ik}$)). Then PR(SI)(rh)=PR($uis_{i1}$)(rh)⊕PR($uis_{i2}$)(rh)⊕ . . . ⊕PR($uis_{ik}$)(rh).

Definition (190) For any set of instance structures, $SI=\{uis_1, uis_2, \ldots uis_n\}$ the instance replace merge of SI, IR(SI) is defined as:
- (190.1) Domain(IR(SI))=Domain(IR($uis_1$))∪Domain(IR($uis_2$))∪ . . . ∪Domain(IR($uis_n$)).
- (190.2) For all rh in Domain(IR(SI)), let $uis_{i1}, uis_{i2}, \ldots, uis_{ik}$, be the set of all instance structures in SI where for all i from 1 to k, rh is in Domain(IR(uis$_{1k}$). Then IR(SI)(rh)=IR(uis$_{i1}$)(rh)⊕IR(uis$_{i2}$)(rh)⊕ ... ⊕IR(uis$_{ik}$)(rh).

Definition (191) For any set of update instance structures, SI, and any uis$_1$ in UISS(SI), and any relation header rh of the form R(e, e), and any op in {ADD, REMOVE} the augmented op set of uis$_1$ in SI, AugmentSet(op, SI, uis$_1$, rh) is the set of update instance structures, uis$_2$, in UISS(SI) such that IM(uis$_2$)(op)(rh) contains an update instance structure, uis$_3$ that is header equivalent to uis$_1$.

Lemma (12) For any update instance structures, SI, any op in {ADD, REMOVE}, any rh of the form R(e, e) and any uis$_1$ and uis$_2$ in UISS(SI), where uis$_1$ and uis$_2$ are header equivalent, AugmentSet(op, SI, uis$_1$, rh)=AugmentSet(op, SI, uis$_2$, rh).

Definition (192) For any entity relational schema, ERS, and any update instance structures, SI, and any uis$_1$ in UISS(SI), and any op in {ADD, REMOVE}, the augmented op instance update map for uis$_1$ over SI and ERS, AIM(ERS, uis, uis$_1$, op), is the map defined as:
  (192.1) Domain(AIM) is the set of rh in CommutativeRels where AugmentSet(op, SI, uis$_j$, rh) is not empty.
  (192.2) For any rh in Domain(AIM), AIM(rh)=AugmentSet(op, SI, uis$_1$, rh).

Definition (193) For any entity relational schema, ERS, and any set of update instance structures, SI and any set of header equivalent update instance structures HE⊆SI where HE={uis$_1$, uis$_2$, ... uis$_n$}, and any operation type, op, the augmented instance update map merge of SI for op, AIM (ERS, op, SI, HE) is defined as:
  (193.1) AIM(rh)=IM(op, HE)(rh) for op not in {ADD, REMOVE} and rh in Domain(IM(op, HE)).
  (193.2) Otherwise AIM=IM(op, HE)⊕AIM(ERS, SI, uis$_1$, op)⊕AIM(ERS, SI, uis$_2$, op)⊕ ... ⊕AIM(ERS, SI, uis$_n$, op).

The following definition, formalizes the notion of a well formed instance structure relative to an Entity Relation Schema. Well formed instance structures provide certain guarantees as described above. Note that it can be determined if an instance structure is well formed from the entity relation schema, independent of the data in the relation set instance. Since schemas change infrequently, relative to the frequency of changes to the data in the relation set instance, constraint violations can be avoided, simply by checking that an instance structure is well formed.

Definition (194) For any entity relation schema, ERS, a set of update instance structures, SIS, is well formed for ERS if and only if
  (194.1) for all is in UISS(SIS)
    (194.1.1) i s is well formed for ERS as per Definition (176).
    (194.1.2) For all operation types, op, in Domain(PM),
      (194.1.2.1) Domain(PM(op))⊆PrimitiveHeaders(ERS, et)
      (194.1.2.2) For all R(e, d) in Domain(PM(op)), PM(op) (R(e, d))⊆TypeVals(d).
    (194.1.3) For all operation types, op, in Domain(IM),
      (194.1.3.1) Domain(IM(op))⊆EntityHeaders(ERS, et)
      (194.1.3.2) For all R(e$_1$, e$_2$) in Domain(IM(op)), and for all instance structures is$_1$ in IM(op)(R(e, e$_2$)), the entity type of is$_1$ is e where e=e$_2$ or (e, e$_2$) is in SubEntity+.
    (194.1.4) Domain(PR)⊆PrimitiveHeaders(ERS, et) and for all R(e, d) in Domain(PR), Domain(PR(R(e, d)))⊆TypeVals(d) and RangeElements(PR(R(e, d))⊆TypeVals(d).
    (194.1.5) Domain(IR)⊆EntityHeaders(ERS, et) and for all R(e$_1$, e$_2$) in Domain(IR), and for all instance structures is$_1$ in Domain(IR(R(e$_1$, e$_2$))∪RangeElements (IR(R(e$_1$, e$_2$)), the entity type of is$_1$ is e where e=e$_2$ or (e, e$_2$) is in SubEntity+.
    (194.1.6) For any M in {PM, IM} if UPDATE is in Domain(M) and rh in MustHaves(ERS)∪Domain(M(UPDATE)) then M(UPDATE)(rh)≠∅.
    (194.1.7) If rh is in Props then
      (194.1.7.1) For all M in {PM, IM},
        (194.1.7.1.1) if ADD is in the Domain(M), rh is not in Domain(M(ADD)).
        (194.1.7.1.2) if UPDATE is in the Domain(M) and if rh is Domain(M(UPDATE)) then the cardinality of M(UPDATE)(rh) is less than or equal to one.
        (194.1.7.1.3) If rh is also in MustHaves (ERS) and if REMOVE is in Domain(M), rh is not in Domain(M(REMOVE)).
      (194.1.7.2) If rh is in Domain(PR) and vl is in Domain(PR(rh)) then PR(rh) (vl) contains exactly one element.
      (194.1.7.3) If rh is in Domain(IR) and inst is in Domain(IR(rh)) then IR(rh) (inst) contains exactly one element.
    (194.1.8) If rh is in CommutativeRels then rh is not in Domain(PM(UPDATE))∪Domain(IM(UPDATE)) ∪Domain(IR)∪Domain(PR).
    (194.1.9) For any rh is not in PrimaryKey(et)
      (194.1.9.1) and any M in {IM, PM} and any op in {ADD, REMOVE, UPDATE}, rh is not in Domain(M(op)).
      (194.1.9.2) rh is not in Domain(IR)∪Domain(PR).
    (194.1.10) Any instance structure in RangeElements (IM(REMOVE)) must be of instance type EXISTS.
    (194.1.11) For any rh in Domain(IR), and any inst in Domain(IR(rh)), the instance type of inst is EXISTS.
  (194.2) Let SI be any set, {is$_1$, is$_2$, ... is$_n$} in HEPartition (UISS(SIS)). Then the following must hold:
    (194.2.1) There is an instance type, i t, such that for all i from 1 to n, it(is$_1$)=it.(In other words all the instance structures have the same instance type) and
      (194.2.1.1) If it is INSTANCE or NEWINSTANCE then MustHaves (ERS) (et(SI))⊆Domain(PM(UPDATE, SI))∪Domain(IM(UPDATE, SI))∪Domain(PM(ADD, SI))∪Domain(IM(ADD, SI)).
    (194.2.2) SI is pairwise update disjoint for UPDATE and pairwise replace disjoint.
    (194.2.3) Domain(PM(UPDATE, SI))∩Domain(PM (ADD, SI))=∅
    (194.2.4) Domain(PM(UPDATE, SI))∩Domain(PR (SI))=∅.
    (194.2.5) Domain(IM(UPDATE, SI))∩Domain(AIM (ERS, ADD, UISS(SIS), SI))=∅.
    (194.2.6) Domain(IM(UPDATE, SI))∅Domain(IR (SI))=∅.
    (194.2.7) For all rh in Domain(PR(SI)), for all vl$_1$, vl$_2$ in Domain(PR(SI) (rh)), vl$_1$≠vl$_2$, vl$_i$ is not in PR(SI) (rh)(vl$_2$).
    (194.2.8) For all rh in Domain(IR(SI)), for all inst$_1$, inst$_2$ in Domain(IR(SI)(rh)), inst$_1$≠inst$_2$, there does not exist and inst$_3$ in IR(SI) (rh)(inst$_2$) that is header equivalent to inst$_1$.
    (194.2.9) For all rh in Domain(PM(ADD, SI))
      (194.2.9.1) if rh is in Domain(PM(REMOVE, SI)), then PM(ADD, SI) (rh)∩PM(REMOVE, SI) (rh)=∅.

(194.2.9.2) If rh is in Domain(PR), PM(ADD, SI) (rh)∩Domain(PR(SI) (rh))=∅.

(194.2.10) For all rh in Domain(PM(REMOVE, SI)), PM(REMOVE, SI) (rh)∩RangeElements(PR(SI) (rh))=0.

(194.2.11) For all rh in Domain(AIM(ERS, ADD, UISS (SIS), SI))

(194.2.11.1) if rh is in Domain(AIM(ERS, REMOVE, SI)), then AIM(ERS, ADD, UISS (SIS), SI)(rh) and AIM(ERS, REMOVE, UISS (SIS), SI)(rh) are disjoint under header equivalence.

(194.2.11.2) AIM(ERS, ADD, UISS(SIS), SI)(rh) and Domain(IR(SI) (rh)) are disjoint under header equivalence.

(194.2.12) For all rh in Domain(AIM(ERS, REMOVE, UISS (SIS), SI)), AIM(ERS, REMOVE, UISS(SIS), SI)(rh) and RangeElements(IR(SI) (rh)) are disjoint under header equivalence.

In order to execute a well-formed instance structure, the equivalent instance structures must be grouped together. When an instance structure has other immediate instance structures those must be executed first. To accommodate equivalent instance structures an instance structure graph is formed from the instance structure. Then the instance structure graph is executed.

In the following it is assumed the NodeKeys is an enumerable set of node keys.

Definition (195) An instance node, IN, is comprised of nk, i t, et, and PKM where (195.1) A node key, nk, in NodeKeys.
  (195.2) An instance type, i t,
  (195.3) an entity type et in EntityTypes,
  (195.4) PKM:PKER→Values, the primitive key map where for all rh in PKER, rh is a binary relation header.

An instance node of the above form is denoted as, IN(nk, i t, et, PKM). Alternatively, For any instance node, in, nk(in), it(in), et(in), and PKM(in) will refer to the corresponding structure of the node.

Definition (196) An instance structure graph, ISG, is a directed labeled acyclic graph, (N, E) where the nodes of the graph are instance nodes and the labels are binary relation headers and (196.1) For any distinct nodes $in_1$ and $in_2$ in ISG, the node key of $in_1$ is not equal to the node key of $in_2$.
  (196.2) No two distinct nodes are header equivalent (see Definition (198))

The instance structure graph will be denoted as ISG(N, E) where N are the nodes of the graph and E the edges.

Definition (197) For any instance structure graph, ISG, and any node in in ISG, let (in, $rh_1$, $in_1$), (in, $rh_2$, $in_2$), . . . , (in, $rh_n$, $in_n$) be all the out edges of in, then the instance key map, IKM, of in in ISG, IKM(ISG, in), is the map where Domain (IKM)={$rh_1$, $rh_2$, . . . $rh_n$} and where IKM($rh_1$)=$in_1$, IKM ($rh_2$)=$in_2$, . . . , IKM($rn_n$)=$in_m$. When the ISG graph, and IN node contexts are clear, IKM(ISB, IN) will be denoted as IKM.

Definition (198) Two nodes $in_1$ and $in_2$ in an instance structure graph, ISG, are header equivalent if and only if (198.1) et($in_1$)=et($in_2$) and
  (198.2) PKM($in_1$)=PKM($in_2$) and
  (198.3) Domain(IKM($in_1$))=Domain(IKM($in_2$)) and
  (198.4) for all rh in Domain(IKM($in_1$)), IKM($in_1$))(rh) is header equivalent to IKM($in_2$)(rh).

Definition (199) For any entity relation model, ERS, an instance structure graph, ISG(N, E) is well formed for ERS, if and only if for every instance node, in, in N:

(199.1) There is no other distinct node in N header equivalent to i n.
  (199.2) PrimaryKeys(et)≠∅.
  (199.3) Domain(PKM)=PrimitivePrimaryKey(ERS, et)
  (199.4) For all R(e, d) in Domain(PKM), PKM(R(e, d)) is in TypeVal(d).
  (199.5) Domain(IKM)=EntityPrimaryKey(ERS, et) and
  (199.6) For all R($e_1$, $e_2$) in Domain(IKM), the entity type of IKM(R($e_1$, $e_2$)) is e, where e=$e_2$ or (e, $e_2$) is in SubEntity$^+$.
  (199.7) If the instance type in is EXISTS, then for every edge, (in, rh, $in_1$) in E, $in_1$ must be of type exists.

Definition (200) A one to one instance node map is a one to one map, ISO:$N_1$→$N_2$, where all elements of $N_1$ are instance nodes and all elements of Range(ISO) are instance nodes.

Definition (201) For any instance structure graph, ISG($N_1$, $E_1$) where $E_1$ is {($in_{11}$, $rh_1$, $in_{12}$), ($in_{21}$, $rh_2$, $in_{22}$), . . . , ($in_{k1}$, $rh_k$, $in_{k2}$)} and any one to one instance node map, ISO: $N_1$→$N_2$ the induced graph of ISG for ISO, Induced(ISG, ISO) is the graph ($N_2$, $E_2$) where $N_2$=Range(ISO), and $E_2$={(ISO($in_{11}$), $rh_1$, ISO($in_{12}$)), (ISO($in_{21}$)), $rh_2$, ISO ($in_{22}$)), . . . , (ISO($in_{k1}$), $rh_k$, ISO($in_{k2}$))}

Definition (202) For any instance structure graphs, $ISG_1$($N_1$, $E_1$) and $ISG_2$($N_2$, $E_2$), and any one to one instance node map, ISO, $ISG_1$ is isomorphic $ISG_2$ under ISO, if and only if $N_1$⊆Domain(ISO) and for any node $in_1$ in $N_1$, et(ISO ($in_1$))= et($in_1$), it(ISO($in_1$))=it($in_1$) and PKM(ISO($in_1$))=PKM($in_i$) and $ISG_2$=Induced($ISG_1$, ISO). In other words, the instance structure graphs, $ISG_1$ and $ISG_2$ are the same except for the node keys.

Definition (203) An instance structure graph, $ISG_1$, is isomorphic to another instance structure graph, $ISG_2$, if and only if there is a one to one instance node map, ISO, where $ISG_1$ is isomorphic to $ISG_2$ under ISO.

Lemma (13) If an instance structure graph $ISG_1$ is isomorphic to and instance structure graph $ISG_2$ then there is a unique one to one instance node map, ISO, such that $ISG_1$ is isomorphic to $ISG_2$ under ISO.

Definition (204) If an instance structure graph $ISG_1$ is isomorphic to and instance structure graph $ISG_2$ then ISO ($ISG_1$, $ISG_2$) is the unique one to one instance node map from Lemma (13)

Definition (205) An update structure, US, is comprised of PM, PR, IM, IR where (205.1) PM:UpdateperationTypes→(PER→℘ (Values)), the primitive modify map, where for all rh in PER, rh is a binary relation header.
  (205.2) PR:PER→(RV→℘ (Values)), the primitive replace map, where for all rh in PER, rh is a binary relation header, Domain(PR(rh))⊆Values, and for all vl in Domain(PR(rh)), PR(rh)(vl)≠∅.
  (205.3) IM:UpdateOperationTypes→(EER→℘ (Instance Node)), the instance modify map, where for all rh in EER, rh is a binary relation header, and every element of IM(op)(rh) is an instance node. The instance nodes of IM, INodes(IM) is RangeElements(IM(ADD)) ∪RangeElements(IM(REMOVE)))=RangeElements (IM(UPDATE)).
  (205.4) IR:EER→(Inst→℘ (Instance Node)), the instance replace map where for all rh in EER, rh is a binary relation header, and all inst in Domain(IR(rh)) is an instance node, and IR(rh) (vl)≠∅ and every element of IR(rh) (vl) is an instance node. Let Domain(IR)={$rh_1$, $rh_2$, . . . , $rh_n$}, then the instance nodes of IR, INodes (IR), is Domain(IR($rh_1$))∪RangeElements(Domain(IR ($rh_1$))), Domain(IR($rh_2$))∪RangeElements(Domain(IR ($rh_2$))), ..., Domain(IR($rh_n$))∪RangeElements (Domain(IR($rh_n$))), US(PM, PR, IM, IR) will denote an update structure of the above form.

Definition (206) An update structure, US(PM, PR, IM, IR), is empty if and only if PM=∅ and PR=∅ and IM=∅ and IR=∅.

Definition (207) For any update structure, US, the instance nodes of US, INodes(US), is INodes(IM)∪INodes(IR).

Definition (208) For any set of instance nodes, INS={$in_1$, $in_2$, ..., $in_k$} and any one to one instance node map ISO, where INS⊆Domain(ISO), the induced set of INS for ISO, Induced(INS, ISO)={ISO($in_1$), ISO($in_2$), ..., ISO($in_k$)}.

Definition(209) For any map, RH:EER→℘ (Instance Node), where EER={$rh_1$, $rh_2$, ..., $rh_n$}, is a set of relation headers, and any one to one instance node map, ISO, where RangeElements (RH)⊆Domain(ISO), the induced map of RH for ISO, Induced(RH, ISO), is {($rh_i$, Induced(RH ($rh_i$)), ($rh_2$, Induced(RH($rh_2$)), ..., ($rh_n$, Induced(RH($rh_n$)))}.

Definition (210) For any update structure, US, and any one to one instance node map, ISO, where INodes(IM)⊆Domain (ISO), the induced instance update map of US for ISO, InducedIM(US, ISO), is {(ADD, Induced(IM(ADD), ISO)), (REMOVE, Induced(IM(REMOVE), ISO)), (UPDATE, Induced(IM(UPDATE), ISO))}

Definition (211) For any map, INST:Inst→℘ (Instance Node), where Inst is a set of instance nodes, {$in_1$, $in_2$, ..., $in_k$}, and the Range(INST) is a set of instance nodes, and any one to one instance node mapping, ISO, the induced map of INST for ISO, Induced(INST, ISO) is {(ISO($in_1$), Induced (INST($in_1$), ISO)), (ISO($in_2$), Induced(INST($in_2$), ISO)), ..., (ISO($in_k$), Induced(INST($in_k$), ISO))}.

Definition (212) For any update structure, US, and any one to one instance node map, ISO, where INodes(IR)⊆Domain (ISO), the induced instance replace map of US for ISO, InducedIR(US, ISO), is {($rh_1$, Induced(IR($rh_1$), ISO)), ($rh_2$, Induced(IR($rh_2$), ISO)), ..., ($rh_n$, Induced(IR($rh_n$), ISO))} where Domain(IR)={$rh_1$, $rh_2$, ..., $rh_n$}.

Definition (213) For any update structure, US(PM, PR, IM, IR), and any one to one instance node map, ISO, where Inodes(IM)∪INodes(IR)⊆Domain(ISO), the induced update structure of US for ISO, Induced(US, ISO), is $US_1$(PM, PR, Induced(IM, ISO), Induced(IR, ISO)).

Definition (214) Two update structures US and $US_2$ are isomorphic under a one to one instance node map, ISO, if and only if INodes(US1)⊆Domain(ISO) and Induced($US_1$, ISO)=$US_2$.

Definition (215) For any map, UpdateMap:N→Update Structure, where N is a set of instance nodes and the Range (UpdateMap) is a set of update structures, and any one to one instance node map, ISO, where Domain(N)⊆Domain(ISO) and every for ever us in Range(UpdateMap), INodes(us)⊆ Domain(ISO), the induced map of UpdateMap under ISO, Induced(UpdateMap, ISO) is {($in_1$, Induced(UpdateMap ($in_i$), ISO)), ($in_2$, Induced(UpdateMap($in_2$), ISO)), ..., ($in_k$, Induced(UpdateMap ($in_k$), ISO))} where N={$in_1$, $in_2$, ..., $in_k$}.

Definition (216) An instance structure graph with updates is comprised of an instance structure graph, ISG(N, E), and a update mapping, UpdateMap:N→Update Structure where for all update structures, us in Range(UpdateMap), INodes (us)⊆N. ISGU(N, E, UpdateMap) will denote and instance structure graph with instance structure graph, ISG(N, E) and UpdateMap. Furthermore, the nodes of ISGU is N and the edges of ISGU is E.

Definition (217) Two instance structure graphs with updates, $ISGU_1$($N_1$, $E_1$, $UpdateMap_1$) and $ISGU_2$($N_2$, $E_2$, $UpdateMap_2$), are isomorphic under a one to one instance node map ISO, if and only if the instance structures graphs of $ISGU_1$ and $ISGU_2$ are isomorphic under ISO and if Induced($UpdateMap_1$, ISO)=$UpdateMap_2$.

Definition (218) Two instance structure graphs with updates, $ISGU_1$($N_1$, $E_1$, $UpdateMap_j$) and $ISGU_2$($N_2$, $E_2$, $UpdateMap_2$), are isomorphic if and only if there is a one to one instance node map, ISO, such that $ISGU_1$ and $ISGU_2$ are isomorphic under ISO.

Definition (219) For any instance structure graph with updates, ISGU(N, E, UpdateMap), and any node in in N,
(219.1) PM(in)=PM(UpdateMap(in))
(219.2) PR(in)=PR(UpdateMap(in))
(219.3) IM(in)=IM(UpdateMap(in))
(219.4) IR(in)=IR(UpdateMap(in))

When the context of an instance node is clear, PM, PR, IM and IR will be used to refer to PM(in), PR(in), IM(in) and IR(in) respectively.

Definition (220) For any entity relation model, ERS, an instance structure graph with updates, ISGU(N, E, UpdateMap) is well formed for ERS, if and only if for every instance node, in, in N:
(220.1) ISG(N, E) is well formed for ERS.
(220.2) For all operation types, op,
  (220.2.1) Domain(PM(op))⊆PrimitiveHeaders(ERS, et)
  (220.2.2) For all R(e, d) in Domain(PM(op)), PM(op) (R(e, d))⊆TypeVals(d).
(220.3) For all operation types, op,
  (220.3.1) Domain(IM(op))⊆EntityHeaders(ERS, et).
  (220.3.2) For all R($e_1$, $e_2$) in Domain(IM(op)), and for all instance nodes $in_1$ in IM(op)(R($e_1$, $e_2$)), the entity type of $in_1$ is e where e=$e_2$ or (e, $e_2$) is in SubEntity+.
(220.4) Domain(PR)⊆PrimitiveHeaders(ERS, et) and for all R(e, d) in Domain(PR), Domain(PR(R(e, d))) ⊆TypeVals(d) and RangeElements(PR(R(e, d))⊆Type-Vals(d).
(220.5) Domain(IR)⊆EntityHeader(ERS, et) and for all R($e_1$, $e_2$) in Domain(IR), and for all instance nodes $in_1$ in Domain(IR(R($e_1$, $e_2$))∪RangeElements (IR(R(e, $e_2$)), the entity type of $in_1$ is e where e=$e_2$ or (e, $e_2$) is in SubEntity+.
(220.6) For any M in {PM, IM} if rh is in MustHaves (ERS)∩Domain(M(UPDATE)) then M(UPDATE)(rh) ≠∅.
(220.7) If rh is in Props then
  (220.7.1) For all M in {PM, IM},
    (220.7.1.1) rh is not in Domain(M(ADD)).
    (220.7.1.2) if rh is Domain(M(UPDATE)) then the cardinality of M(UPDATE) (rh) is less than or equal to one.
    (220.7.1.3) If rh is also in MustHaves (ERS), rh is not in Domain(M(REMOVE)).
  (220.7.2) If rh is in Domain(PR) and vl is in Domain (PR(rh)) then PR(rh) (vl) contains exactly one element.
  (220.7.3) If rh is in Domain(IR) and inst is in Domain (IR(rh)) then IR(rh) (inst) contains exactly one element.
(220.8) If rh is in CommutativeRels
  (220.8.1) then rh is not in Domain(PM(UPDATE)) ∪Domain(IM(UPDATE))∪Domain(IR)∪Domain (PR).

(220.8.2) For any op in {ADD, REMOVE}, If rh is in Domain(IM(in)(op)) then for all instance nodes $in_1$ in IM(in)op)(rh), rh is in Domain(IM($in_1$)(op)) and in is in IM($in_1$)(op)(rh).

(220.9) For any rh is not in PrimaryKey(et)
  (220.9.1) and any M in {IM, PM}, rh is not in Domain (M(op)).
  (220.9.2) rh is not in Domain(IR)∪Domain(PR).

(220.10) Any instance node in RangeElements (IM(REMOVE)) must be of instance type EXISTS.

(220.11) For any rh in Domain(IR), and any inst in Domain(IR(rh)), the instance type of inst is EXISTS.

(220.12) Domain(PM(UPDATE))∩Domain(PM (ADD))=∅.

(220.13) Domain(PM(UPDATE))∩Domain(PR)=∅.

(220.14) Domain(IM(UPDATE))∩Domain(IM (ADD))=∅.

(220.15) Domain(IM(UPDATE))∩Domain(IR)=∅.

(220.16) For all rh in Domain(PR), for all $vl_1$, $vl_2$ in Domain(PR(rh)), $vl_1 \neq vl_2$, $vl_1$ is not in PR(SI)(rh)($vl_2$).

(220.17) For all rh in Domain(IR), for all $inst_1$, $inst_2$ in Domain(IR(rh)), $inst_1 \neq inst_2$, $inst_1$ is not in IR(rh)($inst_2$).

(220.18) If it is INSTANCE or NEWINSTANCE then MustHaves (ERS)(et)⊆Domain(PM(UPDATE))∪Domain(IM(UPDATE))∪Domain(PM(ADD))∪Domain (IM(ADD)).

(220.19) For all rh in Domain(PM(ADD))
  (220.19.1) if rh is in Domain(PM(REMOVE)), then PM(ADD) (rh)∩PM(REMOVE)(rh)=∅.
  (220.19.2) If rh is in Domain(PR), PM(ADD)(rh)∩Domain(PR(rh))=∅.

(220.20) For all rh in Domain(PM(REMOVE))∩Domain (PR), PM(REMOVE) (rh)∩RangeElements(PR (rh))=∅.

(220.21) For all rh in Domain(IM(ADD))
  (220.21.1) if rh is in Domain(IM(REMOVE)), then IM(ADD)(rh) and IM(REMOVE)(rh)=∅.
  (220.21.2) If rh is in Domain(IR), IM(ADD)(rh)∩Domain(IR(rh))=∅.

(220.22) For all rh in Domain(IM(REMOVE))∩Domain (IR), IM(REMOVE)(rh)∩RangeElements(IR(rh))=∅.

Lemma (14) For any entity relation schema, ERS, and well-formed instance structure graph, ISG and for every instance node, IN, in ISG, Domain(IKM)∪Domain(PKM)= PrimaryKeys(et). (see Definition (197) for the definition of IKM)

Lemma (15) For any entity relation schema, ERS, and well-formed instance structure graph, ISG and for every instance node, IN, in ISG, if UPDATE is in Domain(M), and if rh is Domain(M(UPDATE))∩MustHaves(ERS)∩Props (ERS) then the cardinality of M(UPDATE)(rh) is one.

Next we define a mapping from instance structures to instance structure graphs.

Definition (221) An instance structure, is, of the form IS($it_s$, $et_s$, $PKM_s$, $IKM_s$) is header equivalent to an instance node, in of the form, IN(nk, $it_n$, $et_n$, $PKM_n$) in an instance structure graph ISG, denoted as HEquiv (ISG, is, in), if an only if
  (221.1) $et_s = et_n$,
  (221.2) $PKM_s = PKM_n$,
  (221.3) Domain($IKM_s$)=Domain(IKM(ISG, in))
  (221.4) for all rh in Domain($IKM_s$), IKMs(rh) is header equivalent to IKM(ISG, in)(rh).

Lemma (16) For any instance structures, $is_1$, $is_2$ and any instance structure graph, ISG, and any node in in ISG, If HEquiv($is_1$, $is_2$) and HEquiv(ISG, $is_1$, in) then HEquiv(ISG, $is_2$, in).

Lemma (17) For any instance structure, is, any instance structure graph, ISG, there is at most one node in in ISG that is header equivalent to it.

Definition (222) A set of header equivalent instance structures, SI is header equivalent to a node in in an instance structure graph, ISG, if it is equivalent to any node is in SI.

Definition (223) A set of instance structures, ISS, is header equivalent to a set of nodes, INS, in an instance structure graph, ISG, if and only if for every is in iss there is an in in INS that is header equivalent and for every in in INS there is an instance structure in ISS that is header equivalent to it.

Definition (224) For any set of instance structures, SIS, let S be HEPartition(ISS(SIS)). Then SIS is equivalent to an instance structure graph with updates, ISGU, if and only if
  (224.1) For every set of header equivalent instance structures, SI={$is_1$, $is_2$, . . . , $is_n$} in S, there is a node, in, in ISGU header equivalent to SI, where
    (224.1.1) where for every op in UpdateOperationTypes,
      (224.1.1.1) Domain(IM(op, SI))=Domain(IM(in)(op)) and
      (224.1.1.2) for every rh in Domain(IM(op, SI)), IM(in) (op)(rh) is header equivalent to IM(op, SI)(rh).
      (224.1.1.3) PM(op, SI)=PM(in)(op)
      (224.1.1.4) PR(SI)=PR(in)
      (224.1.1.5) Domain(IR(SI))=Domain(IR(in))
      (224.1.1.6) for every rh in Domain(IR(SI)), Domain (IR(SI)(rh)) is header equivalent to Domain(IR(in) (rh)) and for every in in Domain(IR(in)(rh)), there is an inst in Domain(IR(SI)(rh)), header equivalent to in where IR(in)(rh)(in) is header equivalent to IR(SI) (rh)(inst).

Lemma (18) For any set of instance structures, SIS, and any instance structure graphs, $ISGU_1$ and $ISGU_2$, if SIS is equivalent to $ISGU_1$ and SIS is equivalent to $ISGU_2$ then $ISGU_1$ and $ISGU_2$ are isomorphic.

Definition (225) For any instance structure graph with updates, ISGU(N, E, UpdateMap), and any entity relational schema, ERS, any node in in N, and op in {ADD, REMOVE}, and rh in CommutativeRels(ERS), the augmented op set of in and rh for ISGU and ERS, AS (in, op, rh, ISGU, ERS), is the set of all nodes $in_1$ in N such that in is in IM($in_1$)(op)(rh).

Definition (226) For any instance structure graph with updates, ISGU(N, E, UpdateMap), and any entity relational schema, ERS, any node in in N, and op in {ADD, REMOVE}, let US(PM, PR, IM, IR) be UpdateMap(in), then the augmented op map of in, for ISGU and ERS, AIM(in, op, ISGU, ERS), is the map where Domain(AIM) is the set of all rh in CommutativeRels(ERS) where AS (in, op, rh, ISGU, ERS)≠∅ and where AIM(rh)=AS(in, op, rh, ISG, ERS).

Definition (227) For any instance structure graph with updates, ISGU(N, E, UpdateMap), and any entity relational schema, ERS, any node in in N, and op in {ADD, REMOVE}, let US(PM, PR, IM, IR) be UpdateMap (in), the augmented instance update map of in, for ISGU and ERS, AIM(in, ISGU, ERS), is defined as:
  (227.1) AIM(op)=IM(op) for op=UPDATE.
  (227.2) AIM(op)=IM(op)AIM(in, op, ISGU, ERS) for op in {ADD, REMOVE}.

Definition (228) For any instance structure graph with updates, ISGU(N, E, UpdateMap), and any entity relational schema, ERS, the augmented instance structure graph of ISGU for ERS, AISGU(ERS, ISGU) is the instance structure graph with updates with instance structure graph with updates AISGU(N, E, AUpdateMap) where
  (228.1) AupdateMap(in)=AIM(in, ISGU, ERS).

Lemma (19) For any set of instances structures, SIS, and any entity relational schema, ERS, and any instance structure graph with updates, ISGU, where ISGU is equivalent to SIS, SIS is well formed for ERS if and only if the augmented instance structure graph of ISGU is well-formed for ERS.

Definition (229) An entity type constructor, ETC, over and entity relation schema, ERS, is a function whose domain is the set of all 2-tuples, (RSI, et), where RSI is a relation set instance, and et is in EntityTypes, and where ETC (RSI, et) returns a value, ent, such that TypeOf(ent)=et and et is not in Typed Ext(ERS, RSI)(et).

Definition (230) An update field value map is a map, FVM:RH→Values where RH is a set of binary relation headers.

Definition (231) An update field values map is a map, FVMS:RH→$\wp$(Values) where RH is a set of binary relation headers.

Definition (232) A replace field map is a map, RFM:RH→(Vals→$\wp$(Values)) where RH is a set of binary relation headers, and Vals⊆Values, and for all rh in RH and $v_1$, $v_2$ in RFM(rh) where $v_1 \neq v_2$, $v_2$ is not in RFM(rh)($v_1$).

Definition (233) For any relation set instance, RSI, and any update field value map, FVM:RH→Values,
- (233.1) for entity relation schema, ERS, and for any entity type, et in EntityTypes(ERS), Find (ERS, RSI, FVM, et) is the set of values v such that TypeOf(v)=et and for all rh in RH, (v, FVM(rh)) is in RSI(rh).
- (233.2) For any v in Values, AddMap(RSI, FVM, v) is the map where Domain(AddMap)=RH and for all rh in RH, AddMap(rh)=(v, FVM(rh)).

Lemma (20) For any entity relation schema, ERS, and any relation set instance, RSI that satisfies ERS, and for any entity type, et in EntityTypes(ERS), and any update field value map, FVM:RH→Values where RH=PrimaryKeys (ERS, et) and for all R($e_1$, $d_1$) in RH, FVM(R($e_1$, $d_1$)) is in TypeVals($d_1$), then Find(ERS, RSI, FVM, et) contains at most one element.

Definition (234) For any entity relational schema, ERS, any entity type constructor, ETC, over ERS, any relation set instance, RSI, any entity type, et in EntityTypes(ERS), and any update field value map, FVM:RH→Values where RH=PrimaryKeys (ERS, et) and for all R(e1, d1) in RH, FVM(R(e1, d1)) is in TypeVals(d), then the instance add pair of RSI, ERS, et and FVM, InstanceAddPair(ERS, RSI, FVM, et), is
- (234.1) (∅, ent) if Find(ERS, RSI, FRM, et)={ent}. (See Lemma(20))
- (234.2) (AddMap(RSI, FVM, ent), ent) where ent=ETC (RSI, et), if Find(ERS, RSI, FRM, et)=0.

Definition (235) For any relation set instance, RSI, and any update field values map, FVMS:RH→$\wp$(Values), and any v in Values, and any op in UpdateOperationTypes, then the updated op relation set instance of RSI, FVMS, and v, URSI(op, RSI, FVMS, v), is
- (235.1) For op=Add is the relation set instance, $RSI_a$ where
  - (235.1.1) $RSI_a$(rh)=RSI(rh) for rh not in RH otherwise
  - (235.1.2) $RSI_a$(rh)=RSI(rh)∪{(v, x)|x∈FVMS(rh))}
- (235.2) For op=Update is the relational set instance, $RSI_u$ where
  - (235.2.1) $RSI_u$(rh)=RSI(rh) for rh not in RS and
  - (235.2.2) $RSI_u$(rh)={(v, x)|x∈FVMS(rh))}
- (235.3) For op=Remove is the relational set instance, $RSI_r$ where
  - (235.3.1) $RSI_r$(rh)=RSI(rh) for rh not in RH otherwise
  - (235.3.2) $RSI_r$(rh)=RSI(rh)−{(v, x)|x∈FVMS(rh)}

Definition (236) For any relation set instance, RSI, and any replace field map, RFM:RH→(Vals→$\wp$(Values)), and any v in Values, then Replace (RSI, RFM, v) is the relation set instance, $RSI_{rp}$ where
- (236.1) $RSI_{rp}$(rh)=RSI(rh) for rh not in RH, otherwise
- (236.2) assuming Domain(RFM(rh))={$v_1$, $v_2$, . . . , $v_k$} then
  - (236.2.1) $RSI_{rp}$(rh)=(RSI(rh)−{(v, x)|x∈{$v_1$, $v_2$, . . . , $v_k$}})∪AddIf($v_1$, {(v, x)|x∈RFM(rh)($v_1$)})∪AddIf ($v_2$, {(v, x)|x∈RFM(rh) ($v_2$)})∪ . . . ∪AddIf($v_k$, {(v, x)|x∈RFM(rh)($v_k$)}) where for any j from 1 to k, and any set of tuples, TS, AddIf($v_j$, TS)=TS if (v, $v_j$) is in RSI(rh), otherwise AddIf ($v_j$, TS)=∅.

Definition (237) Given an entity relational schema, ERS, a relation set instance RSI that satisfies ERS, and an instance structure graph, ISG(N, E), well formed for ERS, and entity type constructor, ETC, over ERS, then the instances function for ERS, RSI, ETC and ISG, Instances (ERS, RSI, ETC, ISG) returns a pair, ($RSI_e$, Ent) where $RSI_e$ is a new relation set instance that satisfies ERS, and Ent is a one to one mapping from each node, in, in ISG to a value where TypeOf(ent)=et(in). The function is defined inductively on the depth of the graph (see Definition (19)). Assume the roots ISG are $r_1$, $r_2$, . . . $r_n$. Let $ISG_c$($N_c$, $E_c$) be the instance structure graph consisting of $N_c$=N−{$r_1$, $r_2$, . . . , $r_n$} and $E_c$=E−{($r_j$, rh, v)|j=1 to n and ($r_j$, rh, v) is in E}. ISG is well formed for ERS and since the depth of $ISG_c$ is less then the depth of ISG it can be assumed inductively that Instances (ERS, RSI, ETC, ISG) returns a new relation set instance RSI, that satisfies ERS and a mapping $Ent_c$ from each node in in $ISG_c$ to a value, ent, where TypeOf(ent)=et(in). Then for all j from 1 to n, let $FVM_j$ be the update field value map defined as $FVM_j$(rh)=PKM(r j)(rh) for any rh in Domain (PKM(r j)) and for any rh in Domain(IKM(ISG, $r_j$)), $FVM_j$(rh)=$Ent_c$(IKM(ISG, $r_j$)(rh)).Let ($RSI_j$, $ent_j$)=InstanceAddPair(ERS, $RSI_c$, $FVM_j$, et($r_j$)). Then
- (237.1) $RSI_e$=$RSI_c$⊕$RSI_1$⊕$RSI_2$⊕ . . . ⊕$RSI_n$ and
- (237.2) ENT=$ENT_c$∪{($r_1$, $ent_1$), ($r_2$, $ent_2$), . . . , ($r_n$, $ent_n$)}

The instance function defined in Definition (237) may result in the creation of new entities and new mappings for the primary key relation headers for those entities. However, it remains to show how to execute the ADD, UPDATE, REMOVE and REPLACE operations of those instance structure graph.

Definition (238) For any update structure US(PM, PR, IM, IR) and any instance structure graph, ISG(N, E), any in in ISG, and any map, Ent:N→Values, and any op in UpdateOperationTypes, the op update field values map of US, ISG, Ent, and in, FVMS(US, ISG, Ent, in, op) is the update field value map, FVMS:RH→$\wp$(Values), where
- (238.1) RH=Domain(PM(op))∪Domain(IM(op)) and
  - (238.1.1) FVMS(rh)=PM(op)(rh) for rh in Domain(PM (op)).
  - (238.1.2) FVMS(rh)=apply(Ent, IM(op)(rh)) (See Definition(25)) for rh in Domain(IM(op)).

Definition (239) For any update structure US(PM, PR, IM, IR) and any instance structure graph, ISG(N, E) any in in ISG, and any one to one map, Ent:N→Values, the replace field value map of US and in for ISG, RFM(US, ISG, Ent, in), is RFM:RH→(Vals→$\wp$(Values)) where
- (239.1) RH=Domain(PR)∪Domain(IR) and
  - (239.1.1) RFM(rh)=PR(rh) for rh in Domain(PR) and
  - (239.1.2) RFM(rh)=apply (Ent, IR(rh)) (see Definition (26)) for any rh in Domain(IR).

Definition (240) Given an entity relational schema, ERS, a relation set instance RSI that satisfies ERS, an instance structure graph with updates, ISGU(N, E, UpdateMap), and a one to one mapping Ent:N→Values, where for all in in N, TypeOf(Ent(in))=et(in), and any node in in N, and any op in UpdateOperationTypes, the op updated relation set instance of ERS, RSI, ISGU Ent, and in, URSI(op, ERS, RSI, ISGU, Ent, in), is > URSI(op, RSI,
> FVMS(UpdateMap(in), ISG(N, E), Ent, in, op),
> ent)

Definition (241) Given an entity relational schema, ERS, a relation set instance RSI that satisfies ERS, an instance structure graph with updates, ISGU(N, E, UpdateMap), and a one to one mapping Ent:N→Values, where for all in in N, TypeOf(Ent(in))=et(in), and any node in in N, and any sequence of distinct operation types, $op_1, op_2, \ldots, op_k$ in OperationTypes, the $op_1, op_2, \ldots, op_k$ composition updated relation set instance of ERS, RSI, ISGU Ent, in, URSI(($op_1$, $op_2, \ldots, op_k$), ERS, RSI, ISGU, Ent, in), is
 (241.1) For k=0, RSI, otherwise (Recursively)
 (241.2) if $op_k$ is in UpdateOperationTypes then > URSI($op_k$, ERS,
> URSI(($op_1, op_2, \ldots, op_{k-1}$), ERS, RSI, ISGU, Ent, in)
> ISGU, Ent, in)

(241.3) else ($op_k$=REPLACE) then

> Replace(
> URSI(($op_1, op_2, \ldots, op_{k-1}$), ERS, RSI, ISGU, Ent, in),
> RFM(UpdateMap(in), ISG, Ent, in),
> Ent(in))

Lemma (21) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, TypeOf(Ent(in))=et(in), and any node in in N, and any set of distinct operation types, Ops, in OperationTypes, then URSI(($op_1, op_2, \ldots, op_k$), ERS, RSI, ISGU, Ent, in), returns the same value for any sequence of distinct operation types ($op_1, op_2, \ldots, op_k$) where $\{op_1, op_2, \ldots, op_k\}$=Ops.

Definition (242) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, TypeOf(Ent(in))=et(in), and any node in in N, and any set of distinct operation types, Ops in OperationTypes, the Ops composition updated relation set instance of ERS, RSI, ISGU Ent, in, URSI(Ops, ERS, RSI, ISGU, Ent, in), is URSI(($op_1, op_2, \ldots, op_k$), ERS, RSI, ISGU, Ent, in) where ($op_1, op_2, \ldots, op_k$) is any sequence of distinct operation types such that $\{op_1, op_2, \ldots, op_k\}$=Ops.

Definition (243) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, updated relation set instance of ERS, RSI, ISGU Ent, in, URSI(ERS, RSI, ISGU, Ent, in), is URSI(OperationTypes, ERS, RSI, ISGU, Ent, in).

Definition (244) Given an entity relational schema, ERS, a relation set instance RSI that satisfies ERS, an instance structure graph with updates, ISGU(N, E, UpdateMap), and a one to one mapping Ent:N→Values, where for all in in N, TypeOf(Ent(in))=et(in), and any sequence of distinct nodes ($in_1, in_2, \ldots, in_k$) in N, updated relation set instance of ERS, RSI, ISGU Ent, and ($in_1, in_2, \ldots, in_k$), URSI(ERS, RSI, ISGU, Ent, ($in_1, in_2, \ldots, in_k$)), is
 (244.1) RSI if k=0,
 (244.2) otherwise (recursively) is:

> URSI(ERS,
> URSI(ERS, RSI, ISGU, Ent, ($in_1, in_2, \ldots, in_{k-1}$)),
> ISGU, Ent, $in_k$)

Lemma (22) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, TypeOf(Ent(in))=et(in), and any set of nodes INS⊆N, then URSI(ERS, RSI, ISGU, Ent, ($in_1, in_2, \ldots, in_k$)), has the same value for any sequence of distinct nodes ($in_1, in_2, \ldots, in_k$) where INS=$\{in_1, in_2, \ldots, in_k\}$.

Definition (245) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, TypeOf(Ent(in))=et(in), and any set of nodes, INS⊆N, updated relation set instance of ERS, RSI, ISGU Ent, INS, URSI(ERS, RSI, ISGU, Ent, INS) is URSI (ERS, RSI, ISGU, Ent, ($in_1, in_2, \ldots, in_k$)), where ($in_1, in_2, \ldots, in_k$) is any sequence of distinct nodes such that INS=$\{in_1, in_2, \ldots, in_k\}$.

Definition (246) Given an entity relational schema, ERS, a relation set instance RSI that satisfies ERS, an instance structure graph with updates, ISGU(N, E, UpdateMap), well formed for ERS, and a one to one mapping Ent:N→Values, where for all in in N, TypeOf(Ent(in))=et(in), the updated relation set instance of ERS, RSI, ISGU Ent, URSI(ERS, RSI, ISGU, Ent) is URSI(ERS, RSI, ISGU, Ent, N).

The next definition defines what it means to execute and instance structure.

Definition (247) Given an entity relational schema, ERS, a relation set instance RSI that satisfies ERS, an instance structure graph with updates, ISGU(N, E, UpdateMap), well formed for ERS, the executed relation set instance of ERS, RSI, and ISGU, Execute (ERS, RSI, ISGU) is URSI(ERS, $RSI_e$, ISGU, Ent, N) where ($RSI_e$, Ent)=Instances(ERS, RSI, ETC, ISG).

An extended BNF of instance expressions is shown in FIG. 40. A Java method for converting instance expressions to an update instance structure is shown in FIGS. 41-45. That method makes use of the AntLR library. See [2].

3. HARDWARE OVERVIEW

Figure 46:
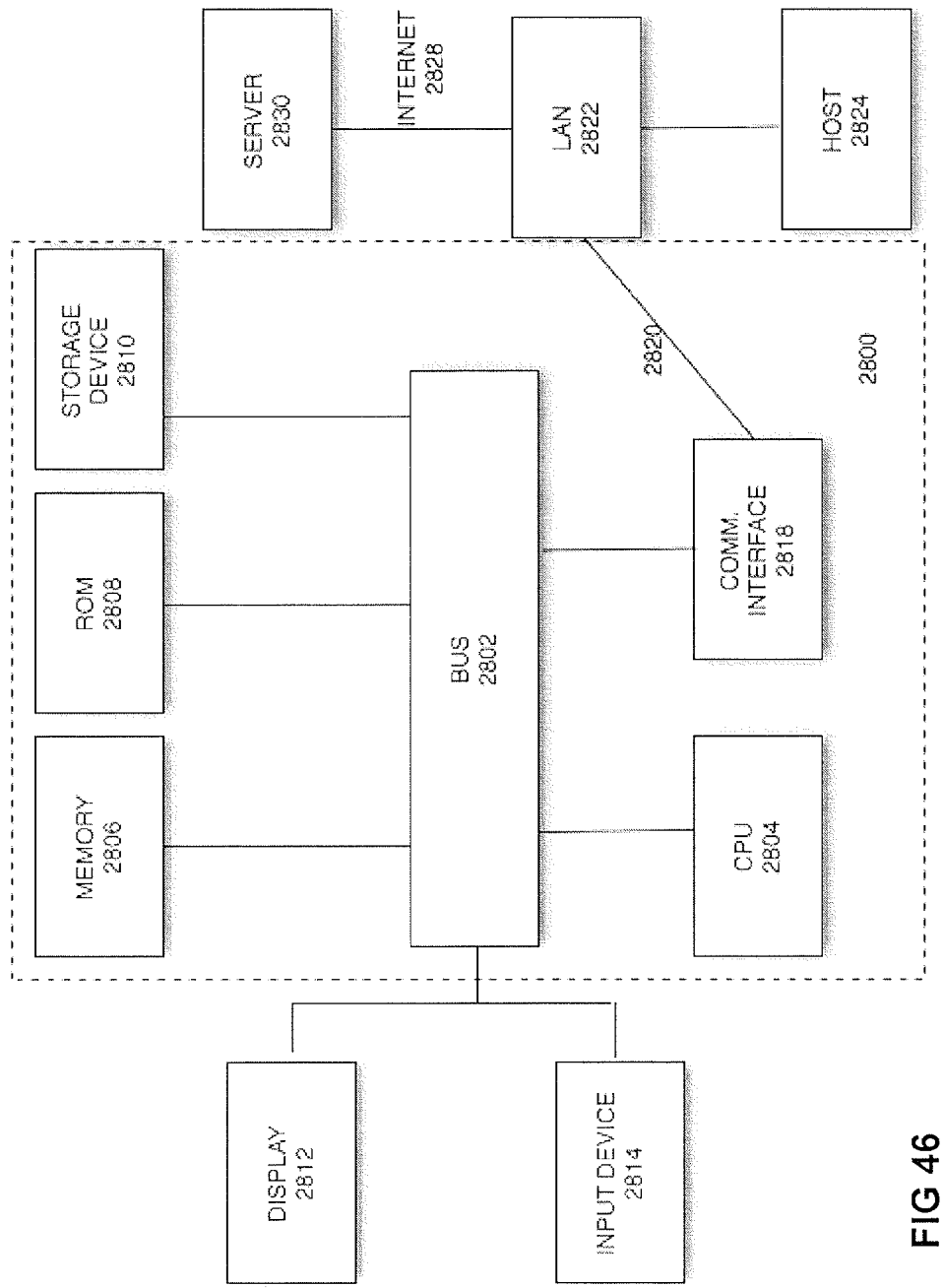

FIG. 46 is a block diagram that illustrates a computer system 2800 upon which an embodiment of the disclosure may be implemented. Computer system 2800 includes a bus 2802 or other communication mechanism for communicating information, and a central processor 2804 coupled with bus 2802 for processing information. Computer system 2800 also includes a main memory 2806, such as a random access memory (RAM) or other dynamic storage device, coupled to bus 2802 for storing information and instructions to be executed by processor 2804. Main memory 2806 also may be used for storing temporary variables or other intermediate information during execution of instructions to be executed by processor 2804. Computer system 2800 further includes a read only memory (ROM) 2808 or other static storage device coupled to bus 2802 for storing static information and instructions for processor 2804. A storage device 2810, such as a magnetic disk or optical disk, is provided and coupled to bus 2802 for storing information and instructions.

Computer system 2800 may be coupled via bus 2802 to a display 2812, such as a LCD screen, for displaying information to a computer user. An input device 2814, including alphanumeric and other keys, is coupled to bus 2802 for communicating information and command selections to processor 2804. Another type of user input device, such as a mouse, a trackball, or cursor direction keys may be used for communicating direction information and command selections to processor 2804 and for controlling cursor movement on display 2812.

Embodiments of the disclosure are related to the use of computer system 2800 for implementing the techniques described herein. According to one embodiment, those techniques are implemented by computer system 2800 in response to processor 2804 executing one or more sequences of one or more instructions contained in main memory 2806. Such instructions may be read into main memory 2806 from another computer-readable medium, such as storage device 2810. Execution of the sequences of instructions contained in main memory 2806 causes processor 2804 to perform the process steps described herein. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 2804 for execution. Such a medium may take many forms, including but not limited to, non-volatile media. Non-volatile media includes, for example, optical or magnetic disks, such as storage device 2810. Volatile media includes dynamic memory, such as main memory 2806. Transmission media includes coaxial cables, copper wire and fiber optics, including the wires that comprise bus 2802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 2804 for execution. For example, the instructions may initially be carried on a magnetic disk of a remote computer. The remote computer can load the instructions into its dynamic memory and send the instructions over a data transmission network. A communications interface local to computer system 2800 can receive the data and place the data on bus 2802. Bus 2802 carries the data to main memory 2806, from which processor 2804 retrieves and executes the instructions. The instructions received by main memory 2806 may optionally be stored on storage device 2810 either before or after execution by processor 2804.

Computer system 2800 also includes a communication interface 2818 coupled to bus 2802. Communication interface 2818 provides a two-way data communication coupling to a network link 2820 that is connected to a local network 2822. For example, communication interface 2818 may be an network interface card or a wireless modem (e.g., using 802.11 communications). In any such implementation, communication interface 2818 sends and receives electrical, electromagnetic or optical signals that carry digital data streams representing various types of information.

Network link 2820 typically provides data communication through one or more networks to other data devices. For example, network link 2820 may provide a connection through local network 2822 to a host computer 2824 or to data equipment operated by an Internet Service Provider, which in turn provides data communication services through the world wide packet data communication network now commonly referred to as the "Internet" 2828. Local network 2822 and Internet 2828 both use electrical, electromagnetic or optical signals that carry digital data streams. The signals through the various networks and the signals on network link 2820 and through communication interface 2818, which carry the digital data to and from computer system 2800, are exemplary forms of carrier waves transporting the information.

Computer system 2800 can send messages and receive data, including program code, through the network(s), network link 2820 and communication interface 2818. In the Internet example, a server 2830 might transmit a requested code for an application program through Internet 2828, local network 2822 and communication interface 2818.

The received code may be executed by processor 2804 as it is received, and/or stored in storage device 2810, or other non-volatile storage for later execution.

4. REFERENCES

[1] Dechter, Rina (2003). *Constraint processing*. Morgan Kaufmann. ISBN 1-55860-890-7

[2] Terence Parr (2013). The Definitive ANTLR 4 Reference. Pragmatic Programmers, LLC, The. ISBN-13 9781934356999

What is claimed is:

1. A method for inferring solution objects from a query template in a database management system according to a data model, the query template comprising a set of database variables and including a unary template of variables and a plurality of atomic templates of variables, the method comprising:
  determining a primal graph representation for the query template, the primal graph representation comprising vertices and edges;
  computing a node-link representation for an induced acyclic hypergraph corresponding to the primal graph representation, the node-link representation comprising multi-nodes, single-nodes and links;
  for each multi-node in the node-link representation, applying a constraint satisfaction solver to determine an assignment to the multi-node;
  for each link in the node-link representation, determining an assignment for the relation corresponding to the link;
  computing an extension of the assignments to the multi-nodes and links; and
  computing an arc-consistent assignment from the extension.

2. The method of claim 1, the node-link representation for the induced acyclic hypergraph computed by the steps comprising:
- determining a set of cycles of database variables in the primal graph representation; for each cycle in the set of cycles, computing a transitive reflexive closure of variables for the cycle over the vertices in the primal graph representation;
- assigning each transitive reflexive closure of variables to a multi-node of the induced acyclic hypergraph;
- for each variable not included in a transitive reflexive closure with other variables, assigning the variable to a single-node;
- computing a set of links, each link comprising an edge between different nodes in the hypergraph; and
- returning the sets of single-nodes, multi-nodes and links.

3. The method of claim 1, wherein applying the constraint satisfaction solver comprises applying an identified focus variable, and the arc-consistent assignment is computed with respect to a directed tree rooted at the focus variable.

4. The method of claim 1, each atomic template comprising an identification of a binary relation and two variables from the data model.

5. The method of claim 1, the unary template comprising a mapping from the variables of the atomic templates to sets of variable values.

6. The method of claim 3, further comprising:
- determining data field values from the solution objects by traversing the directed tree from the root.

7. A method for inferring solution objects from a query template in a database management system, the query template comprising a set of database variables and including a unary template of variables and a plurality of atomic templates of variables, the method comprising:
- determining a primal graph representation for the query template;
- computing a node-link representation for an induced acyclic hypergraph corresponding to the primal graph representation, the node-link representation comprising multi-nodes, single-nodes and links;
- applying a constraint satisfaction solver to determine a set of assignments to the multi-nodes and links in the node-link representation;
- for each assignment in in the set of assignments, computing the assignment as restricted to each multi-node and adding the restricted assignment to the solution objects; and
- computing an extension of the assignments to the multi-nodes and links.

8. The method of claim 7, wherein applying the constraint satisfaction solver comprises applying an identified focus variable, and the extension of assignments is computed with respect to a directed tree rooted at the focus variable.

9. The method of claim 7, each atomic template comprising an identification of a binary relation and two variables from the data model.

10. The method of claim 7, the unary template comprising a mapping from the variables of the atomic templates to sets of variable values.

11. The method of claim 8, further comprising:
- determining data field values from the solution objects by traversing the directed tree from the root.

* * * * *